US012537417B2

(12) United States Patent
Hotta et al.

(10) Patent No.: US 12,537,417 B2
(45) Date of Patent: *Jan. 27, 2026

(54) VEHICLE DRIVE DEVICE

(71) Applicant: AISIN CORPORATION, Aichi (JP)

(72) Inventors: Yutaka Hotta, Kariya (JP); Yuya Mizuno, Kariya (JP); Ryota Sato, Kariya (JP); Hirosato Ihara, Kariya (JP)

(73) Assignee: AISIN CORPORATION, Kariya (JP)

( * ) Notice: Subject to any disclaimer, the term of this patent is extended or adjusted under 35 U.S.C. 154(b) by 310 days.

This patent is subject to a terminal disclaimer.

(21) Appl. No.: 18/034,794

(22) PCT Filed: Feb. 10, 2022

(86) PCT No.: PCT/JP2022/005462
§ 371 (c)(1),
(2) Date: May 1, 2023

(87) PCT Pub. No.: WO2022/173013
PCT Pub. Date: Aug. 18, 2022

(65) Prior Publication Data
US 2023/0412042 A1 Dec. 21, 2023

(30) Foreign Application Priority Data

Feb. 12, 2021 (JP) .................................. 2021-021046

(51) Int. Cl.
*H02K 7/00* (2006.01)
*H02K 5/20* (2006.01)
(Continued)

(52) U.S. Cl.
CPC ............... *H02K 7/006* (2013.01); *H02K 5/20* (2013.01); *H02K 11/0094* (2013.01);
(Continued)

(58) Field of Classification Search
CPC ...... H02K 7/006; H02K 5/20; H02K 11/0094; H02K 11/21; H02K 11/27; H02K 11/33;
(Continued)

(56) References Cited

U.S. PATENT DOCUMENTS 8,710,705 B2 * 4/2014 Yamasaki ............... H02K 9/227
310/68 B
11,196,316 B2 * 12/2021 Takahashi ............... H02K 3/522
(Continued)

FOREIGN PATENT DOCUMENTS

CN 102224658 A * 10/2011 ............... H02K 3/24
EP 3207567 B1 * 12/2018 ............. H02K 11/33
(Continued)

OTHER PUBLICATIONS

Translated JP-2014143841-A (Year: 2025).*
(Continued)

*Primary Examiner* — James A Shriver, II
*Assistant Examiner* — Ian Bryce Shelton
(74) *Attorney, Agent, or Firm* — Oliff PLC

(57) ABSTRACT

A vehicle drive device includes: a rotary electric machine including a rotor and a stator; a housing member forming a housing chamber that houses the rotary electric machine; a cover member connected to one end side of the housing member in an axial direction, facing the rotary electric machine in the axial direction, and including a support portion that rotatably supports the rotor; a power switching element electrically connected to a coil of the stator; and a smoothing capacitor electrically connected to the power switching element. The power switching element and the smoothing capacitor are fixed to the cover member and disposed between the cover member and the rotary electric
(Continued)

machine in the axial direction. The smoothing capacitor overlaps the power switching element when viewed in a radial direction.

11 Claims, 38 Drawing Sheets

(51) Int. Cl.
*H02K 11/00* (2016.01)
*H02K 11/21* (2016.01)
*H02K 11/27* (2016.01)
*H02K 11/33* (2016.01)

(52) U.S. Cl.
CPC ............ *H02K 11/21* (2016.01); *H02K 11/27* (2016.01); *H02K 11/33* (2016.01); *H02K 2211/00* (2013.01)

(58) Field of Classification Search
CPC .. H02K 2211/00; H02K 9/19; H02K 2203/09; H02K 2213/12; H02M 7/003
See application file for complete search history.

(56) References Cited

U.S. PATENT DOCUMENTS

| | | | | |
|---|---|---|---|---|
| 11,489,383 | B2* | 11/2022 | Takahashi | H02K 21/22 |
| 11,967,867 | B2* | 4/2024 | Sano | H02K 11/27 |
| 11,990,804 | B2* | 5/2024 | Tamura | H02K 11/33 |
| 12,155,269 | B2* | 11/2024 | Takahashi | H02K 3/28 |
| 2008/0136265 | A1* | 6/2008 | Mizukoshi | H02M 7/5387 |
| | | | | 307/89 |
| 2012/0104886 | A1 | 5/2012 | Yamasaki et al. | |
| 2015/0229186 | A1* | 8/2015 | Sauer | H02K 5/203 |
| | | | | 165/104.28 |
| 2016/0190887 | A1* | 6/2016 | Sambuichi | H02K 3/38 |
| | | | | 310/71 |
| 2019/0305650 | A1* | 10/2019 | Tanaka | H02K 9/06 |
| 2020/0059128 | A1* | 2/2020 | Takahashi | H02K 3/522 |
| 2020/0220439 | A1* | 7/2020 | Sigmar | H02K 11/33 |
| 2020/0403468 | A1* | 12/2020 | Takahashi | H02K 9/197 |
| 2021/0175780 | A1* | 6/2021 | Sano | H02K 3/28 |
| 2021/0384808 | A1* | 12/2021 | Tamura | H02K 1/278 |
| 2022/0006339 | A1* | 1/2022 | Takahashi | H02K 3/04 |
| 2022/0263394 | A1* | 8/2022 | Takahashi | H02K 5/225 |
| 2023/0088759 | A1* | 3/2023 | Grimm | H02K 5/225 |
| | | | | 310/71 |
| 2023/0299625 | A1* | 9/2023 | Tsuchiya | H02K 5/203 |
| | | | | 310/156.01 |
| 2023/0396117 | A1* | 12/2023 | Hong | H02K 3/345 |

FOREIGN PATENT DOCUMENTS

| | | | | |
|---|---|---|---|---|
| GB | 2573185 | A * | 10/2019 | H02K 11/25 |
| JP | 2002-345211 | A | 11/2002 | |
| JP | 2004-48823 | A | 2/2004 | |
| JP | 2008-167641 | A | 7/2008 | |
| JP | 2011-176999 | A | 9/2011 | |
| JP | 2013-074656 | A | 4/2013 | |
| JP | 2014-138489 | A | 7/2014 | |
| JP | 2014143841 | A * | 8/2014 | |
| JP | 2014-183615 | A | 9/2014 | |
| JP | 2014-204554 | A | 10/2014 | |
| JP | 2015089298 | A * | 5/2015 | |
| JP | 6390089 | B2 | 9/2018 | |
| JP | 2019-022349 | A | 2/2019 | |
| JP | 2019-180196 | A | 10/2019 | |
| WO | WO-2013149841 | A2 * | 10/2013 | H02K 5/20 |
| WO | 2020/195788 | A1 | 10/2020 | |

OTHER PUBLICATIONS

Translated WO-2013149841-A2 (Year: 2025).*
Apr. 12, 2022 International Search Report issued in International Patent Application No. PCT/JP2022/005462.
Mar. 19, 2024 Extended Search Report issued in European Patent Application No. 22752835.3.
U.S. Appl. No. 18/034,800, filed May 1, 2023 in the name of Yutaka Hotta.
U.S. Appl. No. 18/034,794, filed May 1, 2023 in the name of Yutaka Hotta.

* cited by examiner

VEHICLE DRIVE DEVICE

TECHNICAL FIELD

The present disclosure relates to a vehicle drive device.

BACKGROUND ART

In a configuration including a housing member forming a housing chamber that houses a rotary electric machine, and a cover member covering an opening on one end side of the housing member in an axial direction, there is known a structure in which a power switching element and a smoothing capacitor are disposed between the cover member and the rotary electric machine in the axial direction (see, for example, Patent Document 1).

RELATED ART DOCUMENTS

Patent Documents

Patent Document 1: Japanese Unexamined Patent Application Publication No. 2014-138489 (JP 2014-138489 A)

SUMMARY OF THE DISCLOSURE

Problem to be Solved by the Disclosure

In the related art described above, however, the power switching element and the smoothing capacitor are disposed to overlap each other when viewed in the axial direction. Therefore, the axial size of the vehicle drive device cannot be reduced efficiently.

In view of this, the present disclosure has an object to efficiently reduce the axial size of the vehicle drive device with the power switching element and the smoothing capacitor disposed between the cover member and the rotary electric machine in the axial direction in the configuration including the housing member for the rotary electric machine and the cover member.

Means for Solving the Problem

One aspect of the present disclosure provides a vehicle drive device including: a rotary electric machine including a rotor and a stator;
 a housing member forming a housing chamber that houses the rotary electric machine;
 a cover member connected to one end side of the housing member in an axial direction, facing the rotary electric machine in the axial direction, and including a support portion that rotatably supports the rotor;
 a power switching element electrically connected to a coil of the stator; and
 a smoothing capacitor electrically connected to the power switching element, in which
 the power switching element and the smoothing capacitor are fixed to the cover member and disposed between the cover member and the rotary electric machine in the axial direction, and
 the smoothing capacitor overlaps the power switching element when viewed in a radial direction.

Effects of the Disclosure

According to the present disclosure, it is possible to efficiently reduce the axial size of the vehicle drive device with the power switching element and the smoothing capacitor disposed between the cover member and the rotary electric machine in the axial direction in the configuration including the housing member for the rotary electric machine and the cover member.

MODES FOR CARRYING OUT THE DISCLOSURE

Figure 1:
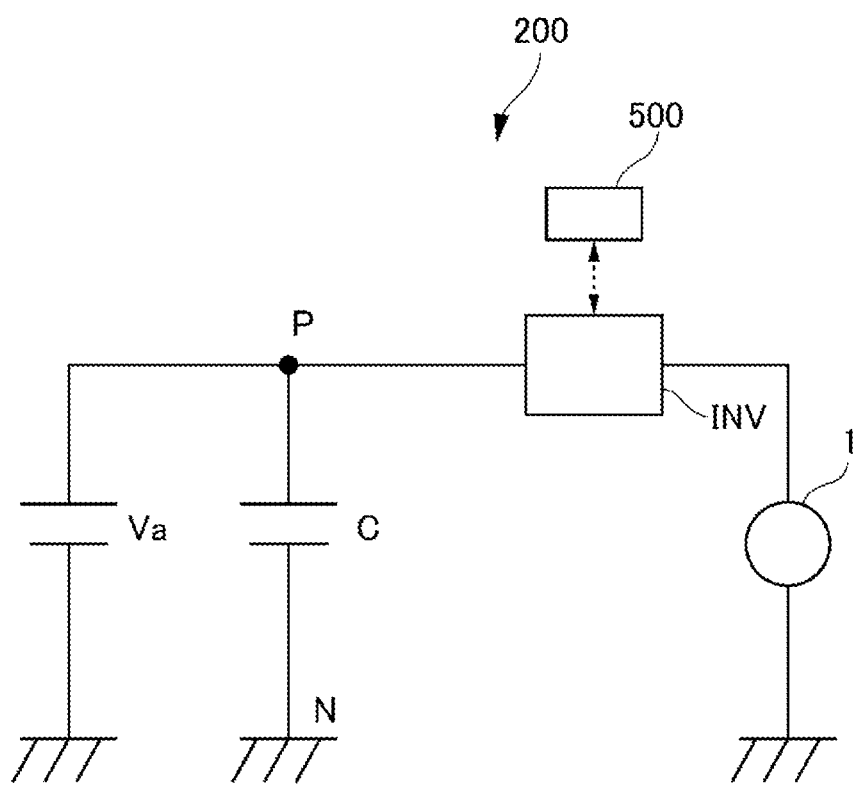
FIG. 1 is a schematic diagram of an example of an electric circuit including a rotary electric machine according to a first embodiment.

Embodiments will be described in detail below with reference to the accompanying drawings. The dimensional ratios in the drawings are merely illustrative, and are not limited to these. The shapes etc. in the drawings may be partially exaggerated for convenience of description.

In the following, an electric system (control system) of a vehicle drive device 10 of the present embodiment and an overall drive system including the vehicle drive device 10 of the present embodiment will be outlined, and then details of the vehicle drive device 10 of the present embodiment will be described.

Electric System of Vehicle Drive Device

FIG. 1 is a schematic diagram of an example of an electric circuit 200 including a rotary electric machine 1 according to the present embodiment. FIG. 1 also shows a control device 500. In FIG. 1, dashed arrows associated with the control device 500 represent exchange of information (signals and data).

The rotary electric machine 1 is driven through control on an inverter INV by the control device 500. In the electric circuit 200 shown in FIG. 1, the rotary electric machine 1 is electrically connected to a power supply Va via the inverter INV. The inverter INV includes, for example, power switching elements (for example, MOSFETs: Metal-Oxide-Semiconductor Field Effect Transistors or IGBTs: Insulated Gate Bipolar Transistors) on a high-potential side and a low-potential side of the power supply Va for each phase. The power switching element on the high-potential side and the power switching element on the low-potential side form upper and lower arms. The inverter INV may include a plurality of sets of upper and lower arms for each phase. Each power switching element may be driven by Pulse Width Modulation (PWM) under the control of the control device 500 so that desired rotational torque is generated. The power supply Va is, for example, a battery with a relatively high rated voltage and may be, for example, a lithium-ion battery or a fuel cell.

In the present embodiment, like the electric circuit 200 shown in FIG. 1, a smoothing capacitor C is electrically connected in parallel with the inverter INV between the high-potential side and the low-potential side of the power supply Va. A plurality of sets of smoothing capacitors C may be electrically connected in parallel with each other between the high-potential side and the low-potential side of the power supply VA A DC-DC converter may be provided between the power supply Va and the inverter INV.

Overall Drive System

Figure 2:
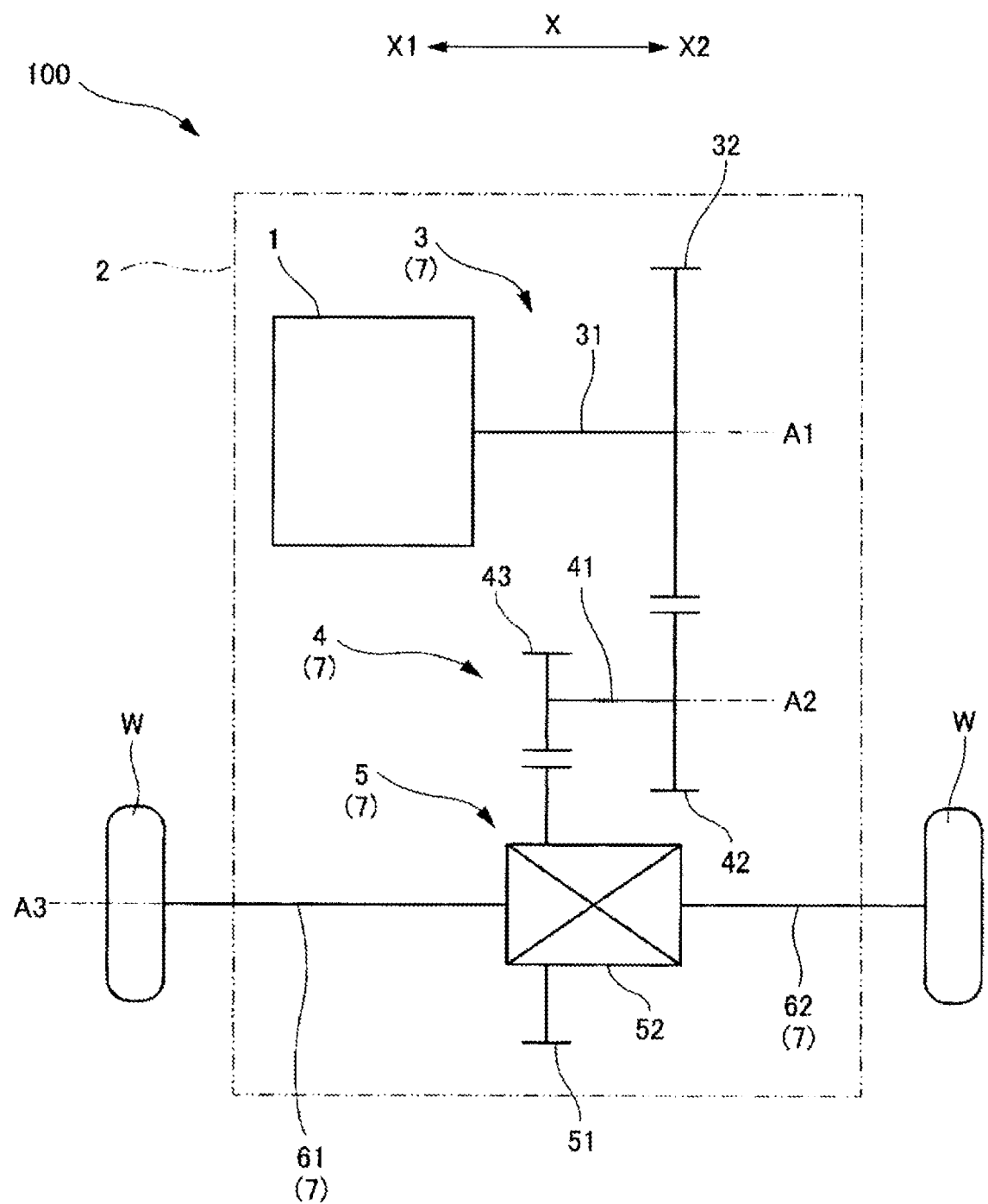
FIG. 2 is a skeleton diagram of a vehicle drive system including the rotary electric machine according to the first embodiment.

FIG. 2 is a skeleton diagram of a vehicle drive system 100 including the rotary electric machine 1. In FIG. 2, an X direction and X1 and X2 sides in the X direction are defined. The X direction is parallel to the direction of a first axis A1 (hereinafter also referred to as "axial direction").

In the example shown in FIG. 2, the vehicle drive system 100 includes the rotary electric machine 1 serving as a driving source for wheels and a drive transmission mechanism 7 provided in a power transmission path connecting the rotary electric machine 1 and wheels W. The drive transmission mechanism 7 includes an input member 3, a counter gear mechanism 4, a differential gear mechanism 5, and left and right output members 61, 62.

The input member 3 includes an input shaft 31 and an input gear 32. The input shaft 31 is a rotating member that rotates about the first axis A1. The input gear 32 is a gear that transmits rotational torque (driving force) from the rotary electric machine 1 to the counter gear mechanism 4. The input gear 32 is connected to the input shaft 31 of the input member 3 so as to rotate integrally with the input shaft 31 of the input member 3.

The counter gear mechanism 4 is disposed between the input member 3 and the differential gear mechanism 5 in the power transmission path. The counter gear mechanism 4 includes a counter shaft 41, a first counter gear 42, and a second counter gear 43.

The counter shaft 41 is a rotating member that rotates about a second axis A2. The second axis A2 extends parallel to the first axis A1. The first counter gear 42 is an input element of the counter gear mechanism 4. The first counter gear 42 meshes with the input gear 32 of the input member 3. The first counter gear 42 is connected to the counter shaft 41 so as to rotate integrally with the counter shaft 41.

The second counter gear 43 is an output element of the counter gear mechanism 4. In the present embodiment, the second counter gear 43 has, for example, a smaller diameter than the first counter gear 42. The second counter gear 43 is connected to the counter shaft 41 so as to rotate integrally with the counter shaft 41.

The differential gear mechanism 5 is disposed on a third axis A3 serving as a rotation axis of the differential gear mechanism 5. The third axis A3 extends parallel to the first axis A1. The differential gear mechanism 5 distributes the driving force transmitted from the rotary electric machine 1 side to the left and right output members 61, 62. The differential gear mechanism 5 includes a differential input gear 51, and the differential input gear 51 meshes with the second counter gear 43 of the counter gear mechanism 4. The differential gear mechanism 5 includes a differential case 52, and the differential case 52 houses a pinion shaft, pinion gears, left and right side gears, etc. The left and right side gears are connected to the left and right output members 61, 62 so as to rotate integrally with the left and right output members 61, 62, respectively.

The left and right output members 61, 62 are drivingly connected to the left and right wheels W, respectively. Each of the left and right output members 61, 62 transmits the driving force distributed by the differential gear mechanism 5 to the wheel W. The left and right output members 61, 62 may be each composed of two or more members.

The rotary electric machine 1 thus drives the wheels W via the drive transmission mechanism 7. In another embodiment, the rotary electric machine 1 may be disposed inside a wheel as a wheel-in motor. In this case, the vehicle drive system 100 need not include the drive transmission mechanism 7. In still another embodiment, a plurality of rotary electric machines 1 that shares a part or the whole of the drive transmission mechanism 7 may be provided.

Details of Vehicle Drive Device

The vehicle drive device 10 includes the rotary electric machine 1 described above, a case 2, and a motor drive device 8.

Figure 3A:
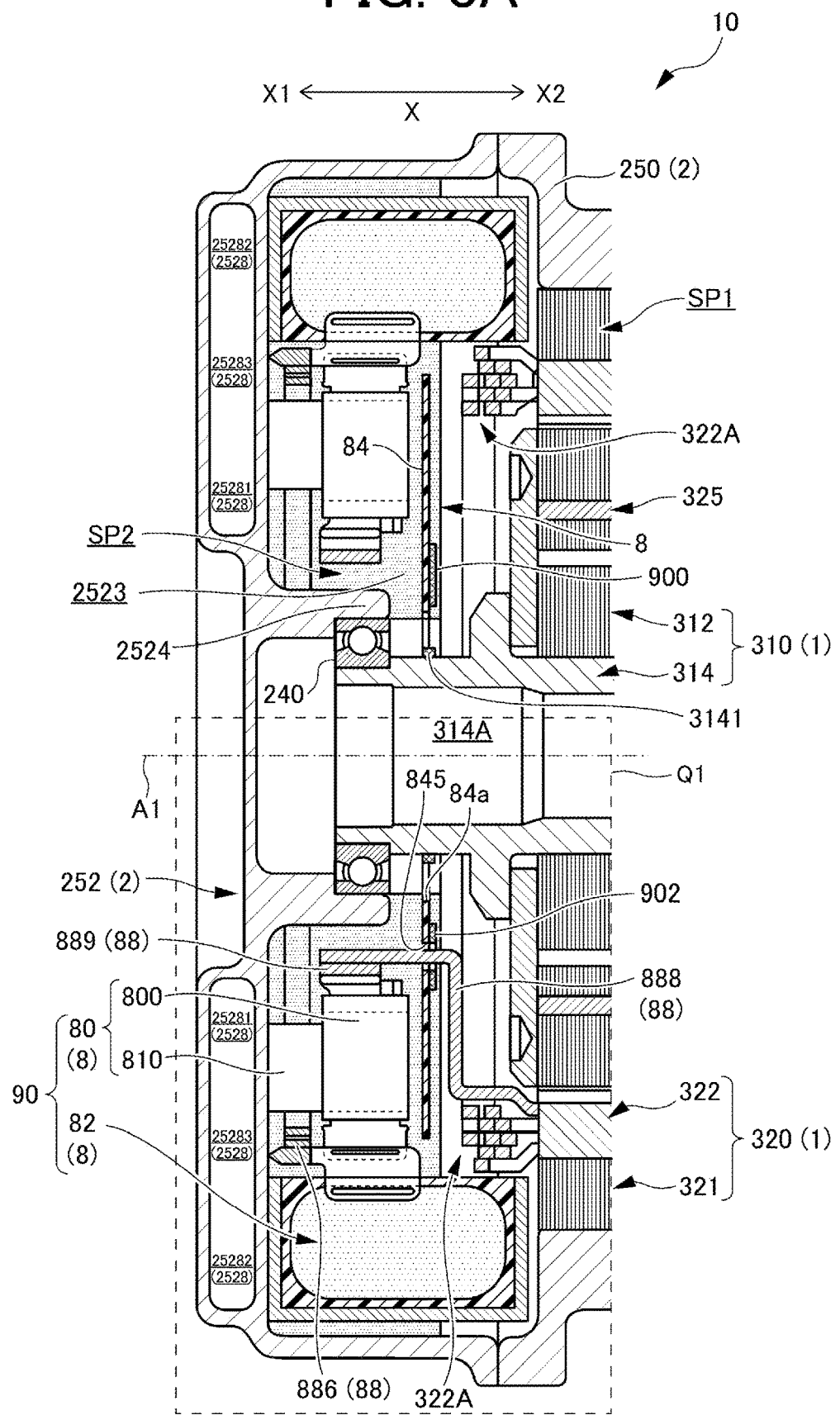
FIG. 3A is a sectional view schematically showing a main part of a vehicle drive device according to the first embodiment.
Figure 3B:
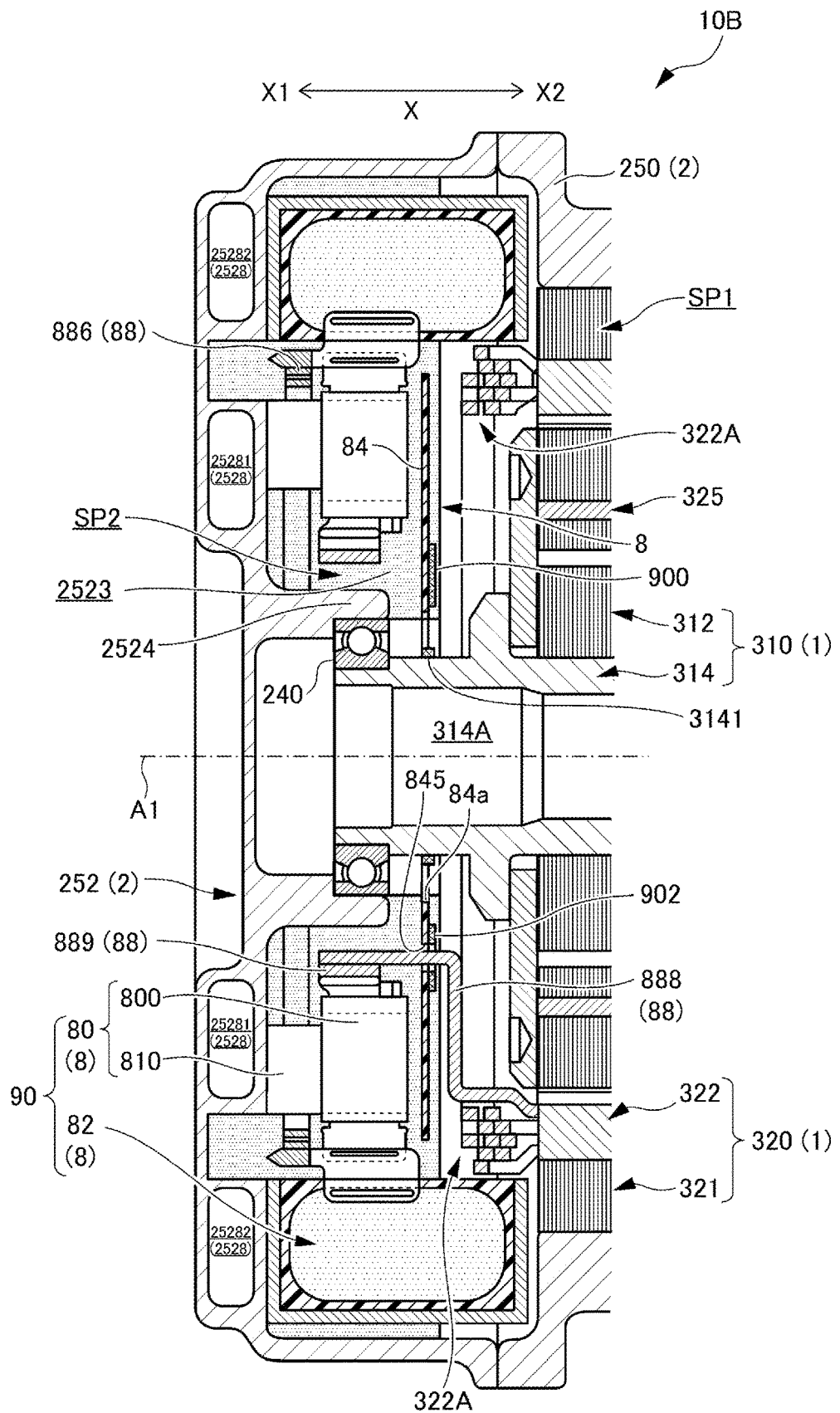
FIG. 3B is another sectional view schematically showing a coolant channel structure.
Figure 3C:
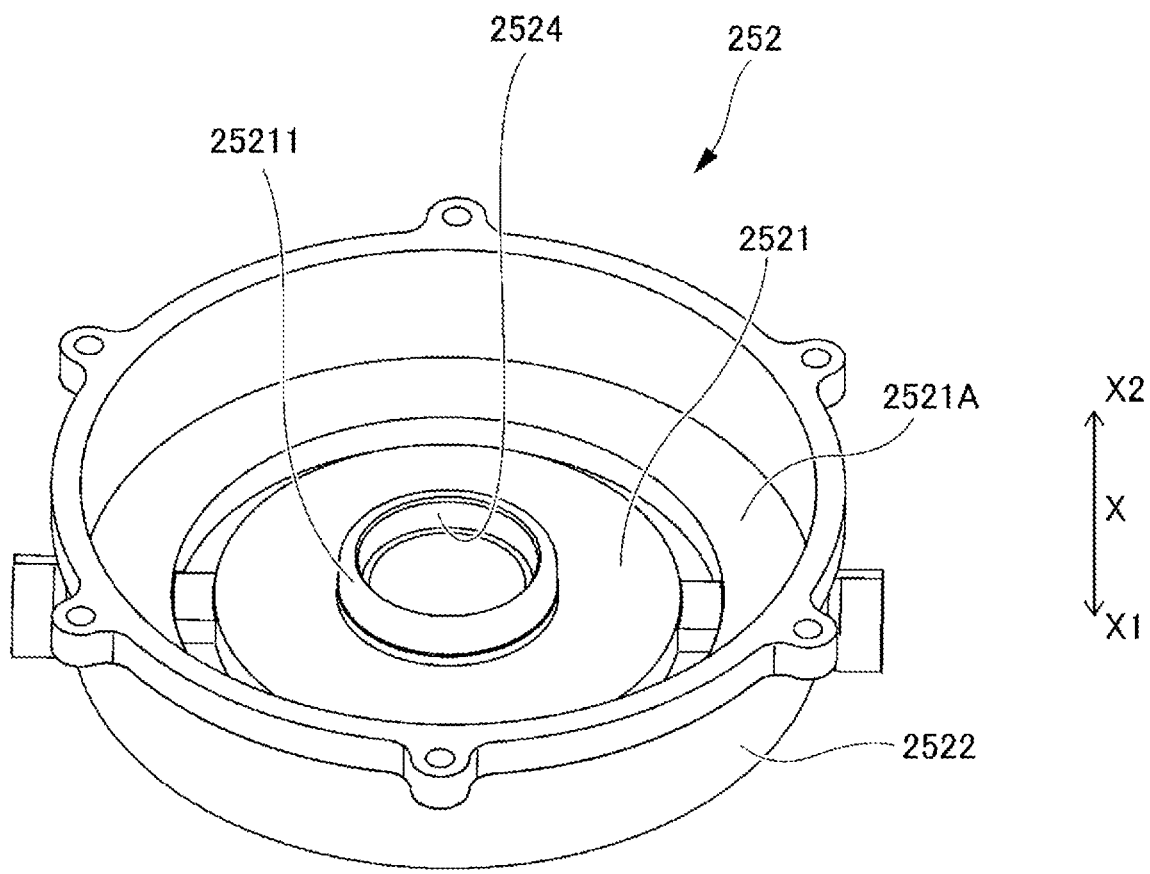
FIG. 3C is a perspective view of a cover member viewed from an X2 side.
Figure 3D:
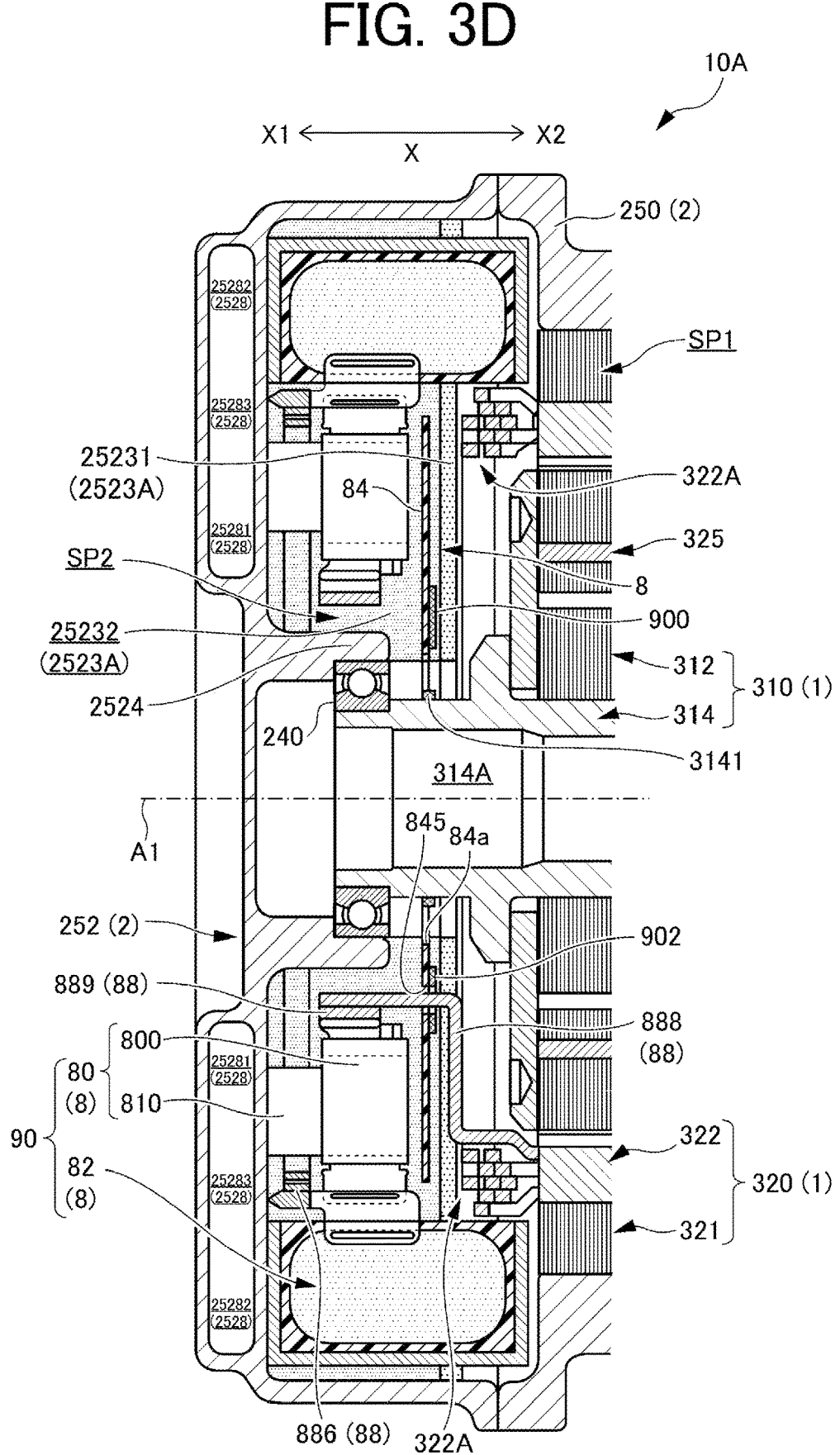
FIG. 3D is a schematic sectional view illustrating a layered structure of a molded resin portion according to a modification.
Figure 4:
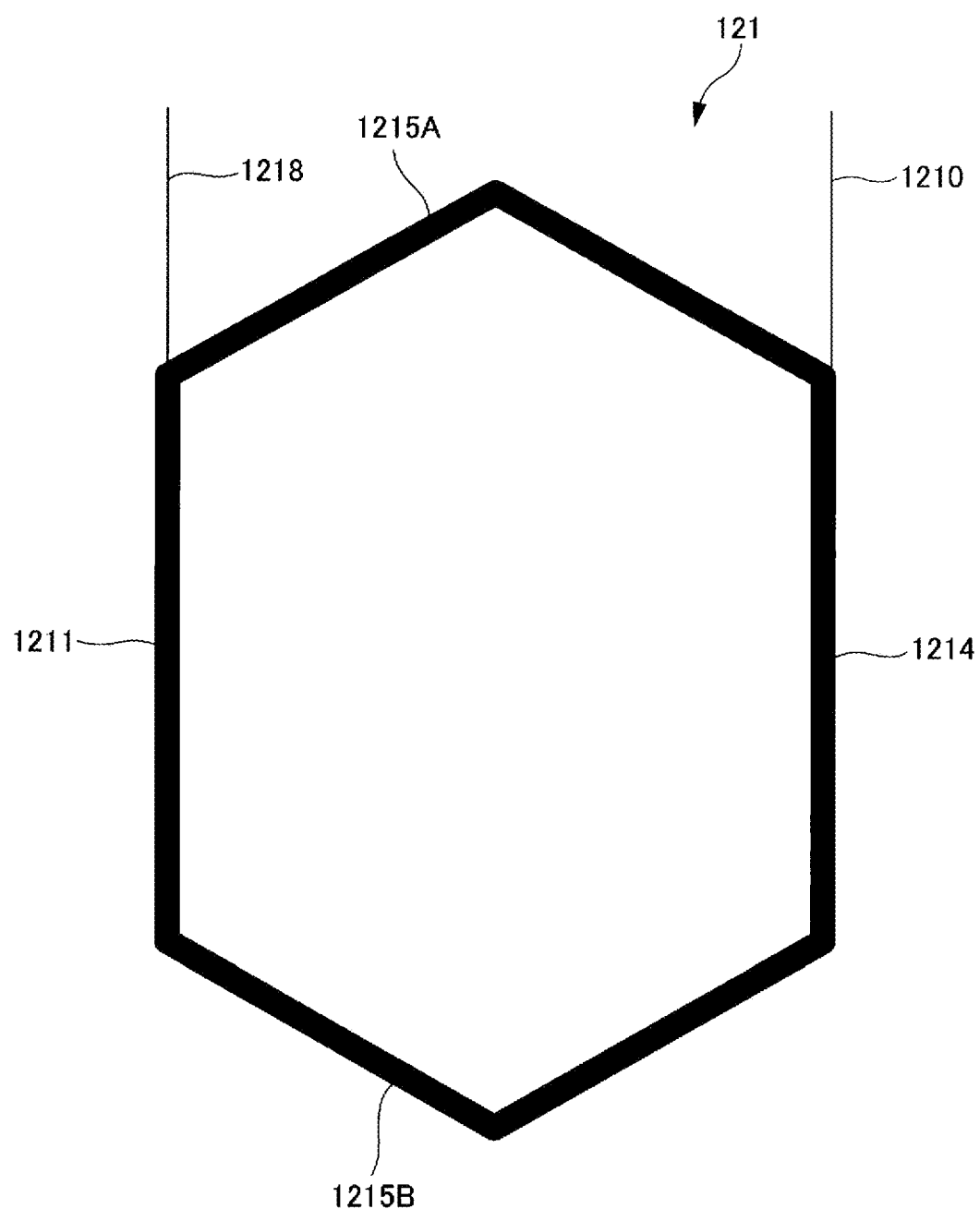
FIG. 4 is a diagram schematically showing an example of a coil side forming a stator coil.

FIG. 3A is a sectional view schematically showing a main part of the vehicle drive device 10 according to the present embodiment. FIG. 3A is a sectional view taken along a plane including the first axis A1 that is a rotation axis of the rotary electric machine 1, and shows a part of the rotary electric machine 1 on one axial end side (X1 side). In the following description, an axial direction refers to a direction in which the first axis A1 that is the rotation axis of the rotary electric machine 1 extends, and a radial direction refers to a radial direction about the first axis A1, unless otherwise specified. Therefore, a radially outer side refers to a side away from the first axis A1, and a radially inner side refers to a side toward the first axis A1. A circumferential direction corresponds to a rotation direction about the first axis A1. In FIG. 3A, the X direction and the X1 and X2 sides in the X direction are defined as in FIG. 2. In the following description, the terms "X1 side" and "X2 side" may be used to describe relative positional relationships. FIG. 3B is another sectional view of the vehicle drive device 10 (sectional view taken along a line different from that of FIG. 3A), for schematically showing a coolant channel structure. FIG. 3C is a perspective view of a cover member 252 viewed from the X2 side. FIG. 3D is a schematic sectional view illustrating a layered structure of a molded resin portion 2523A according to a modification. FIG. 4 is a diagram schematically showing an example of a coil side 121 forming a stator coil 322.

The vehicle drive device 10 is mounted on a vehicle as a part of the vehicle drive system 100, and as described above, generates a driving force for causing the vehicle to travel forward or rearward. The vehicle may be in any form. For example, the vehicle may be a four-wheeled automobile, or may be a bus, a truck, a two-wheeled vehicle, or construction equipment. The vehicle drive device 10 may be mounted on the vehicle together with another driving source (for example, an internal combustion engine).

The rotary electric machine 1 includes a rotor 310 and a stator 320. FIG. 3A shows a part of the rotary electric machine 1 on one axial end side (X1 side). The rotary electric machine 1 is of an inner rotor type, and the stator 320 is provided so as to surround the radially outer side of the rotor 310. That is, the rotor 310 is disposed on the radially inner side of the stator 320.

The rotor 310 includes a rotor core 312 and a shaft portion 314.

The rotor core 312 may be made of, for example, magnetic stacked steel sheets having an annular shape. Permanent magnets 325 may be embedded in the rotor core 312. Alternatively, the permanent magnets 325 may be attached to the outer peripheral surface of the rotor core 312. The permanent magnets 325 may be arranged as appropriate. The rotor core 312 is fixed to the outer peripheral surface of the shaft portion 314 and rotates integrally with the shaft portion 314.

The shaft portion 314 defines the first axis A1 that is the rotation axis of the rotary electric machine 1. The shaft portion 314 is rotatably supported by the cover member 252 (described later) of the case 2 via a bearing 240 on the X1 side of a part where the rotor core 312 is fixed. The shaft portion 314 is rotatably supported by the case 2 via a bearing associated with the bearing 240 on the other axial end side (X2 side) of the rotary electric machine 1. In this manner, the shaft portion 314 may be rotatably supported by the case 2 at both axial ends.

The shaft portion 314 is shaped, for example, as a hollow pipe and has a hollow interior 314A. The hollow interior 314A may extend over the overall axial length of the shaft portion 314. The hollow interior 314A can function as an axial oil passage. In this case, the shaft portion 314 may have an oil hole for discharging oil to a coil end portion 322A of the stator 320 or the like.

The shaft portion 314 includes, on the X1 side of the part where the rotor core 312 is fixed, a detected portion 3141 related to a rotation angle sensor 900 for acquiring rotation angle information of the rotor 310. The rotation angle sensor 900 may be, for example, a rotary encoder using a sensor element such as a Hall element or a magnetoresistive element. In the present embodiment, the detected portion 3141 is provided to adjoin the bearing 240 on the X2 side in the axial direction. When the sensor element of the rotation angle sensor 900 is the Hall element, the detected portion 3141 may be realized by a permanent magnet provided on the outer peripheral portion of the shaft portion 314. In this case, the permanent magnets may be disposed so that the magnetic pole of the outer peripheral portion of the shaft portion 314 changes periodically along the circumferential direction, and a plurality of the sensor elements of the rotation angle sensor 900 may be disposed at equal pitches around the first axis A1 so as to face the detected portions 3141 in the radial direction. The detected portion 3141 may be shaped as a ring attached to the shaft portion 314, or may be formed integrally with the shaft portion 314.

The stator 320 includes a stator core 321 and the stator coil 322.

The stator core 321 is made of, for example, magnetic stacked steel sheets having an annular shape. Teeth (not shown) protruding radially inward are radiately formed on the inner peripheral portion of the stator core 321.

The stator coil 322 may be formed, for example, such that an insulating coating is applied to a conductor having a rectangular cross section or a circular cross section. The stator coil 322 is wound around the teeth (not shown) of the stator core 321. For example, the stator coil 322 may be electrically connected by star connection or by delta connection in one or more parallel relationships.

The stator coil 322 includes the coil end portions 322A that are portions protruding axially outward from slots of the stator core 321. For example, the stator coil 322 may be realized by attaching a plurality of coil sides 121 shown in FIG. 4 to the stator core 321. In the example shown in FIG. 4, the coil side 121 includes slot insertion portions 1211, 1214 inserted into two slots, crossover portions 1215A, 1215B, and ends 1210, 1218. In this case, the crossover portions 1215A, 1215B and the ends 1210, 1218 form the coil end portions 322A. The stator coil 322 may be a coil in another form, such as a coil in a form other than a cassette coil. In the following description, unless otherwise specified, the coil end portion 322A refers to a portion of the stator coil 322 that extends on one axial end side (X1 side) that is a lead side out of the portions that extend along the circumferential direction on both axial sides of the stator core 321.

The case 2 may be made of, for example, aluminum. The case 2 can be formed by casting or the like. The case 2 includes a motor case 250 and the cover member 252. The case 2 houses the rotary electric machine 1 and the motor drive device 8. In the case of the vehicle drive system 100 shown in FIG. 2, the case 2 may further house the drive transmission mechanism 7 as schematically shown in FIG. 2.

The motor case 250 forms a motor housing chamber SP1 that houses the rotary electric machine 1. The motor housing chamber SP1 may be an oil-tight space containing oil for cooling and/or lubricating the rotary electric machine 1 (and/or the drive transmission mechanism 7). The motor case 250 includes a peripheral wall portion that surrounds the radially outer side of the rotary electric machine 1. The motor case 250 may be realized by connecting a plurality of members. The motor case 250 may be integrated with another case member that houses the drive transmission mechanism 7 on the other axial end side (X2 side).

The cover member 252 is connected to one axial end side (X1 side) of the motor case 250. The cover member 252 is shaped as a cover that covers one axial end side (X1 side) of the motor housing chamber SP1. In this case, the cover member 252 may cover the motor case 250 so as to close the opening of the motor case 250 on one axial end side (X1 side) completely or substantially completely.

The cover member 252 forms an inverter housing chamber SP2 that houses the motor drive device 8. A part of the inverter housing chamber SP2 may be formed by the motor case 250, and conversely, a part of the motor housing chamber SP1 may be formed by the cover member 252.

The cover member 252 supports the motor drive device 8. For example, the motor drive device 8 may be attached to the cover member 252 in the form of a module described later. Thus, the cover member 252 and the motor case 250 can be connected after a part or the whole of the motor drive device 8 is attached to the cover member 252, thereby improving the ease of assembly of the motor drive device 8.

The cover member 252 is provided with the bearing 240 that rotatably supports the rotor 310. That is, the cover member 252 includes a bearing support portion 2524 that supports the bearing 240. The bearing support portion 2524 refers to the entire portion of the cover member 252 in an axial range in which the bearing 240 is provided.

As shown in FIG. 3A, the bearing 240 is provided on the radially outer side at the end of the shaft portion 314 on the X1 side. Specifically, the bearing 240 is supported by the cover member 252 on the radially outer side of an outer race and supported by the outer peripheral surface of the shaft portion 314 on the radially inner side of an inner race. In a modification, the bearing 240 may conversely be supported by the cover member 252 on the radially inner side of the inner race and supported by the inner peripheral surface of the shaft portion 314 on the radially outer side of the outer race.

In the present embodiment, as shown in FIGS. 3A and 3C, the cover member 252 includes annular bottom portions 2521, 2521A centered on the first axis A1, and a peripheral wall portion 2522 protruding to the other axial end side (X2 side) from the inner peripheral edge of the bottom portion 2521. The bottom portion 2521 and the peripheral wall portion 2522 define the inverter housing chamber SP2. A cylindrical portion 25211 protruding to the other axial end side (X2 side) is formed at the central portion (portion centered on the first axis A1) of the bottom portion 2521 on the other axial end side (X2 side). The bearing support portion 2524 is set in the cylindrical portion 25211. The cylindrical portion 25211 is formed concentrically around the first axis A1. A first coolant channel 25281 and a second coolant channel 25282 described later may be formed in the bottom portions 2521, 2521A, respectively.

The inverter housing chamber SP2 may be a space, and is preferably sealed with a resin containing a filler having relatively high heat conductivity. That is, the cover member 252 preferably includes a heat conductive molded resin portion 2523. In this case, the molded resin portion 2523 can have a function of sealing and supporting the motor drive device 8 described later, a function of protecting the motor drive device 8 from oil in the motor housing chamber SP1, and a function of transferring heat from the motor drive device 8 to the cover member 252. In FIG. 3A, elements (such as block assemblies 90 described later) sealed in the molded resin portion 2523 are shown in a see-through fashion. The formation range of the molded resin portion 2523 is not limited to the range shown in FIG. 3A and the like. The molded resin portion 2523 may extend from the bottom portion 2521 side shorter to a portion on the X1 side or may extend further to the X2 side.

As in the molded resin portion 2523A of a vehicle drive device 10A according to the modification shown in FIG. 3D, a layered structure made of a plurality of resin materials may be provided. Specifically, the molded resin portion 2523A has a layered structure in the axial direction, including a first resin layer 25231 and a second resin layer 25232. In this case, the first resin layer 25231 is preferably disposed closer to the rotary electric machine 1 than the second resin layer 25232 in the axial direction (that is, on the X2 side) and has lower heat conductivity than the second resin layer 25232. For example, the first resin layer 25231 may be made of a resin material having relatively high heat insulation (for example, a foamed resin material), and the second resin layer 25232 may be made of a resin material having relatively high heat conductivity (for example, a resin material containing a metal filler). According to the molded resin portion 2523A, it is possible to efficiently transfer heat from the motor drive device 8 to the cover member 252 while suppressing heat reception from the coil end portion 322A by the motor drive device 8. In this case, the cooling of the coil end portion 322A may be realized by another cooling system (for example, an oil passage and/or a coolant channel in the motor case 250).

The molded resin portion 2523 also has a function of fixing the motor drive device 8 including capacitor modules 82 and the like described later to the cover member 252. In this case, the molded resin portion 2523 may be formed so as to seal the entire capacitor modules 82.

The cover member 252 is preferably made of a material having relatively high heat conductivity (for example, aluminum), and has a coolant channel 2528 inside. Water flows through the coolant channel 2528 as a coolant. The water may be water containing, for example, Long Life Coolant (LLC). In this case, the coolant flowing through the coolant channel 2528 can be maintained at a relatively low temperature by dissipating heat from a radiator (not shown) mounted on the vehicle. When the coolant flows through the coolant channel 2528 of the cover member 252, the coolant takes away the heat of the cover member 252 to cool the cover member 252. Thus, the cover member 252 can have a function of cooling the motor drive device 8 disposed to adjoin the cover member 252 in the axial direction. That is, the heat from the motor drive device 8 is taken away by the coolant via the cover member 252, and the cooling of the motor drive device 8 is promoted. Such a cooling function can further be enhanced by the molded resin portion 2523 described above. In a modification, another cooling medium (for example, oil) may be used instead of the coolant.

The coolant channel 2528 may have any shape when viewed in the axial direction, such as an annular shape, a spiral shape, or a shape in which the coolant channel 2528 extends along the circumferential direction while meandering radially outward and inward. Fins or the like may be formed in the coolant channel 2528. When the cover member 252 is manufactured by using a core or the like, the degree of freedom can be increased in terms of the shape of the coolant channel 2528.

In the present embodiment, as shown in FIG. 3B, the coolant channel 2528 includes the first coolant channel 25281 and the second coolant channel 25282. The first coolant channel 25281 has an annular shape when viewed in the axial direction, and faces power modules 80 (described later) when viewed in the axial direction. Thus, the power modules 80 can be cooled over the entire circumference of the first coolant channel 25281. The second coolant channel 25282 has an annular shape when viewed in the axial direction, and faces the capacitor modules 82 (described later) when viewed in the axial direction. Thus, the capacitor modules 82 can be cooled over the entire circumference of the second coolant channel 25282. The first coolant channel 25281 and the second coolant channel 25282 communicate with each other through a radial connection channel 25283 (see FIG. 3A). The first coolant channel 25281 is preferably disposed on an upstream side (closer to a discharge side of a water pump (not shown)) from the second coolant channel 25282. That is, an inlet portion (inlet portion formed in the cover member 252) (not shown) to the coolant channel 2528 is preferably connected to the first coolant channel 25281. According to such a configuration, submodules 800 (power semiconductor chips 801, 802) (described later) of the power modules 80 that are likely to increase in temperature than the capacitor modules 82 can efficiently be cooled by the coolant (relatively fresh coolant) in the first coolant channel 25281 on the upstream side from the second coolant channel 25282.

The motor drive device 8 includes, for example, the inverter INV, the smoothing capacitor C, and the control device 500 described above. Details of the elements of the motor drive device 8 are described later with reference to FIGS. 6 to 13.

As shown in FIG. 3A, the motor drive device 8 is disposed between the cover member 252 and the rotary electric machine 1 in the axial direction. That is, the motor drive device 8 is disposed in the inverter housing chamber SP2.

Figure 5:
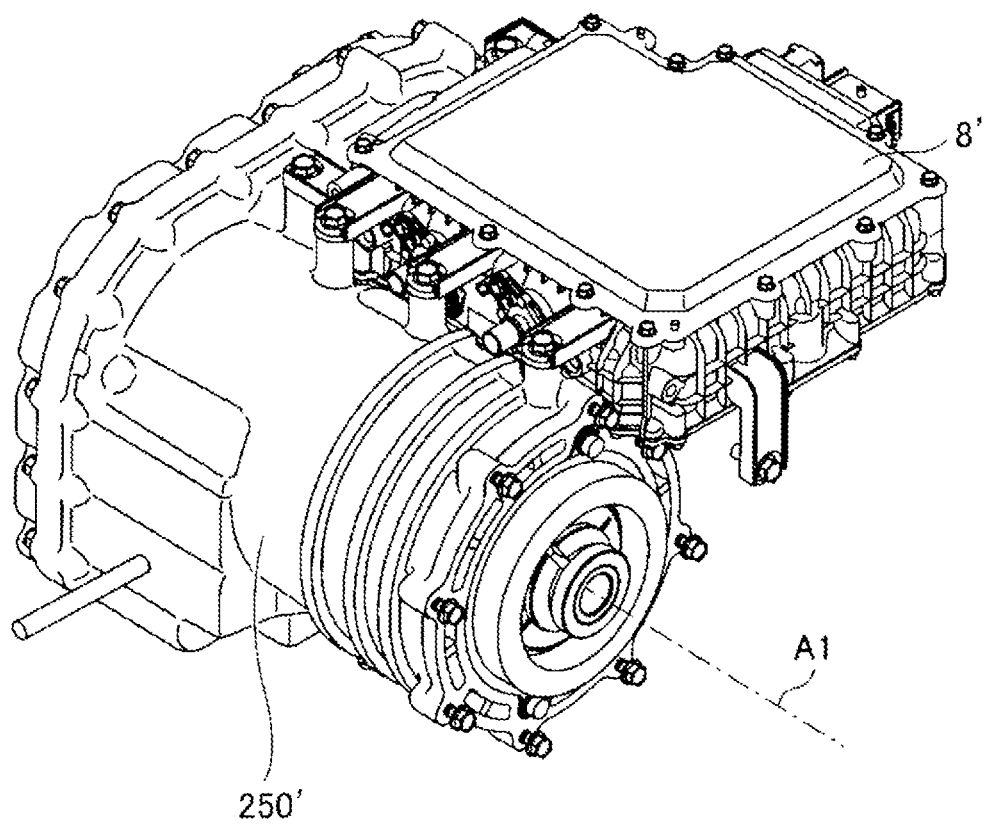
FIG. 5 is a diagram illustrating a comparative example.

According to the present embodiment, the motor drive device 8 is disposed between the cover member 252 and the rotary electric machine 1. Thus, the overall size of the vehicle drive device 10 can be reduced compared with a case where a motor drive device 8' is mounted outside a motor case 250' (see FIG. 5).

In particular, according to the present embodiment, the axial size of the vehicle drive device 10 can be reduced by providing the bearing support portion 2524 on the cover member 252 and disposing the motor drive device 8 between the cover member 252 and the rotary electric machine 1 in the axial direction. Specifically, when the motor drive device 8 is provided on the X1 side of the cover member 252 in the axial direction, a separate cover member is required to cover the X1 side of the motor drive device 8.

Accordingly, the axial size of the vehicle drive device 10 is likely to increase. In this regard, according to the present embodiment, the cover member 252 can function as the cover on the X1 side not only for the rotary electric machine 1 but also for the motor drive device 8. Thus, the axial size of the vehicle drive device 10 can be reduced.

In the present embodiment, the bearing support portion 2524 of the cover member 252 is disposed on the radially inner side of the motor drive device 8 (power modules 80, capacitor modules 82, and the like described later) when viewed in the axial direction, and overlaps the motor drive device 8 when viewed in the radial direction. Therefore, the motor drive device 8 can be disposed between the cover member 252 and the rotary electric machine 1 in the axial direction while reducing the axial dimension of the cover member 252 (dimension from the bearing support portion 2524 to the X2 side). As a result, the axial size of the vehicle drive device 10 can be reduced more effectively.

According to the present embodiment, a bracket having a bearing support portion associated with the bearing support portion 2524 is not provided between the motor drive device 8 and the rotary electric machine 1 in the axial direction. Therefore, the number of components can be reduced and the axial distance between the motor drive device 8 and the rotary electric machine 1 can be shortened compared with the configuration in which such a bracket is provided. Thus, the axial size of the vehicle drive device 10 can be reduced as described above. Since there is no wall portion (bracket) separating the motor drive device 8 and the rotary electric machine 1 in the axial direction, the wiring length between the motor drive device 8 and the rotary electric machine 1 can be shortened, thereby increasing the wiring efficiency between the motor drive device 8 and the rotary electric machine 1.

According to the present embodiment, when the coolant channel 2528 is formed in the cover member 252, the cover member 252 can thermally be connected to the motor drive device 8 (connected to allow heat conduction). That is, the motor drive device 8 can be cooled by the coolant in the coolant channel 2528 via the cover member 252. Since the coolant can stably flow through the coolant channel 2528, the cooling of the motor drive device 8 can be stabilized. If the flow rate of the coolant can be controlled, the cooling can be optimized depending on the state of the motor drive device 8.

According to the present embodiment, not only the motor drive device 8 but also a part of the rotary electric machine 1 can be cooled by the cover member 252 (cover member 252 having the coolant channel 2528) by shortening the axial distance between the motor drive device 8 and the rotary electric machine 1. For example, the molded resin portion 2523 described above may thermally be connected to the stator coil 322 of the rotary electric machine 1. Specifically, the molded resin portion 2523 is brought into abutment against or close to the coil end portion 322A of the rotary electric machine 1. Thus, the coil end portion 322A can be cooled by the coolant in the coolant channel 2528 via the molded resin portion 2523 and the cover member 252.

Next, a specific example of the motor drive device 8 will be described with reference to FIGS. 6 to 13.

Figure 6:
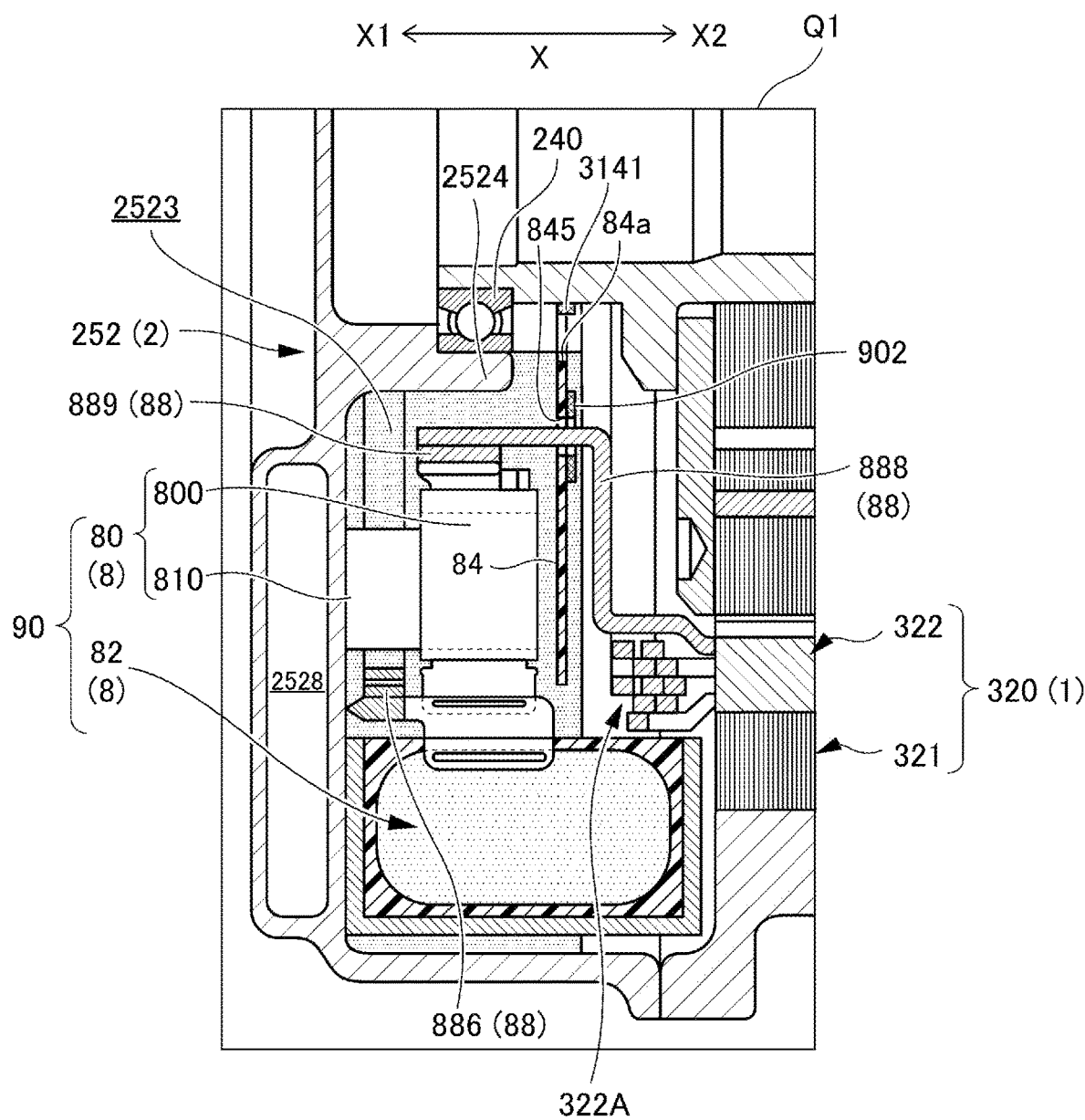
FIG. 6 is an enlarged view of a Q1 portion of FIG. 3A.
Figure 7:
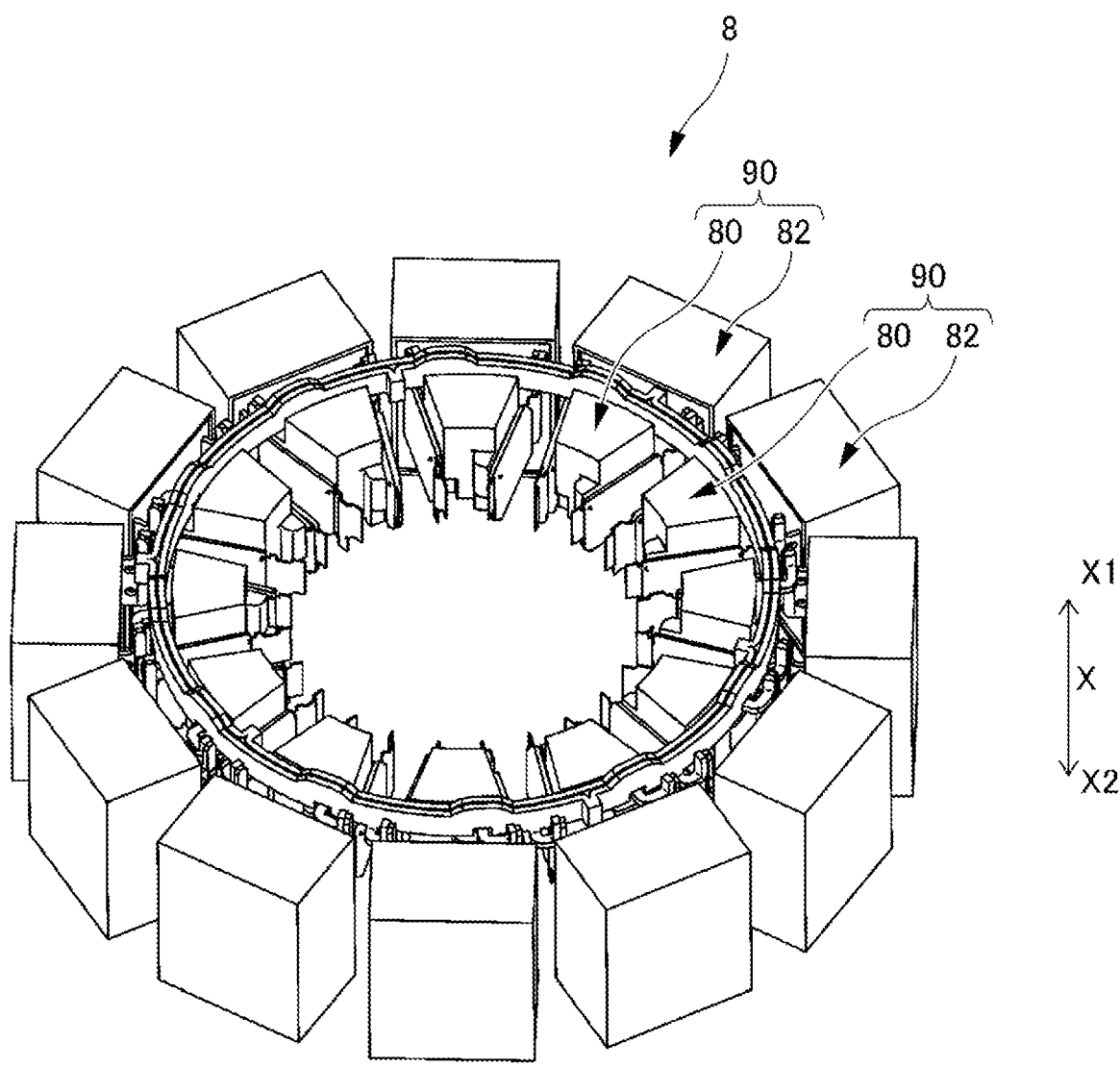
FIG. 7 is a perspective view of a motor drive device according to the first embodiment when viewed from an X1 side.
Figure 8:
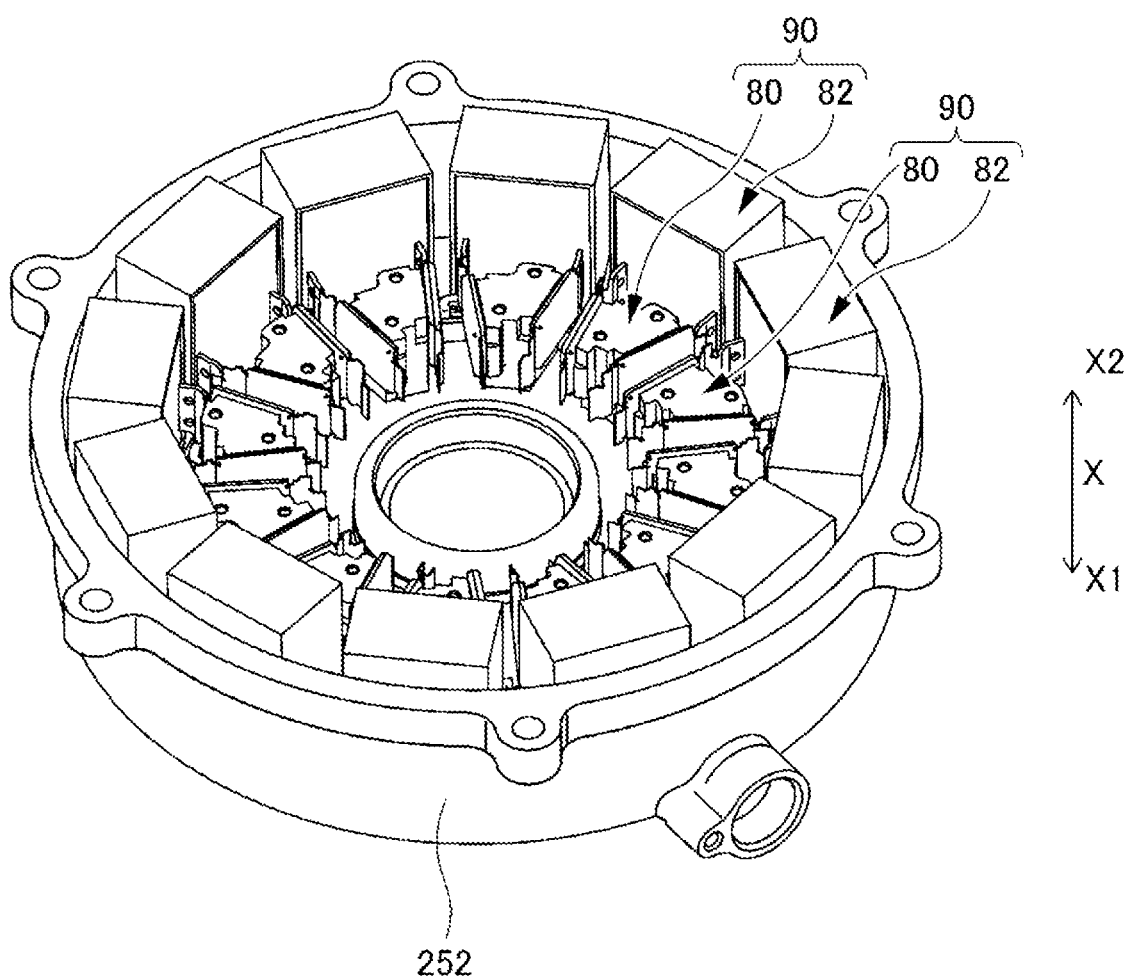
FIG. 8 is a perspective view of power modules and capacitor modules disposed on the cover member according to the first embodiment when viewed from the X2 side.
Figure 9:
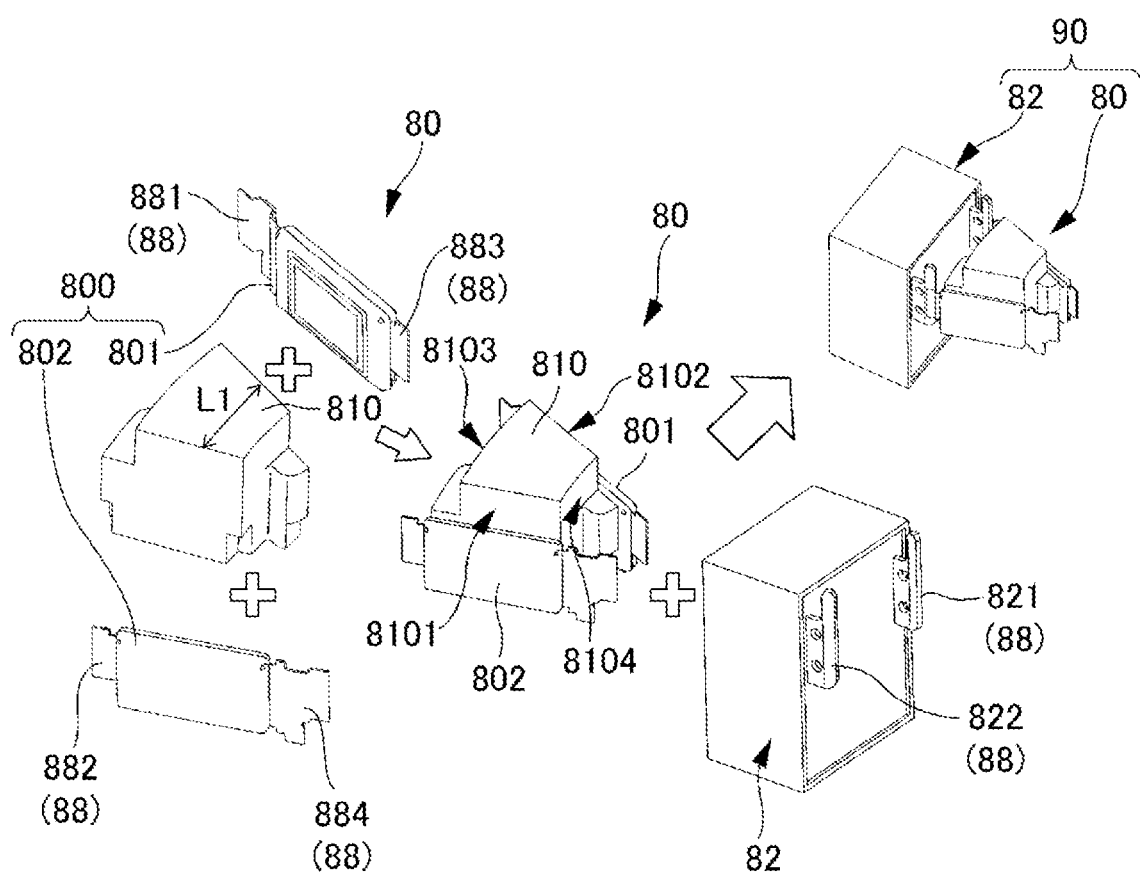
FIG. 9 is a diagram illustrating the configuration of the power module and the capacitor module and the ease of assembly according to the first embodiment.
Figure 10:
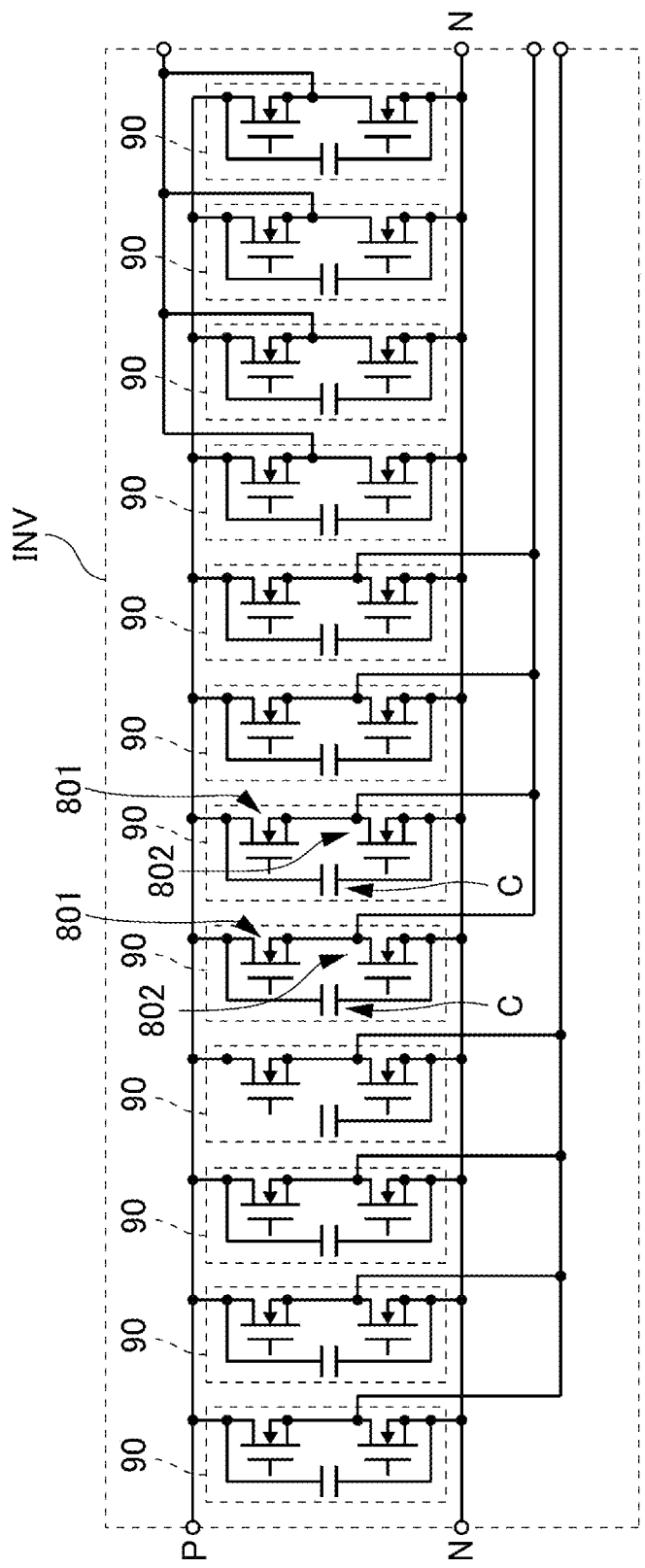
FIG. 10 is a diagram illustrating an electric circuit formed by block assemblies according to the first embodiment.
Figure 11:
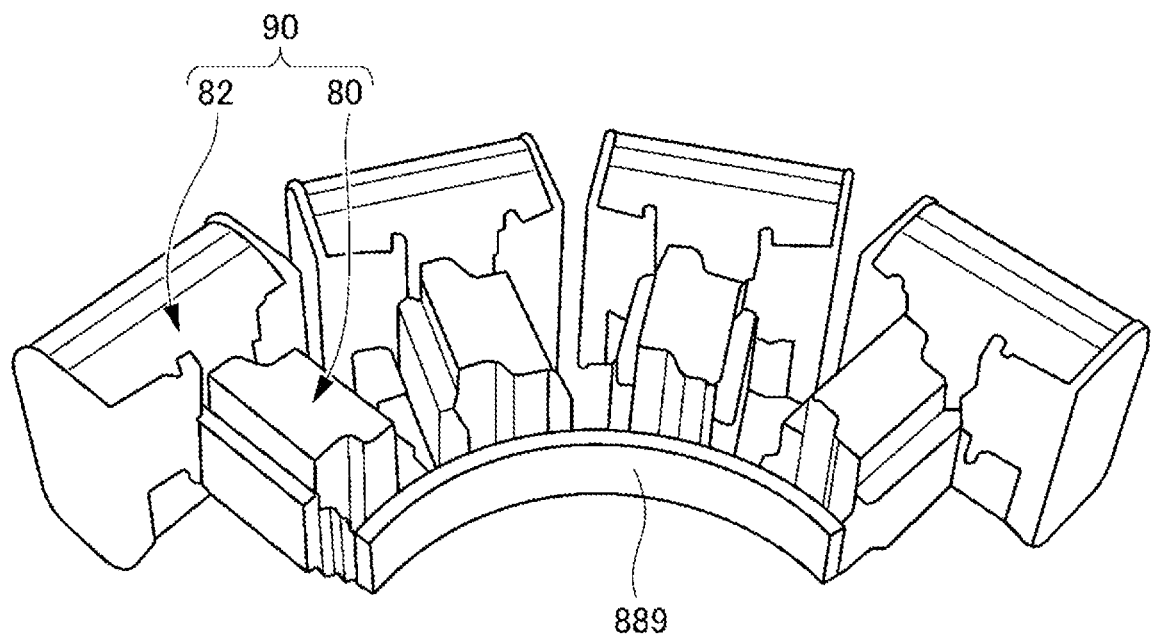
FIG. 11 is a schematic diagram showing an example of an electrical connection method between the rotary electric machine and the block assemblies according to the first embodiment.
Figure 12:
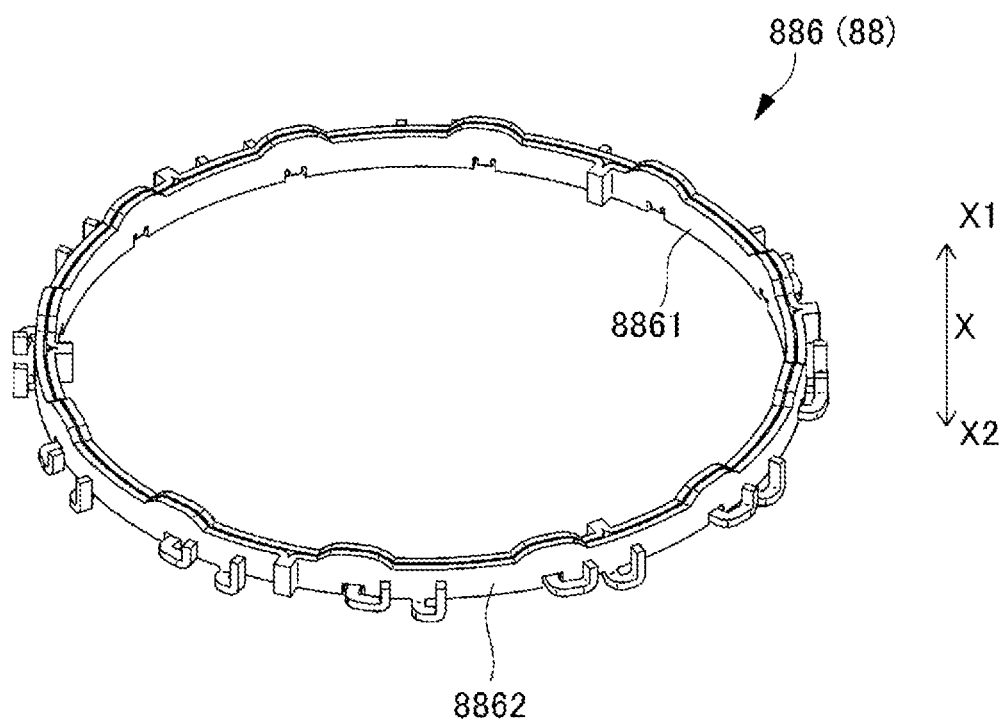
FIG. 12 is a perspective view of a power supply busbar in a wiring portion of the motor drive device according to the first embodiment when viewed from the X1 side.
Figure 13:
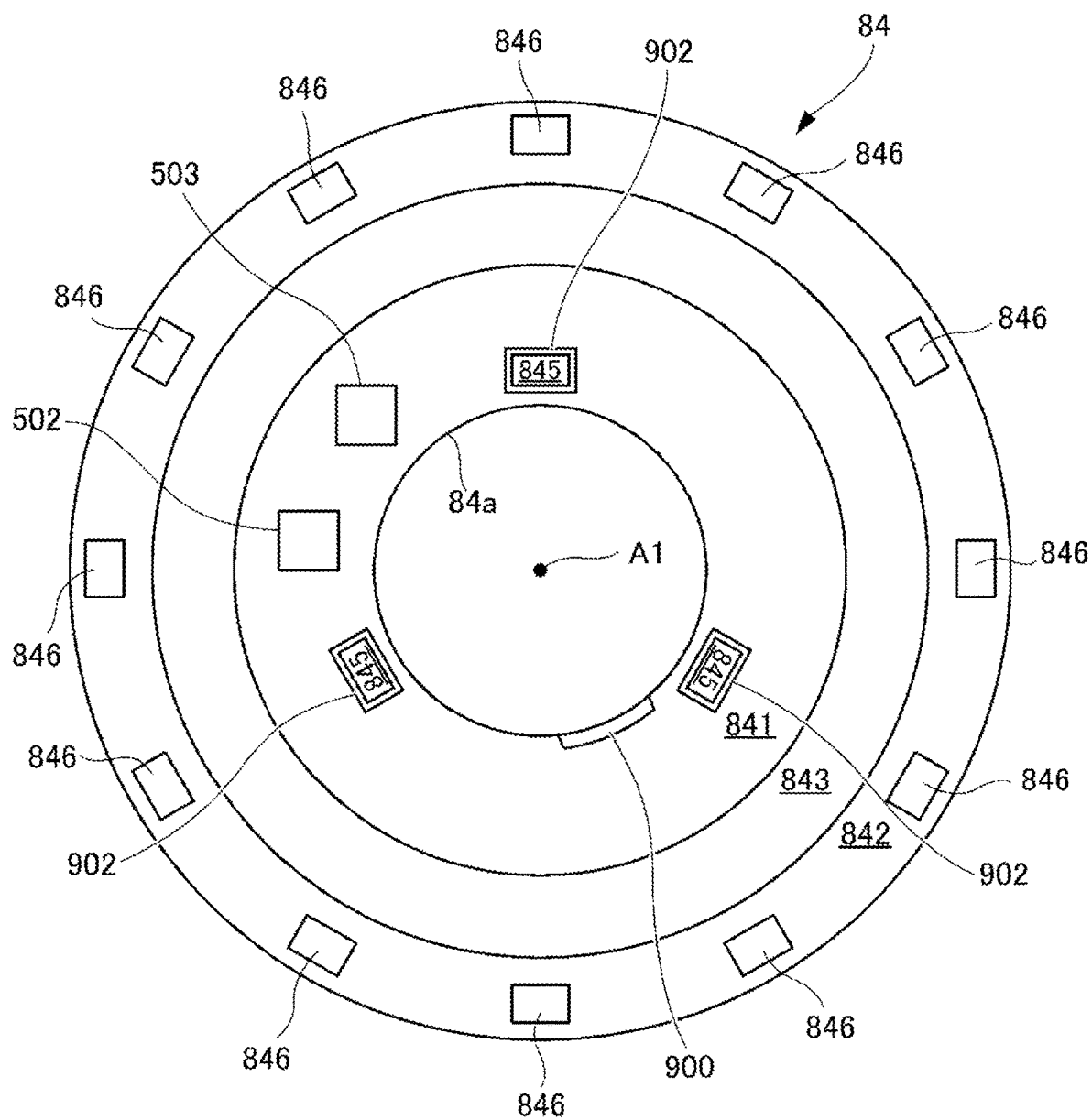
FIG. 13 is a plan view schematically showing a control board according to the first embodiment.

FIG. 6 is an enlarged view of a Q1 portion of FIG. 3A. FIG. 7 is a perspective view of the motor drive device 8 viewed from the X1 side. FIG. 8 is a perspective view of the power modules 80 and the capacitor modules 82 disposed on the cover member 252 when viewed from the X2 side. FIG. 9 is a diagram illustrating the configuration of the power module 80 and the capacitor module 82 and the ease of assembly. FIG. 10 is a diagram illustrating an electric circuit formed by the block assemblies 90. FIG. 11 is a schematic diagram showing an example of an electrical connection method between the rotary electric machine 1 and the block assemblies 90. FIG. 12 is a perspective view of a power supply busbar 886 in a wiring portion 88 of the motor drive device 8 when viewed from the X1 side. FIG. 13 is a plan view schematically showing a control board 84.

The motor drive device 8 includes the power modules 80, the capacitor modules 82, the control board 84, and the wiring portion 88. In FIG. 7, illustration of the control board 84 and a part of the wiring portion 88 (lead wire 888, relay busbar 889, etc.) is omitted.

In the present embodiment, as shown in FIG. 7, a plurality of sets of the power modules 80 and the capacitor modules 82 (12 sets in the example shown in FIG. 7) is disposed along the circumferential direction. The number of sets of the power modules 80 and the capacitor modules 82 is changed depending on the specifications of the rotary electric machine 1. The power of the rotary electric machine 1 basically increases as the number of sets of the power modules 80 and the capacitor modules 82 increases. Therefore, a plurality of variations with different numbers of sets of the power modules 80 and the capacitor modules 82 can be set when designing the rotary electric machine 1.

The sets of the power modules 80 and the capacitor modules 82 are preferably disposed at equal pitches along the circumferential direction. In the example shown in FIG. 7, the number of sets of the power modules 80 and the capacitor modules 82 is 12, and the 12 sets are disposed at a pitch of 30°. Thus, the temperature distribution along the circumferential direction due to heat from the power modules 80 and the capacitor modules 82 can be made uniform. In a modification, different pitches may be used.

The power module 80 and the capacitor module 82 are preferably integrated into an assembly in each of the plurality of sets. That is, the power module 80 and the capacitor module 82 in each set form the integrated block assembly 90. FIG. 9 schematically shows a method for forming the block assembly 90 of one set. In this case, the power module 80 and the capacitor module 82 can be attached to the cover member 252 in a sub-assembled state (see FIG. 8). Thus, the ease of assembly is improved. Specifically, the assembling method can include a step of attaching the motor drive device 8 to the cover member 252 and a step of attaching, to the motor case 250, the cover member 252 to which the motor drive device 8 has been attached. In the step of attaching the motor drive device 8 to the cover member 252, excellent workability is attained because the power module 80 and the capacitor module 82 can be attached to the cover member 252 in the sub-assembled state. The step of attaching the motor drive device 8 to the cover member 252 may include a step of forming the molded resin portion 2523 described above. Therefore, the motor drive device 8 and the cover member 252 are firmly connected to each other. Thus, excellent workability is attained also in the step of attaching, to the motor case 250, the cover member 252 to which the motor drive device 8 has been attached.

In the block assemblies 90, the power modules 80 have the same configuration and the capacitor modules 82 have the same configuration (electrical characteristic, shape, etc.). Therefore, replacement and maintenance for each block assembly 90 are possible. Thus, the versatility can be increased. In the present embodiment, the power module 80 in each block assembly 90 includes the submodule 800 and a heat dissipation member 810. In this case, in the block assemblies 90, the submodules 800 have the same configuration (electrical characteristic, shape, etc.) and the heat dissipation members 810 have the same configuration (material, shape, etc.). Therefore, the ease of assembly is improved because there is no need to consider disposition of the block assemblies 90 at respective circumferential positions when disposing the plurality of block assemblies 90 along the circumferential direction. The description "same electrical characteristic" means that there is no significant difference in the electrical characteristic, and is a concept that ignores minor differences due to individual differences. The electrical characteristic may be any characteristic. For example, the electrical characteristic of the capacitor module 82 may be a rated capacity and the electrical characteristic of the submodule 800 (power semiconductor chips 801, 802) may be a gate threshold voltage. Similarly, the description "same shape" means that there is no significant difference in the shape, and is a concept that ignores minor differences due to individual differences (for example, dimensional differences within a tolerance).

For example, among the 12 block assemblies 90, four U-phase block assemblies 90 may be disposed as a group to adjoin each other in the circumferential direction, four V-phase block assemblies 90 may be disposed as a group to adjoin each other in the circumferential direction, and four W-phase block assemblies 90 may be disposed as a group to adjoin each other in the circumferential direction. In this case, the number of relay busbars 889 described later can be reduced. Alternatively, the U-phase block assemblies 90, the V-phase block assemblies 90, and the W-phase block assemblies may be disposed periodically along the circumferential direction at intervals of one or two pieces for each type.

Each submodule 800 forms upper and lower arms for one phase in the inverter INV (see FIG. 1). Therefore, each set of the upper and lower arms can be formed into the submodule, and the wiring efficiency is improved. Specifically, among the 12 sets, each of the submodules 800 of the power modules 80 in four sets forms upper and lower arms for the U phase, each of the submodules 800 of the power modules 80 in another four sets forms upper and lower arms for the V-phase, and each of the submodules 800 of the power modules 80 in still another four sets forms upper and lower arms for the W-phase.

In each block assembly 90, the submodule 800 includes the paired power semiconductor chips 801, 802. Specifically, the paired power semiconductor chips 801, 802 are the power semiconductor chip 801 forming an upper arm on a high-potential side (see "P" in FIG. 10) and the power semiconductor chip 802 forming a lower arm on a low-potential side (see "N" in FIG. 10). The power semiconductor chips 801, 802 include the power switching elements described above.

The power semiconductor chip 801 and the power semiconductor chip 802 are preferably integrated with the heat dissipation member 810 as shown in FIG. 9. Therefore, the power module 80 described above integrally includes the heat dissipation member 810, and the heat of the paired power semiconductor chips 801, 802 can efficiently be dissipated through the heat dissipation member 810. Further, the ease of assembly can be increased compared with a case where the paired power semiconductor chips 801, 802 and the heat dissipation member 810 are separately attached to the cover member 252 or the capacitor module 82.

The power semiconductor chip 801 and the power semiconductor chip 802 include busbars 881, 882, 883, 884 as a part of the wiring portion 88 as shown in FIG. 9. The busbar 881 integrated with the power semiconductor chip 801 electrically connects the power semiconductor chip 801 and the capacitor module 82 (for example, a capacitor busbar 821 in FIG. 9). The busbar 883 integrated with the power semiconductor chip 801 protrudes toward a connection surface 8104 of the heat dissipation member 810 on the radially inner side, and electrically connects the power semiconductor chip 801 and the stator coil 322 of a corresponding phase in the rotary electric machine 1 (for example, the end 1210 or 1218 of the coil side 121 shown in FIG. 4). Similarly, the busbar 882 integrated with the power semiconductor chip 802 electrically connects the power semiconductor chip 802 and the capacitor module 82 (for example, a capacitor busbar 822 in FIG. 9). The busbar 884 integrated with the power semiconductor chip 802 protrudes toward the connection surface 8104 of the heat dissipation member 810 on the radially inner side, and electrically connects the power semiconductor chip 802 and the stator coil 322 of a corresponding phase in the rotary electric machine 1 (the end 1210 or 1218 of the coil side 121 shown in FIG. 4).

In the present embodiment, the paired power semiconductor chips 801, 802 are joined to circumferential side faces 8101, 8102 of the heat dissipation member 810. At this time, the power semiconductor chip 801 is joined to the side face (surface) 8102 of the heat dissipation member 810 on one circumferential side, and the power semiconductor chip 802 is joined to the side face (surface) 8101 of the heat dissipation member 810 on the other circumferential side. Any joining method may be used and an adhesive or the like with relatively high heat conductivity may be used. Therefore, the heat dissipation member 810 can efficiently receive heat from the paired power semiconductor chips 801, 802 via the circumferential side faces. Further, the paired power semiconductor chips 801, 802 can be disposed by efficiently using the spaces between the heat dissipation members 810 adjacent in the circumferential direction. By disposing the power semiconductor chips 801, 802 of the upper and lower arms on the different side faces (circumferential side faces) 8101, 8102 of the heat dissipation member 810, the power semiconductor chips 801, 802 of the upper and lower arms can efficiently be electrically connected to each other via the busbars 883, 884 and the relay busbar 889 on the radially inner side. Further, the power semiconductor chips 801, 802 of the upper and lower arms can efficiently be electrically connected to the capacitor module 82 (and the power supply Va) on the radially outer side (on the side of a connection surface 8103 of the heat dissipation member 810 on the radially outer side).

The heat dissipation member 810 is made of a material having relatively high heat conductivity (for example, aluminum). In the present embodiment, the heat dissipation member 810 is shaped as a solid block. Thus, the heat capacity of the heat dissipation member 810 can be increased efficiently.

The heat dissipation member 810 has a function of efficiently receiving heat from the submodule 800 and efficiently transferring the received heat to the cover member 252 (and the coolant in the coolant channel 2528).

In the present embodiment, the paired power semiconductor chips 801, 802 are joined to the circumferential side faces of the heat dissipation member 810 as described above. Therefore, the axial surface (for example, the surface on the X1 side) is free. Thus, the heat dissipation member 810 can be disposed close to or in abutment against the cover member 252 (and accordingly the coolant channel 2528) in the axial direction. In this case, the heat of the paired power semiconductor chips 801, 802 can efficiently be transferred to the cover member 252 (and accordingly the coolant in the coolant channel 2528) via the heat dissipation member 810. The surface of the heat dissipation member 810 on the other axial side (X2 side) may be used, for example, to cool elements on the control board 84.

In the present embodiment, as shown in FIG. 6, the heat dissipation member 810 abuts against the cover member 252 in the axial direction. Therefore, the heat of the heat dissipation member 810 can efficiently be transferred to the cover member 252 (and accordingly the coolant in the coolant channel 2528). The heat dissipation member 810 overlaps the coolant channel 2528 when viewed in the axial direction. Therefore, the heat of the heat dissipation member 810 can more efficiently be transferred to the cover member 252 (and accordingly the coolant in the coolant channel 2528).

As shown in FIG. 7, the heat dissipation member 810 is preferably shaped such that the circumferential width decreases toward the radially inner side when viewed in the axial direction. That is, in the heat dissipation member 810, a distance L1 between the circumferential side faces where the paired power semiconductor chips 801, 802 are joined is preferably shorter on a side closer to the first axis A1 in the radial direction than a side away from the first axis A1. Therefore, the layout of the heat dissipation members 810 can be realized relatively easily even when the number of sets of the power modules 80 and the capacitor modules 82 (that is, the number of block assemblies 90) is relatively increased while the heat dissipation members 810 are disposed on the radially inner side of the capacitor modules 82. Further, the disposition space on the radially inner side (disposition space for the heat dissipation members 810) can easily be secured even when the paired power semiconductor chips 801, 802 are disposed on the circumferential side faces. In another embodiment, the distance L1 may be, for example, constant (see FIG. 11).

The capacitor module 82 is a module forming the smoothing capacitor C (see FIG. 1). The capacitor module 82 may be shaped such that a capacitor element forming the smoothing capacitor C and the capacitor busbars 821, 822 (see FIG. 9) of the wiring portion 88 are sealed with resin. The ends of the capacitor busbars 821, 822 exposed from the resin-sealed portion form a high-potential side terminal of the capacitor element and a low-potential side terminal of the capacitor element, respectively. The capacitor busbars 821, 822 are connected to the submodule 800 and to the power supply busbar 886 (see FIGS. 3A, 6, and 12).

In each block assembly 90, as shown in FIG. 10, the capacitor module 82 forms the smoothing capacitor C electrically connected in parallel between the high-potential side and the low-potential side of the submodule 800 in the corresponding set.

In the present embodiment, the capacitor module 82 is disposed on the radially outer side of the power module 80. Therefore, the circumferential disposition range is expanded compared with a case where the capacitor module 82 is disposed on the radially inner side of the power module 80. Thus, the size of the capacitor module 82 can be increased easily. For example, the capacitor module 82 having a relatively large size can be realized even when the number of sets of the power modules 80 and the capacitor modules 82 is relatively increased. As a result, it is easy to respond to an increase in the power of the rotary electric machine 1.

In the present embodiment, the axial extension range of the capacitor module 82 overlaps the axial extension range of the power module 80 as shown in FIG. 6.

In particular, the submodule 800 of the power module 80 in the present embodiment overlaps the capacitor module 82 when viewed in the radial direction. Therefore, the capacitor module 82 and the submodule 800 can be disposed between the cover member 252 and the rotary electric machine 1 in the axial direction while minimizing the axial size of the vehicle drive device 10.

The capacitor module 82 is disposed so that the distances from the power semiconductor chips 801, 802 are equal to each other. In this case, the capacitor busbar 821 (see FIG. 9) connected to each of the power semiconductor chips 801, 802 can be shared.

the capacitor module 82 is thermally connected to the cover member 252. For example, the capacitor module 82 may thermally be connected to the cover member 252 via the heat dissipation member 810. The capacitor module 82 can thermally be connected to the heat dissipation member 810 by facing, in the radial direction, the connection surface 8103 of the heat dissipation member 810 on the radially outer side (connection surface 8103 connecting the two side faces 8101, 8102 where the paired power semiconductor chips 801, 802 are fixed) (see FIG. 9). In this case, the heat dissipation member 810 may have a radially outer protrusion (not shown) close to the capacitor module 82.

Alternatively, the capacitor module 82 may thermally be connected to the cover member 252 directly without intermediation of the heat dissipation member 810 or in addition to the thermal connection via the heat dissipation member 810. Specifically, the capacitor module 82 extends farther in the axial direction (that is, to the X1 side) from the rotary electric machine 1 than the submodule 800, and is close to or abuts against the cover member 252 in the axial direction. In the present embodiment, as shown in FIG. 6, the capacitor module 82 abuts against the cover member 252 in the axial direction similarly to the heat dissipation member 810. In this case, the heat of the capacitor module 82 can efficiently be transferred to the cover member 252 (and accordingly the coolant in the coolant channel 2528). The capacitor module 82 may abut against the peripheral wall portion 2522 of the cover member 252 in the radial direction.

Alternatively, the capacitor module 82 may thermally be connected to the cover member 252 via the molded resin portion 2523 in place of or in addition to these thermal connection methods.

By thermally connecting the capacitor module 82 to the cover member 252 in this way, the heat of the capacitor module 82 is efficiently transferred to the cover member 252 (and the coolant in the coolant channel 2528). Thus, the capacitor module 82 can be cooled efficiently.

In particular, in the present embodiment, the axial extension ranges of the capacitor module 82, the heat dissipation member 810, and the submodule 800 (power semiconductor chips 801, 802) overlap each other. Thus, it is possible to increase the heat transfer performance to the cover member 252 via the heat dissipation member 810 while minimizing the axial mounting space of the motor drive device 8.

The end of the capacitor module 82 on the X2 side preferably extends to the X2 side beyond the coil end portion 322A. That is, the capacitor module 82 overlaps the coil end portion 322A when viewed in the radial direction. Therefore, the axial gap between the capacitor module 82 and the rotary electric machine 1 can be minimized. As a result, the axial size of the vehicle drive device 10 can be reduced while securing the necessary axial size of the capacitor module 82.

The capacitor module 82 is preferably disposed on the radially outer side of the coil end portion 322A when viewed in the axial direction. Therefore, it possible to realize a layout in which the capacitor module 82 overlaps the coil end portion 322A when viewed in the radial direction. In this case, the capacitor module 82 may be disposed so as to overlap a back yoke portion of the stator core 321 when viewed in the axial direction. In this case, the capacitor module 82 can be disposed on a relatively radially inner side. Therefore, it is possible to reduce the possibility of an increase in the radial size of the motor case 250 due to the disposition of the capacitor module 82 on the radially outer side of the power module 80, or to reduce the amount of the increase.

The control board 84 forms a part or the whole of the control device 500 (see FIG. 1). The control board 84 may be, for example, a multilayer printed board. The control board 84 is disposed such that the normal direction to the board surface is along the axial direction. Therefore, the control board 84 can be disposed by using a small axial gap. For example, in the present embodiment, as shown in FIG. 6, the control board 84 may be disposed between the rotary electric machine 1 and the power modules 80 in the axial direction. More specifically, the control board 84 may be disposed between the coil end portion 322A of the rotary electric machine 1 and the power modules 80 in the axial direction. Therefore, it is possible to realize efficient disposition using a space that is likely to be a dead space. The control board 84 can extend radially outward to a radial position where it overlaps the coil end portion 322A when viewed in the axial direction. Therefore, the area of the control board 84 (circuit portion forming range) can be maximized.

The control board 84 preferably overlaps the capacitor module 82 when viewed in the radial direction. In the example shown in FIG. 6, the end of the capacitor module 82 on the X2 side extends to the X2 side beyond the coil end portion 322A, and the capacitor module 82 overlaps the submodule 800 when viewed in the radial direction. In this layout, the control board 84 may be disposed between the coil end portion 322A of the rotary electric machine 1 and the power module 80 (or the submodule 800 of the power module 80) in the axial direction in order to overlap the capacitor module 82 when viewed in the radial direction.

The control board 84 is preferably shaped as an annular ring having a central hole 84a through which the shaft portion 314 (see FIG. 3A as well) of the rotor 310 extends. In this case, the control board 84 can be disposed near all the plurality of power modules 80 disposed along the circumferential direction. Therefore, the electrical connection (not shown) is facilitated between the power semiconductor chips 801, 802 (for example, gate terminals of the power switching elements) forming the submodule 800 of the power module 80 and a drive circuit 846 (see FIG. 13) of the control board 84.

As shown in FIG. 13, the control board 84 has an annular low-voltage area 841 around the central hole 84a and an annular high-voltage area 842 on the radially outer side of the low-voltage area 841. The high-voltage area 842 and the low-voltage area 841 are electrically insulated via an annular insulating area 843. Therefore, a low-voltage circuit and a high-voltage circuit can coexist in the two annular areas (low-voltage area 841 and high-voltage area 842) of the control board 84. In the high-voltage area 842 of the control board 84, circuit portions and elements that handle a high voltage related to the power supply Va are disposed. For example, the drive circuits 846 for driving the power semiconductor chips 801, 802 may be provided in the high-voltage area 842 as high-voltage electronic components. In the low-voltage area 841, a microcomputer 502, a power supply circuit 503, and the like for realizing the control device 500 may be provided as low-voltage electronic components. An electronic component for an electric oil pump that circulates oil in the motor housing chamber SP1 may be mounted on the control board 84.

In the present embodiment, the control board 84 has, in the low-voltage area 841, through holes 845 through which the lead wires 888 (elements of the wiring portion 88) electrically connecting the stator coil 322 and the power semiconductor chips 801, 802 extend (see FIG. 6). Therefore, the lead wires 888 can be realized with a relatively small wiring length while securing the necessary size of the control board 84. For example, in the case of the coil side 121 shown in FIG. 4, the lead wires 888 may be realized by the ends 1210, 1218. In the example shown in FIG. 6, the lead wire 888 is drawn radially inward while being bent radially inward from the coil end portion 322A, and extends in the axial direction while being bent in the axial direction on the X1 side of the rotor core 312. In the axially extending section, the lead wire 888 extends through the control board 84 in the axial direction. In the example shown in FIG. 13, the control board 84 has three through holes 845 in association with the three-phase stator coil 322. As shown in FIG. 11, the end of the lead wire 888 on the X1 side may be joined to the relay busbar 889. In this case, the busbars 883, 884 from the power module 80 described above are joined to the relay busbar 889. The relay busbar 889 may be provided for each phase, and two or more lead wires 888 may be joined to a common relay busbar 889 for each phase.

In the present embodiment, the control board 84 is provided with current sensors 902 around the through holes 845 by using the configuration in which the lead wires 888 extend through the through holes 845. In this case, the current sensor 902 can easily detect a current through the lead wire 888. The current sensor 902 may be, for example, a Hall sensor. The current sensor 902 is electrically connected to the microcomputer 502 (see FIG. 13) related to the control device 500 via wiring inside the control board 84 (not shown). Therefore, the wiring between the current sensor 902 and the control device 500 can easily be realized by the wiring inside the control board 84, and the wiring length between the current sensor 902 and the control device 500 can be reduced.

In the present embodiment, the control board 84 is provided with the rotation angle sensor 900. The rotation angle sensor 900 faces the detected portion 3141 (detected portion 3141 provided on the shaft portion 314 described above; see FIG. 6) in the radial direction. Specifically, the rotation angle sensor 900 is provided at a position around the central hole 84a (that is, at the opening edge). The rotation angle sensor 900 may be formed integrally with the control board 84 and function as a magnetic pole position sensor. Therefore, the wiring between the rotation angle sensor 900 and the control device 500 can easily be realized by the wiring inside the control board 84, and the wiring length between the rotation angle sensor 900 and the control device 500 can be reduced.

The wiring portion 88 includes the capacitor busbars 821, 822 described above, the busbars 881, 882, 883, 884 described above, the power supply busbar 886, the lead wires 888 described above, and the relay busbars 889 described above.

The power supply busbar 886 has an annular shape as shown in FIG. 12 and extends around the first axis A1 as shown in FIG. 6 (and FIG. 3A). In the present embodiment, the power supply busbar 886 extends in the circumferential direction so as to adjoin the submodules 800 on the X1 side between the cover member 252 and the submodules 800 in the axial direction. In this case, the power supply busbar 886 is disposed on the radially inner side of the capacitor modules 82 when viewed in the axial direction, and overlaps the capacitor modules 82 when viewed in the radial direction. Thus, the wiring length between the power supply busbar 886 and each block assembly 90 can be reduced efficiently.

The power supply busbar 886 includes a high-potential side power supply busbar 8861 electrically connected to the high-potential side of the power supply Va (see FIG. 1), and a low-potential side power supply busbar 8862 electrically connected to the low-potential side of the power supply Va (see FIG. 1). The high-potential side power supply busbar 8861 and the low-potential side power supply busbar 8862 may be disposed while being offset in the radial direction as shown in FIG. 7, and/or may be disposed while being offset in the axial direction. The high-potential side power supply busbar 8861 may be joined to the end of the capacitor busbar 821 on the X1 side, and the low-potential side power supply busbar 8862 may be joined to the end of the capacitor busbar 822 on the X1 side.

The power supply busbar 886 is preferably disposed closer to the cover member 252 than the submodule 800 (power semiconductor chips 801, 802). For example, as shown in FIG. 3A, the power supply busbar 886 may be disposed between the capacitor busbar 822 and the heat dissipation member 810 in the radial direction and on the X1 side of the submodule 800. In this case, the heat from the power supply busbar 886 can efficiently be transferred to the cover member 252 (that is, the power supply busbar 886 can efficiently be cooled) with the power supply busbar 886 efficiently disposed by using a space that may be a dead space.

Figure 13A:
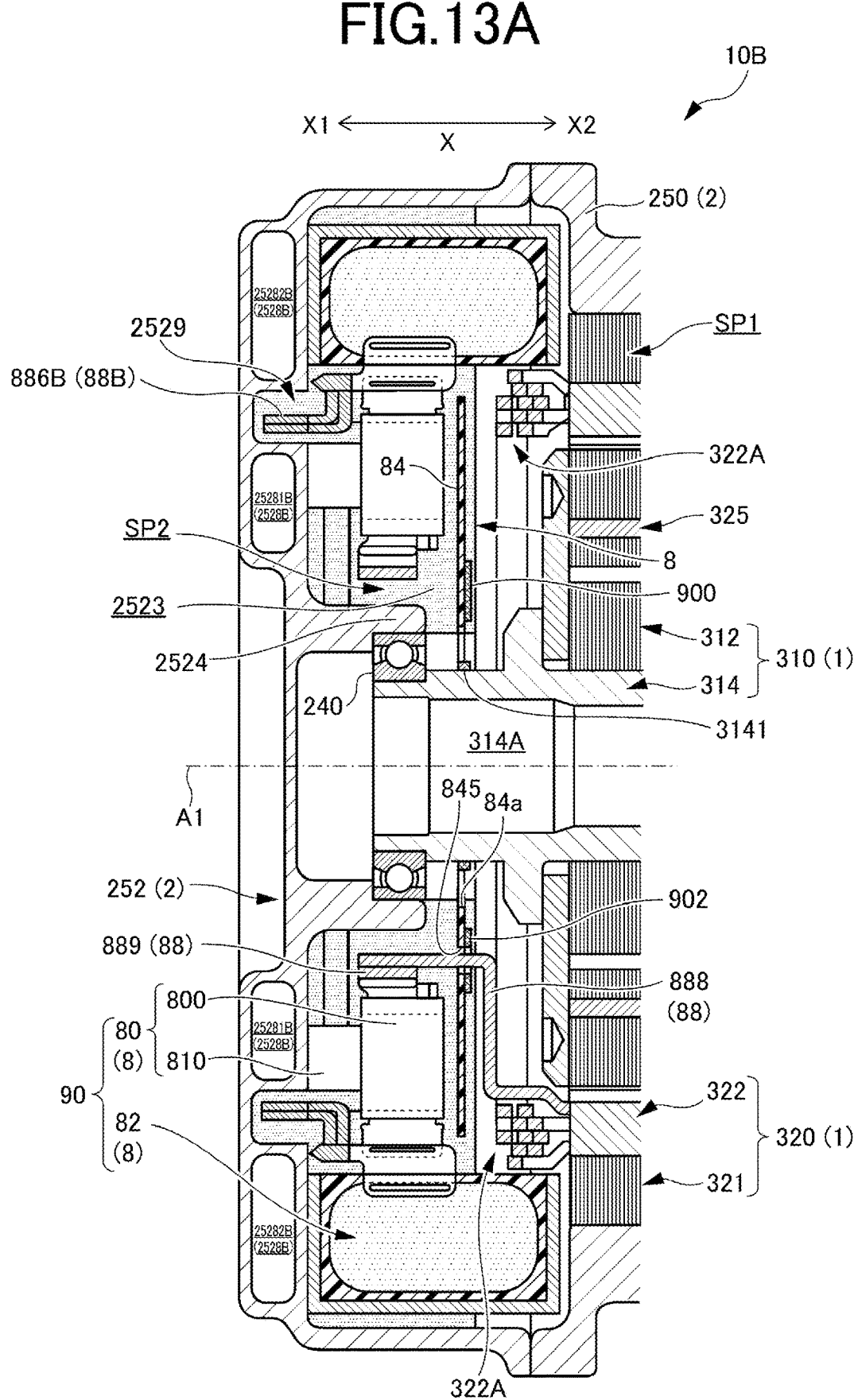
FIG. 13A is a sectional view schematically showing a main part of a vehicle drive device according to a modification.

In a vehicle drive device 10B according to a modification shown in FIG. 13A, a power supply busbar 886B is provided in an annular groove 2529 formed in the cover member 252. The annular groove 2529 has an annular shape around the first axis A1 when viewed in the axial direction, and is recessed to the X1 side. The power supply busbar 886B may extend between a first coolant channel 25281B and a second coolant channel 25282B in the radial direction when viewed in the axial direction. In this case, the power supply busbar 886B can efficiently be disposed by using a space between the first coolant channel 25281B and the second coolant channel 25282B of a coolant channel 2528B in the radial direction, and the power supply busbar 886B can efficiently be cooled by the first coolant channel 25281B and the second coolant channel 25282B.

Next, some of the effects of the present embodiment will be described with reference to FIGS. 14A to 18.

Figure 14A:
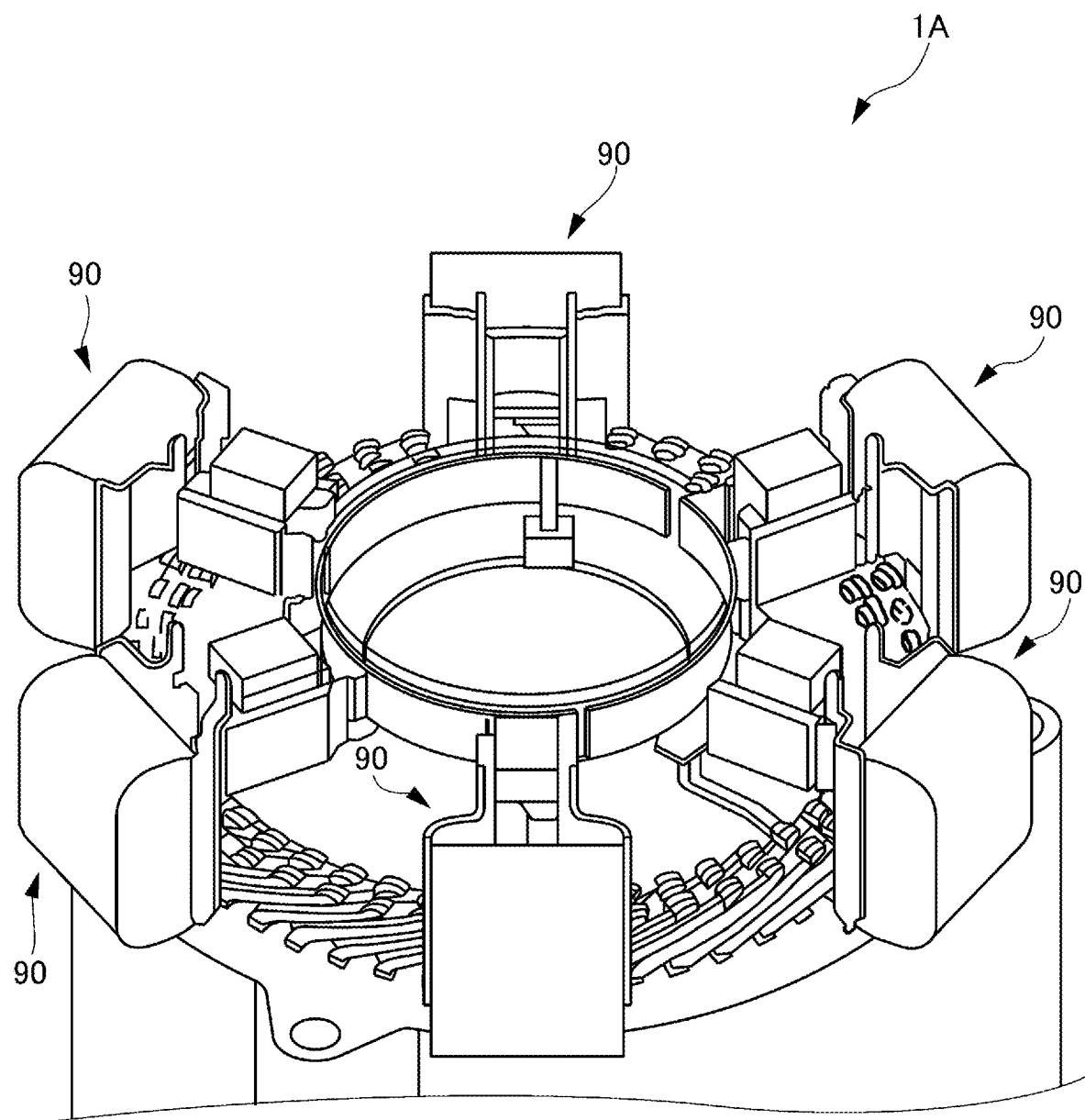
FIG. 14A is a schematic perspective view illustrating a rotary electric machine in which six block assemblies are disposed along a circumferential direction according to the first embodiment.
Figure 14B:
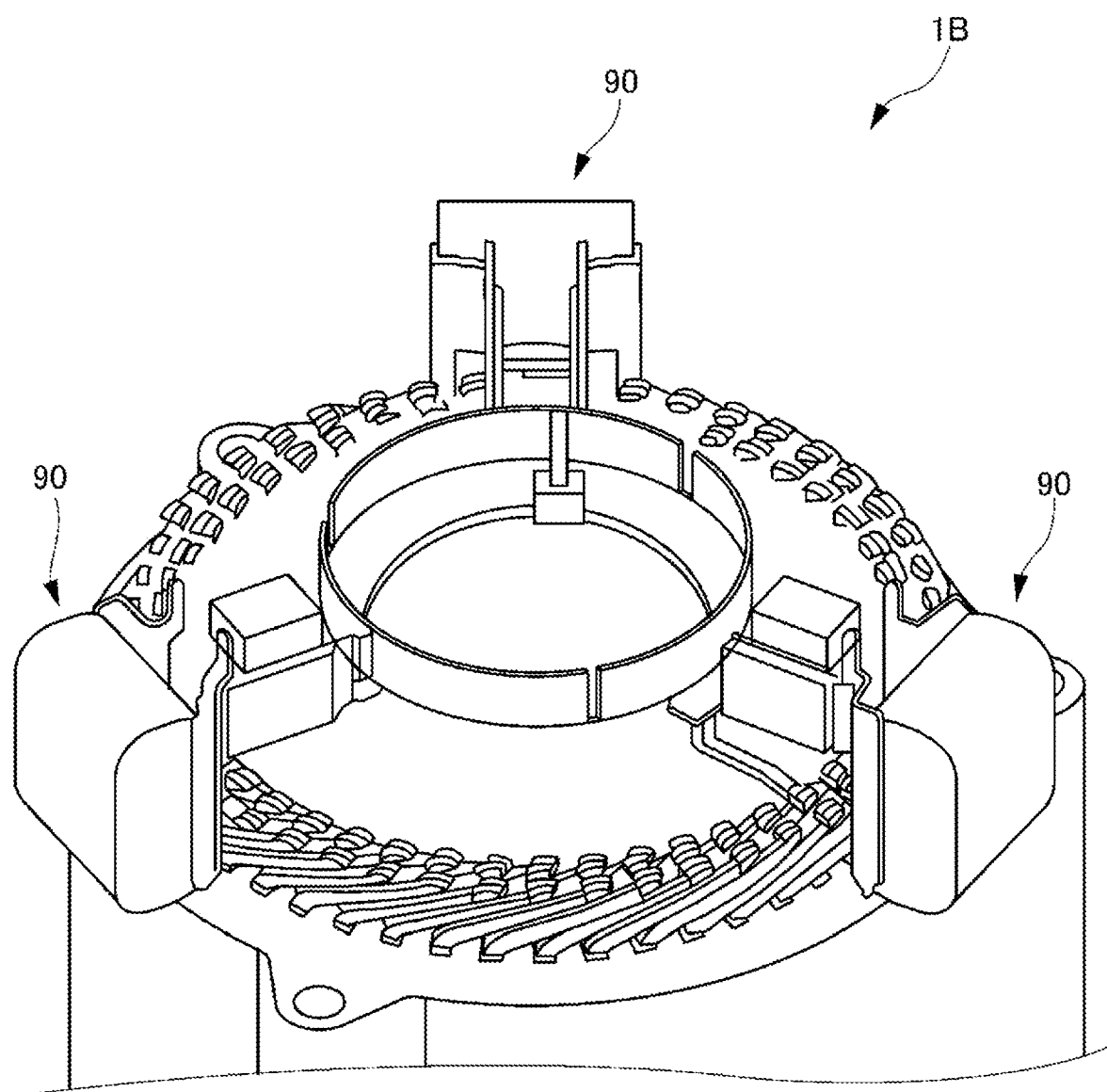
FIG. 14B is a schematic perspective view illustrating a rotary electric machine in which three block assemblies are disposed along the circumferential direction according to the first embodiment.

FIG. 14A is a schematic perspective view illustrating a rotary electric machine 1A in which six block assemblies 90 are disposed along the circumferential direction. FIG. 14B is a schematic perspective view illustrating a rotary electric machine 1B in which three block assemblies 90 are disposed along the circumferential direction. Since FIGS. 14A and 14B are diagrams illustrating the disposition of the block assemblies the illustration of some elements may be simplified or omitted.

As described above, in the present embodiment, the block assemblies 90 have the same configuration and any number of block assemblies 90 can be mounted. Therefore, it is possible to realize rotary electric machines 1 having various specifications. For example, the rotary electric machine 1A, 1B different from the rotary electric machine 1 in terms of power can easily be structured by disposing six block assemblies 90 as shown in FIG. 14A or three block assemblies 90 as shown in FIG. 14B. Thus, it is possible to efficiently increase the variations of the rotary electric machine while achieving common use of components.

Figure 15:
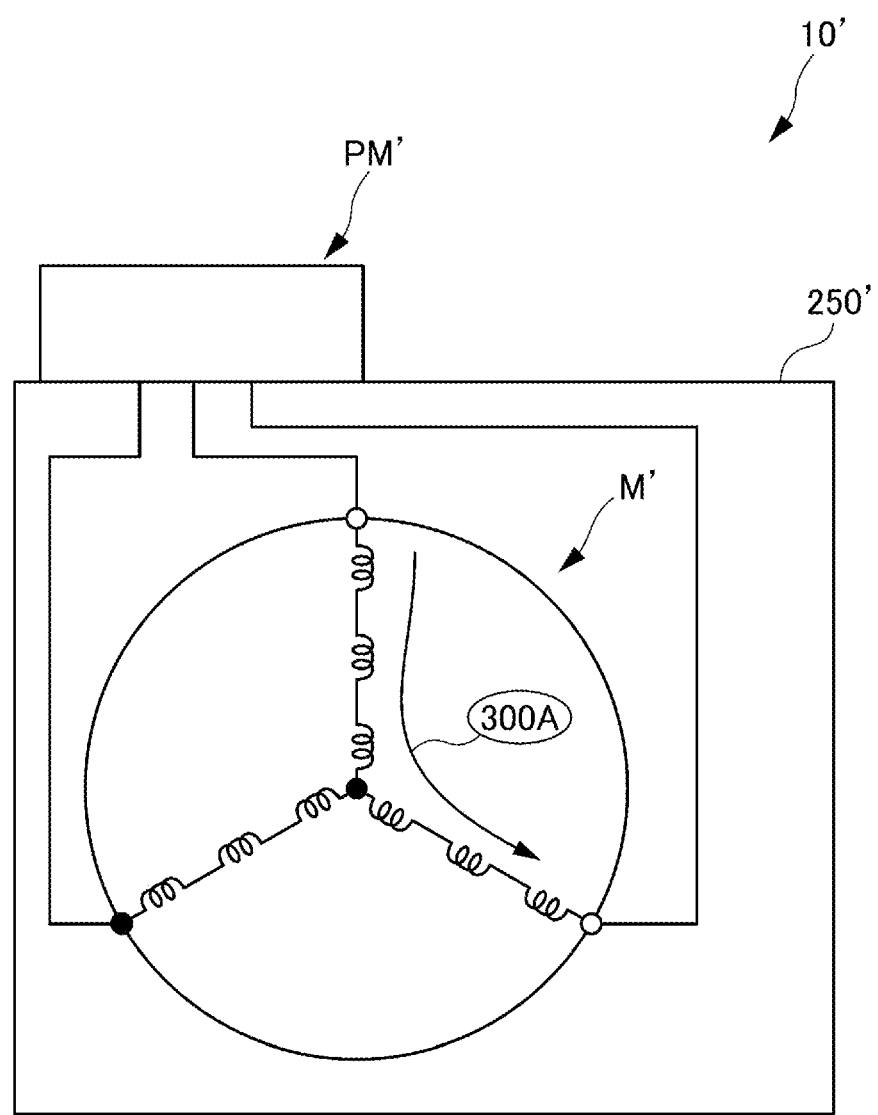
FIG. 15 is a schematic diagram illustrating a wiring structure of a vehicle drive device according to a comparative example.
Figure 16:
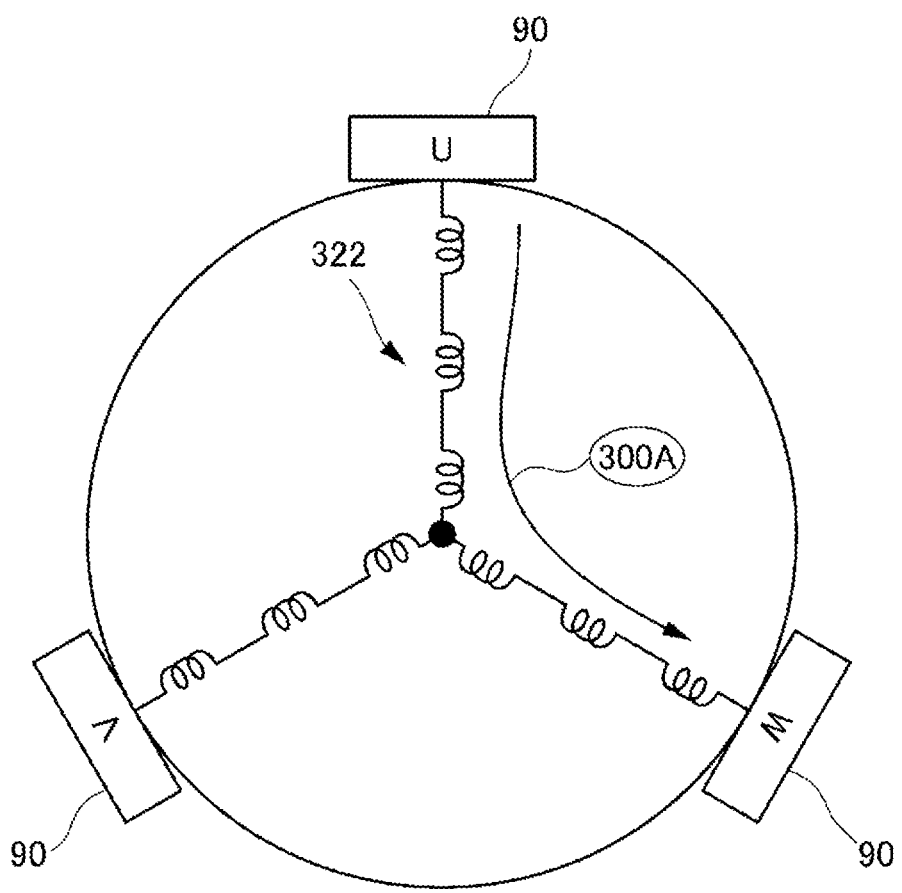
FIG. 16 is a schematic diagram illustrating an example of a wiring structure that can be realized in the rotary electric machine according to the first embodiment.
Figure 17A:
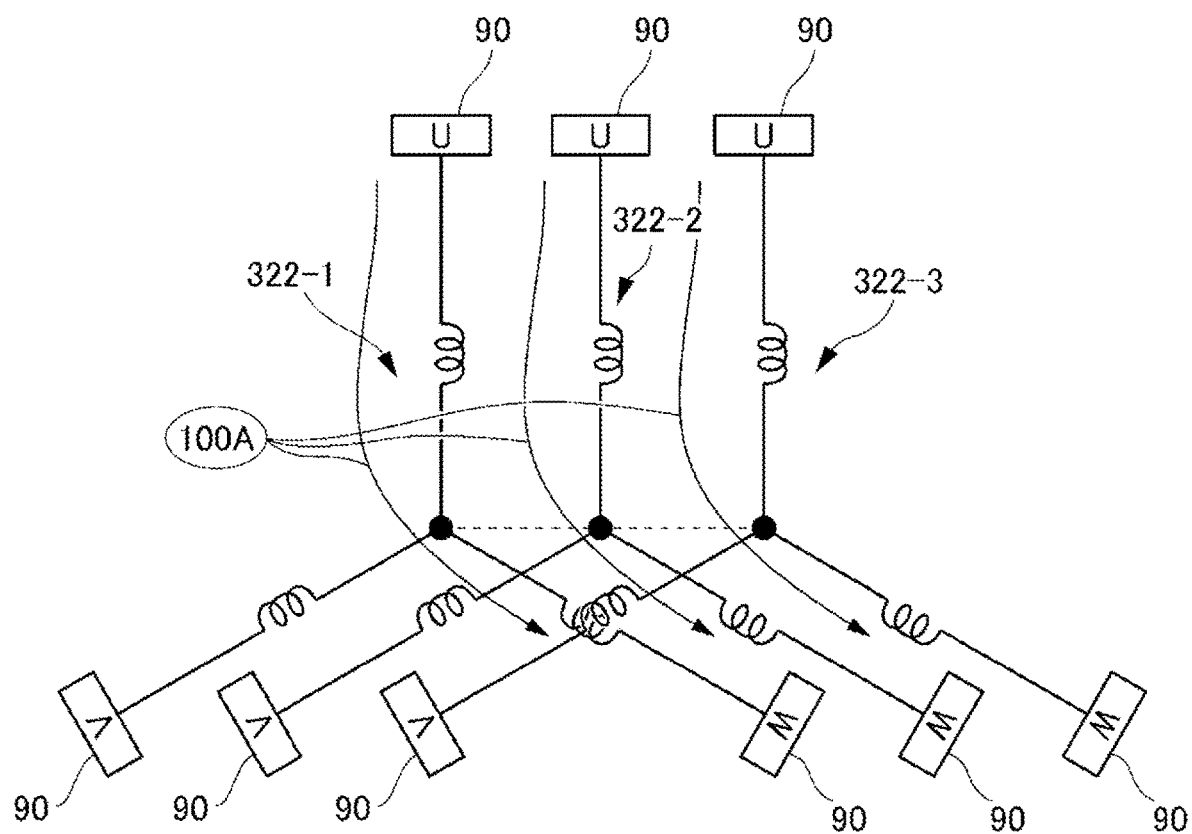
FIG. 17A is a schematic diagram illustrating another example of the wiring structure that can be realized in the rotary electric machine according to the first embodiment.
Figure 17B:
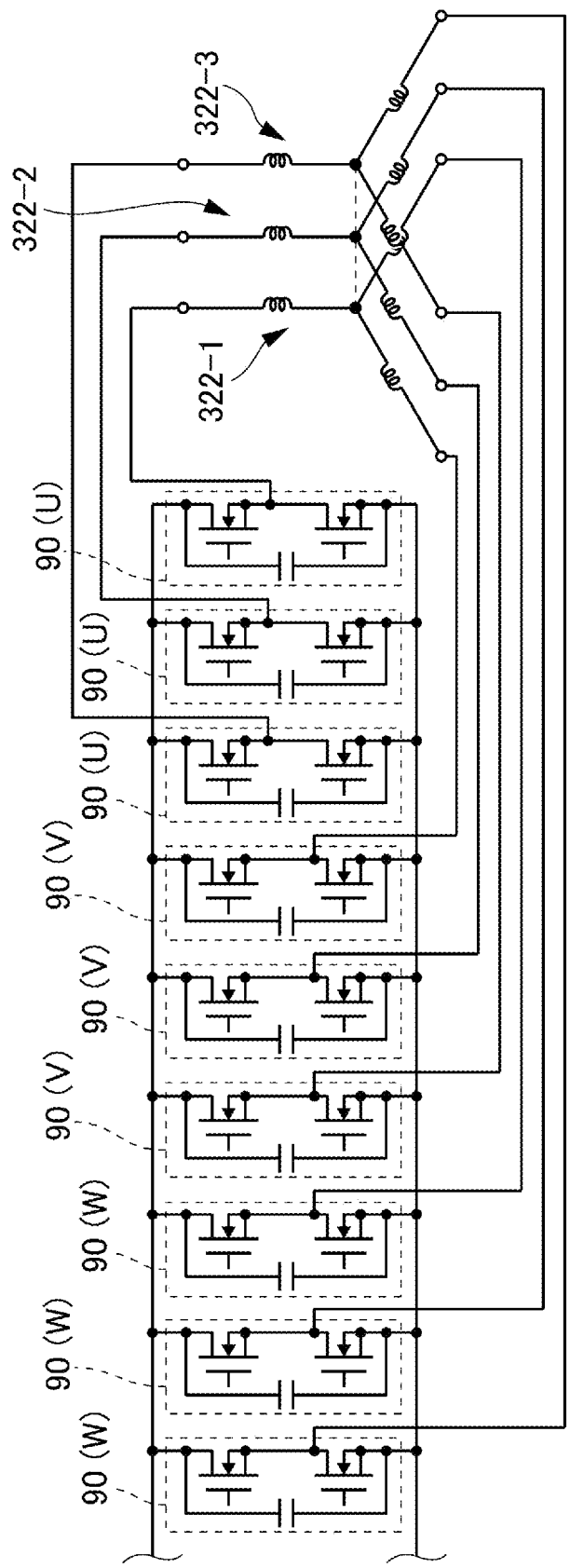
FIG. 17B is an equivalent electric circuit diagram illustrating the other example of the wiring structure that can be realized in the rotary electric machine according to the first embodiment.
Figure 18:
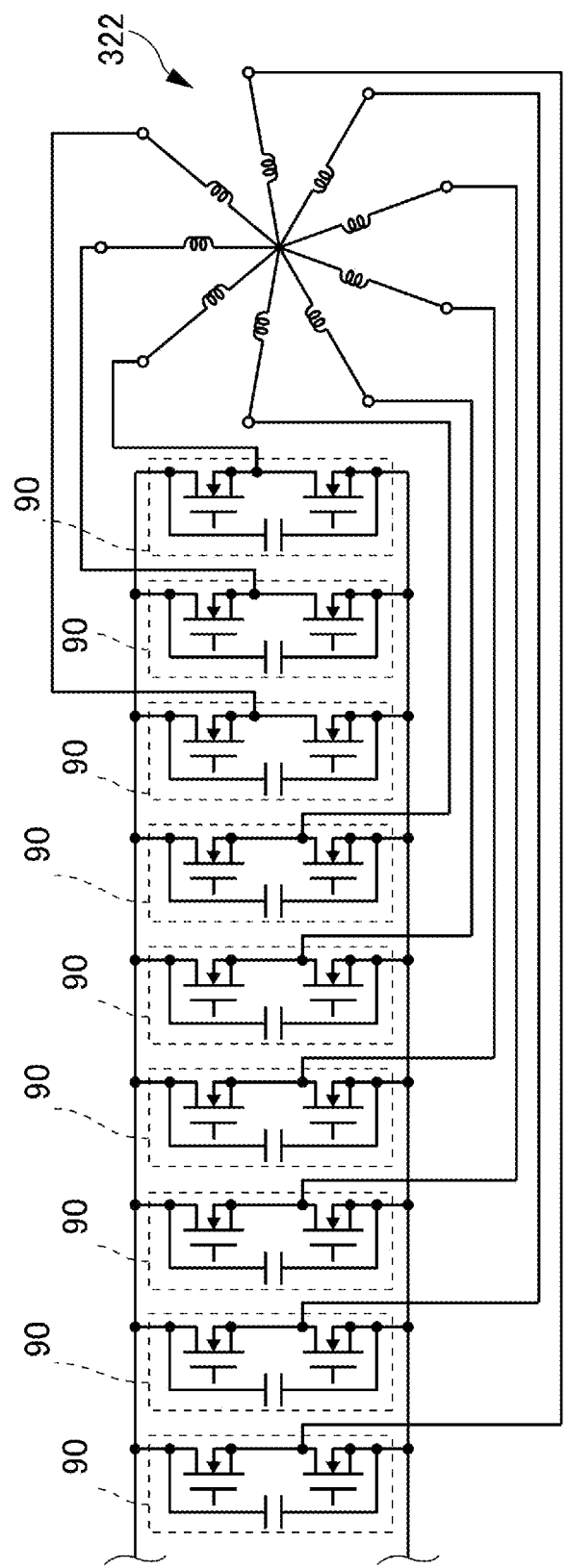
FIG. 18 is a schematic diagram illustrating specifications that can be realized in the rotary electric machine according to the first embodiment.

FIG. 15 is a schematic diagram illustrating a wiring structure of a vehicle drive device 10' according to a comparative example. FIG. 16 is a schematic diagram illustrating an example of a wiring structure that can be realized in the rotary electric machine 1 according to the present embodiment. FIGS. 17A and 17B are schematic diagrams illustrating another example of the wiring structure that can be realized in the rotary electric machine 1 according to the present embodiment. FIG. 18 is a schematic diagram illustrating specifications that can be realized in the rotary electric machine 1 according to the present embodiment.

The vehicle drive device 10' according to the comparative example has a configuration in which a power module PM' including the inverter INV, the smoothing capacitor C, the control device 500, and the like (not shown) described above is disposed outside the motor case 250'. In this case, as schematically shown in FIG. 15, the wiring structure is such that the lead wires (power lines) from a rotary electric machine M' are drawn to the power module PM' through a partition wall of the motor case 250'. In such a wiring structure, the wiring length of the lead wires from the rotary electric machine M' is likely to increase, and the degree of freedom in terms of the wiring route is not high.

In the present embodiment, the motor drive device 8 adjoins the rotary electric machine 1 in the axial direction without intermediation of the partition wall as described above (see FIG. 3A). Therefore, as schematically shown in FIG. 16, the block assemblies 90 of the individual phases (represented by "U", "V", "W" in FIG. 16 to indicate phase differences) can be disposed in close proximity to the stator coil 322 (see FIG. 3A). Thus, the wiring length of the lead wires 888 can be minimized. Since the wiring length can be reduced, the electrical characteristics are good, the required reliability can easily be secured, the wiring routing and the like are facilitated, and the degree of freedom in terms of layout of peripheral members can be increased. Thus, according to the present embodiment, an efficient wiring structure can be realized.

In the present embodiment, various numbers of block assemblies 90 can be disposed on the relay busbar 889 (FIG. 11) for each phase. Therefore, the degree of freedom in terms of the number of block assemblies 90 that can be disposed in one rotary electric machine 1 can be increased as described above without complicating the wiring structure.

In the present embodiment, even when the stator coils 322 are connected in parallel for each phase as shown in FIGS. 17A and 17B, an efficient wiring structure can be realized similarly. That is, as schematically shown in FIGS. 17A and 17B similarly to the example shown in FIG. 16, the block assemblies 90 of the individual phases can be disposed in close proximity to the coil end portions 322A of the stator coils 322. When the stator coils 322 are connected in parallel for each phase, the current required to output the same power and flowing through the stator coils 322 can be reduced compared with the case where the stator coils 322 are connected in series (see FIG. 16). For example, when three coils are connected in parallel as shown in FIGS. 17A and 17B, power similar to that in the case where a current of 300 A flows when the coils are connected in series (see FIG. 16) can be realized by causing a current of 100 A to flow. By increasing the number of parallel coils in this way, it is possible to reduce the sizes of the power semiconductor chips 801, 802 included in the submodule 800 and increase the yield of semiconductor wafers. By realizing distribution of the inverter modules using the block assemblies 90 and parallelization (distribution) of the connection of the stator coils 322 to the inverter INV in this way, it is possible to not only reduce the size but also, for example, reduce the cost and increase the variations of the winding configuration. For example, regarding the increase in the variations of the winding configuration, a winding configuration for phases other than three phases, such as a winding configuration for nine phases, can be realized as schematically shown in FIG. 18.

In the present embodiment, the degree of freedom is high in terms of the number of block assemblies 90 that can be disposed in one rotary electric machine 1. For example, three block assemblies 90 can be disposed for each phase in the case of the connection method for the stator coils 322 as shown in FIGS. 17A and 17B. In this case, stator coils 322-1 to 322-3 connected in parallel can be energized independently, thereby increasing redundancy such as a fail-safe function.

Next, referring to FIGS. 19 to 25, description will be given of a vehicle drive device 10C according to another embodiment (hereinafter referred to as "second embodiment" for distinction) that is different from the vehicle drive device 10 according to the embodiment described above (hereinafter referred to as "first embodiment" for distinction). In the following, constituent elements that may be similar to those in the first embodiment described above may be represented by the same reference symbols and the description thereof may be omitted.

Figure 19:
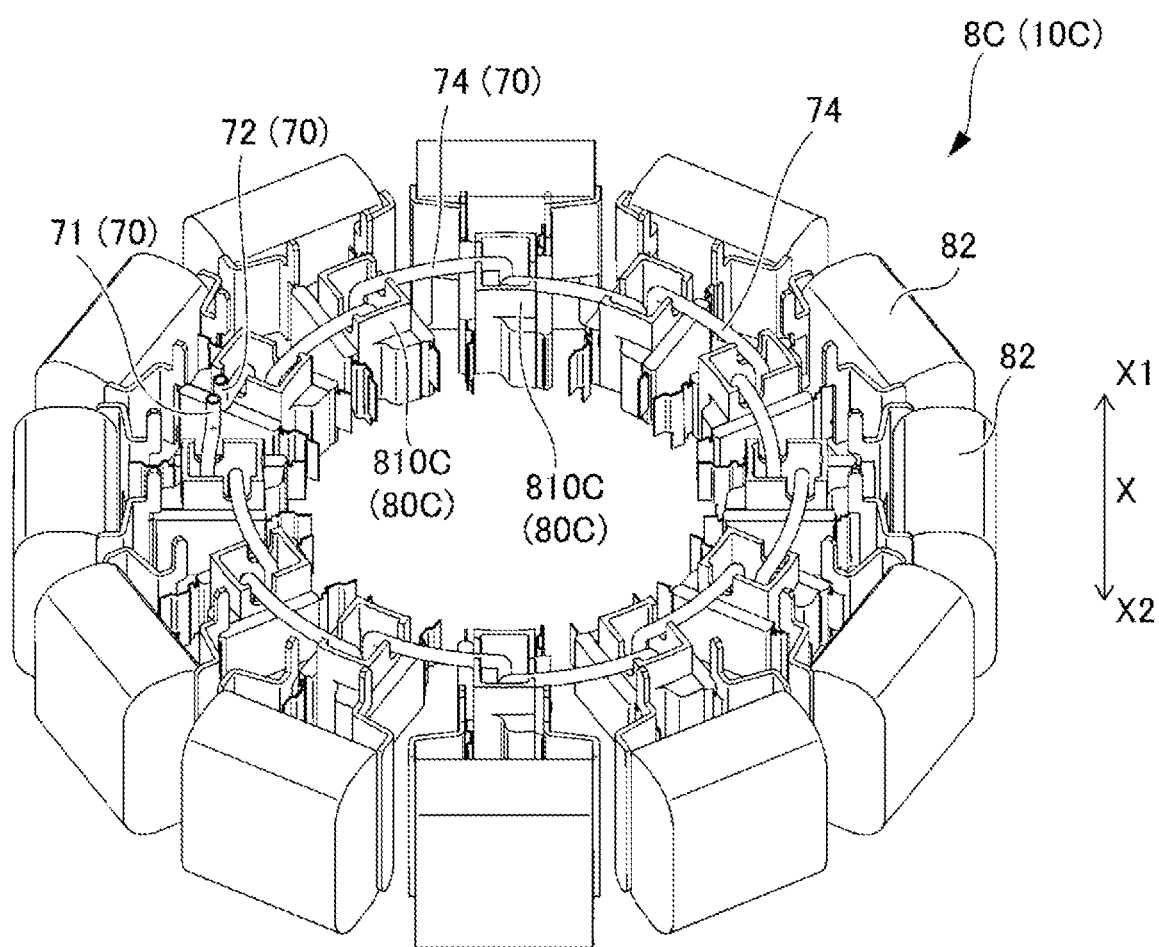
FIG. 19 is a perspective view showing a vehicle drive device according to a second embodiment from the X1 side.
Figure 20:
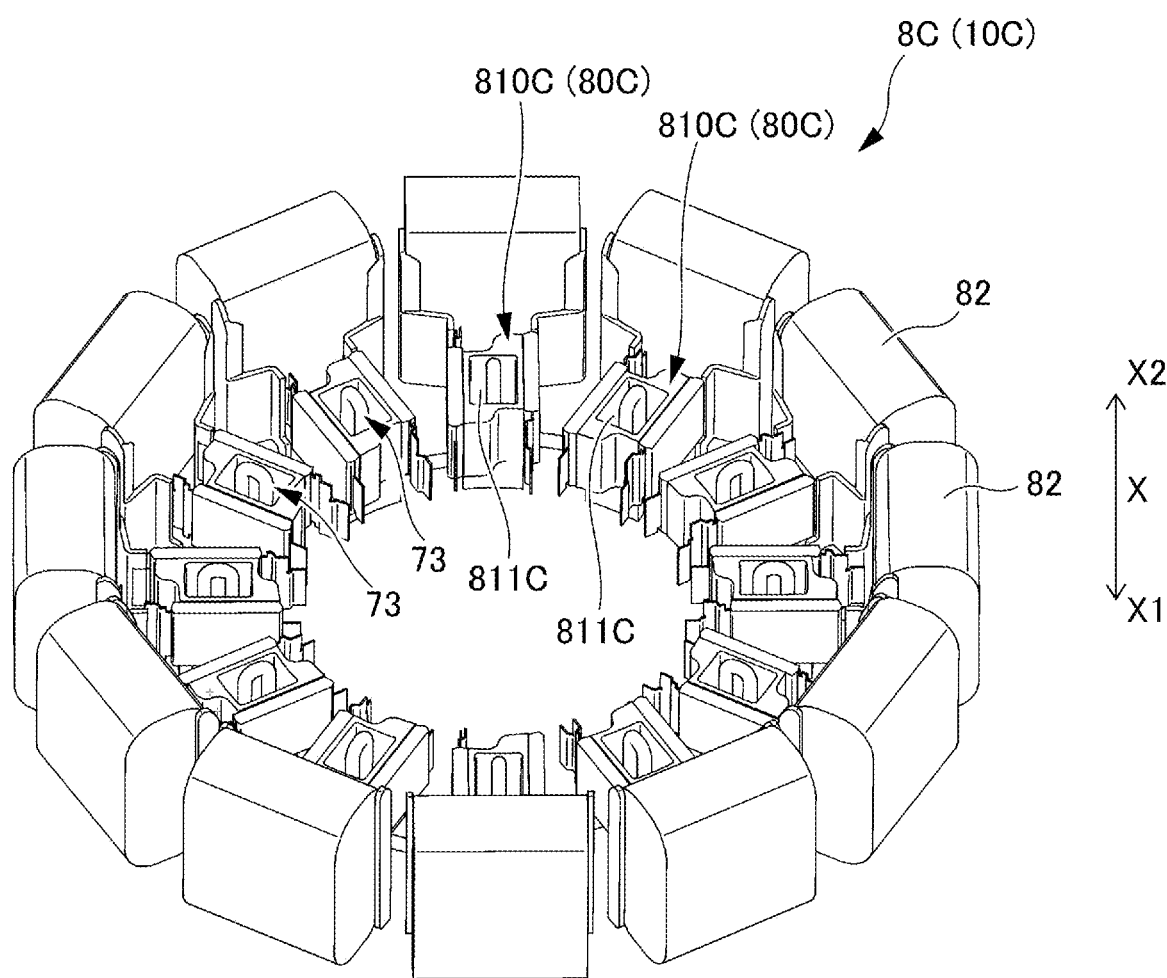
FIG. 20 is a perspective view showing the vehicle drive device according to the second embodiment from the X2 side.
Figure 21:
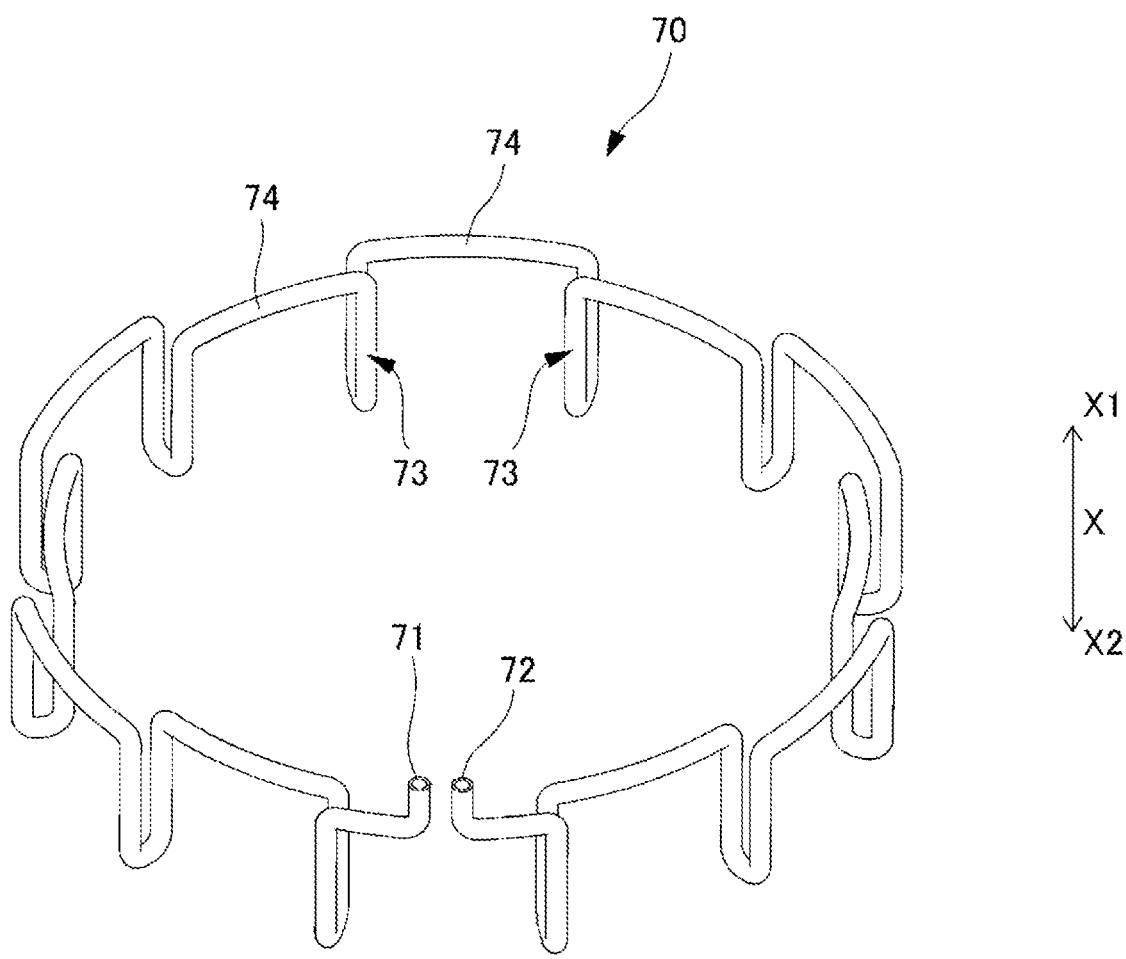
FIG. 21 is a perspective view showing a pipe member according to the second embodiment from the X1 side.
Figure 22:
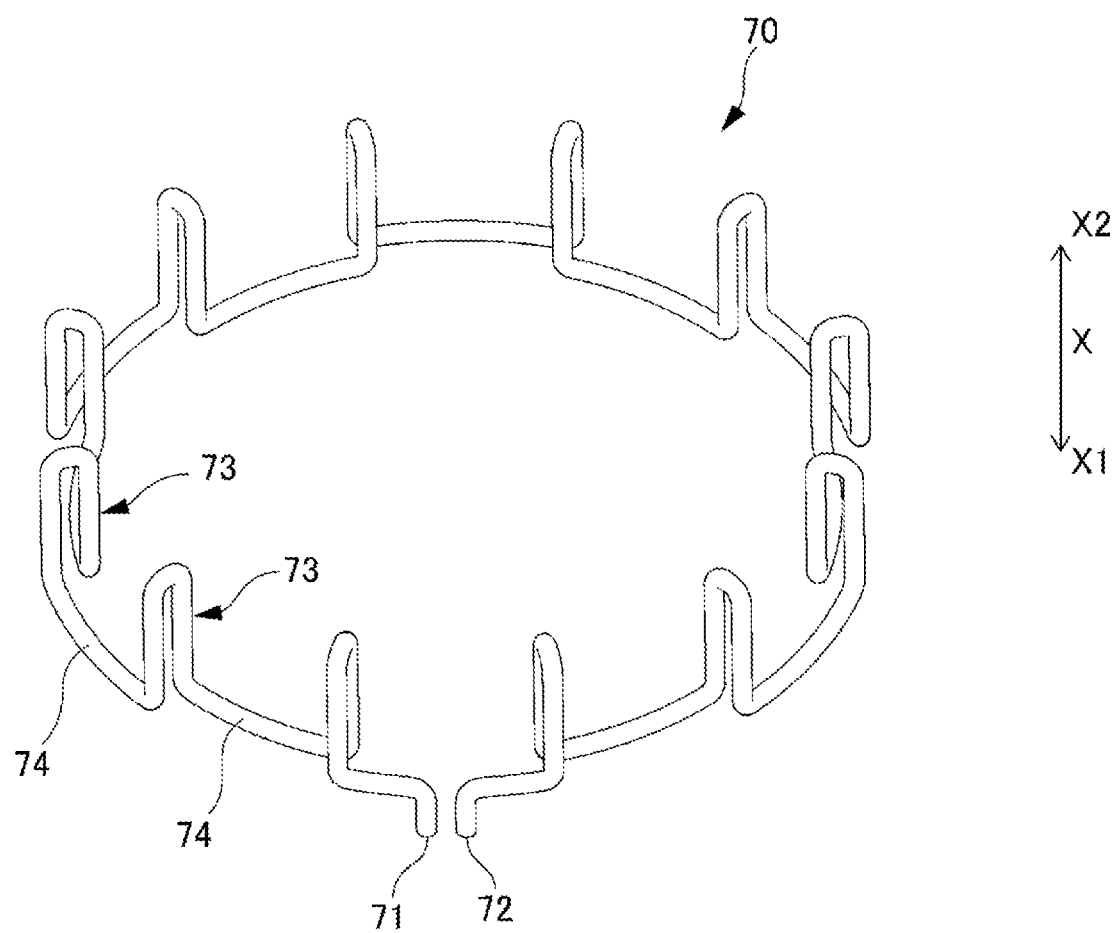
FIG. 22 is a perspective view showing the pipe member according to the second embodiment from the X2 side.
Figure 23:
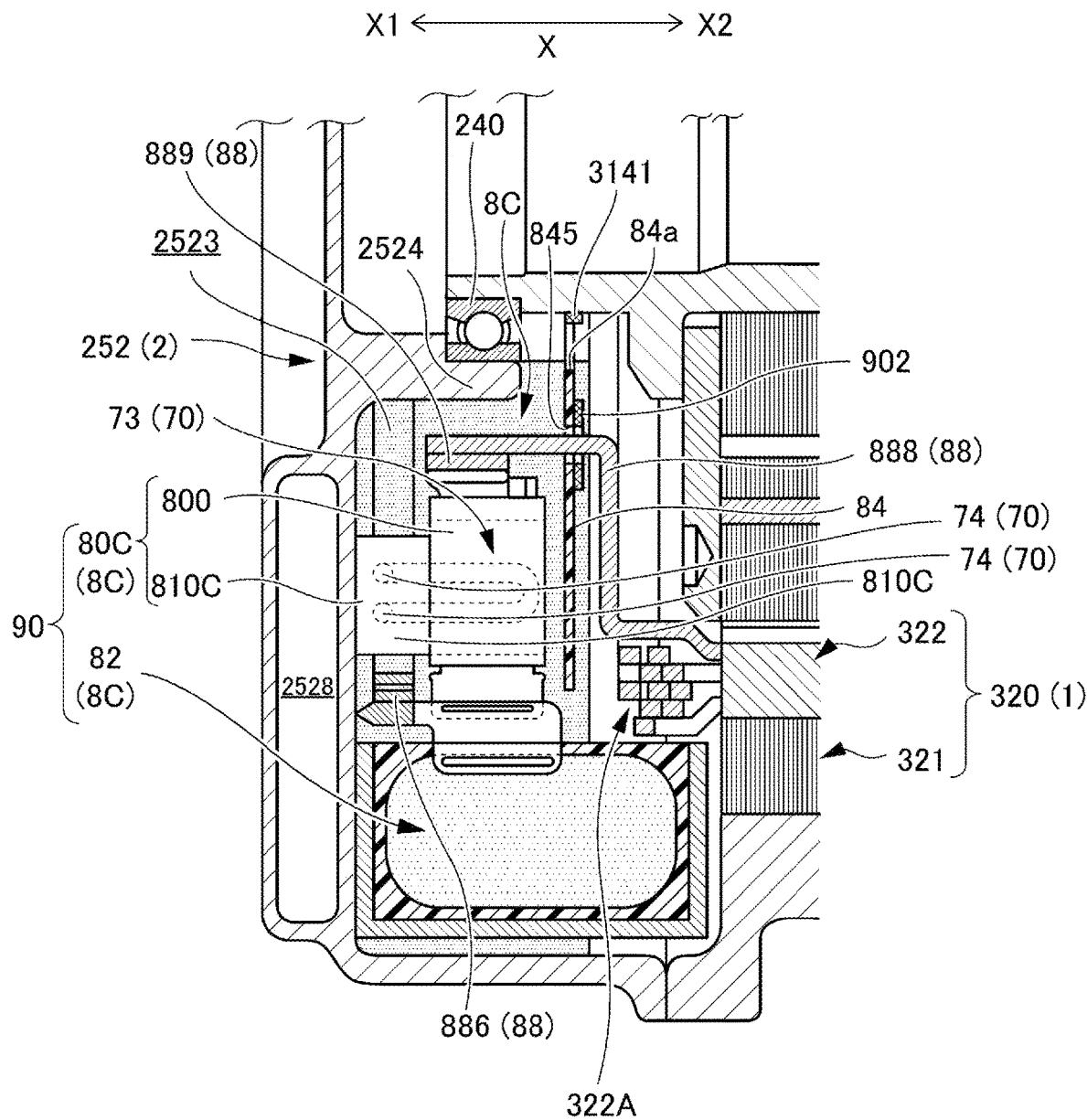
FIG. 23 is a sectional view of a main part of the vehicle drive device according to the second embodiment.
Figure 24:
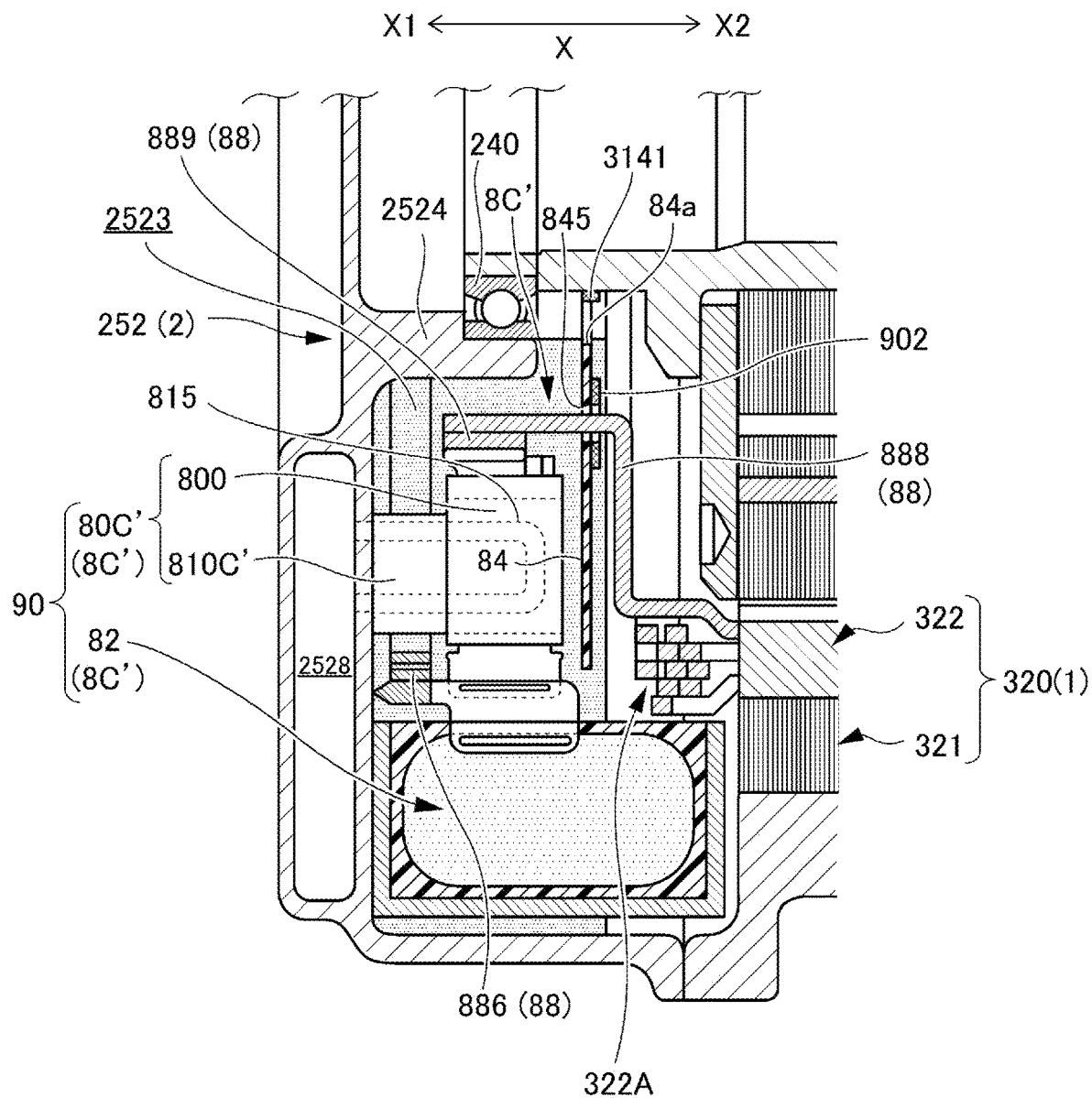
FIG. 24 is a sectional view of a main part of a vehicle drive device according to another embodiment.
Figure 25:
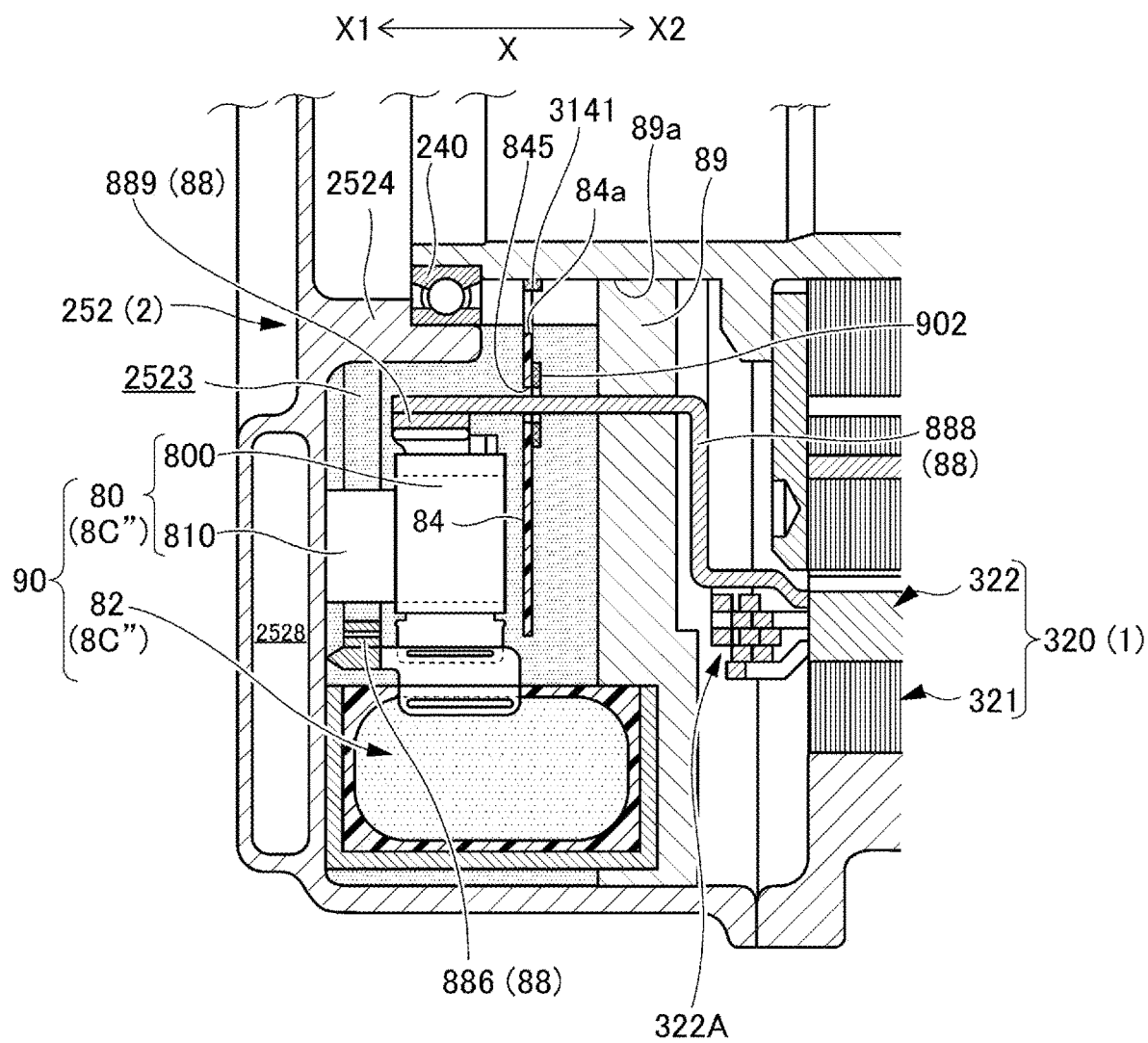
FIG. 25 is a sectional view of a main part of a vehicle drive device according to still another embodiment.

FIG. 19 is a perspective view showing the vehicle drive device 10C according to the present embodiment from the X1 side. FIG. 20 is a perspective view showing the vehicle drive device 10C from the X2 side. FIG. 21 is a perspective view showing a pipe member 70 from the X1 side. FIG. 22 is a perspective view showing the pipe member 70 from the X2 side. FIG. 23 is a sectional view of a main part of the vehicle drive device 10C according to the present embodiment, and is a sectional view corresponding to FIG. 6. FIG. 24 is a sectional view of a main part of a vehicle drive device 8C' according to another embodiment. FIG. 25 is a sectional view of a main part of a vehicle drive device 8C" according to still another embodiment.

The vehicle drive device 10C according to the present embodiment differs from the vehicle drive device 10 according to the first embodiment described above in that the motor drive device 8 is replaced with a motor drive device 8C. The motor drive device 8C according to the present embodiment differs from the motor drive device 8 according to the first embodiment described above in that the power module 80 is replaced with a power module 80C and the pipe member 70 is provided. The power module 80C differs from the power module 80 according to the first embodiment described above in that the heat dissipation member 810 is replaced with a heat dissipation member 810C.

The heat dissipation member 810C differs from the heat dissipation member 810 according to the first embodiment described above in terms of shape, and has the same basic function. Specifically, the heat dissipation member 810 according to the first embodiment described above is shaped as the solid block (metal block), and the heat dissipation member 810C according to the present embodiment is shaped as a hollow and the pipe member 70 passes through the hollow interior. The heat dissipation member 810C includes a heat conductive molded resin portion 811C (see FIG. 20) in the hollow interior. The material for the molded resin portion 811C may be the same as that for the molded resin portion 2523 described above. The molded resin portion 811C may be formed in the same process as that for the molded resin portion 2523. In FIG. 19, the illustration of the molded resin portion 811C is omitted. In FIG. 20, a portion of the pipe member 70 (insertion portion 73 described later) sealed with the molded resin portion 811C is shown in a see-through fashion.

The pipe member 70 is disposed between the cover member 252 and the rotary electric machine 1 in the axial direction. The pipe member 70 communicates with the coolant channel 2528 of the cover member 252. Therefore, the coolant flowing through the coolant channel 2528 flows through the channel in the pipe member 70. Since the pipe member 70 passes through the hollow interior of the heat dissipation member 810C, the coolant flowing through the pipe member 70 can efficiently receive heat from the heat dissipation member 810C. That is, the heat dissipation member 810C can efficiently release the heat via the coolant flowing through the pipe member 70. As a result, the capacitor module 82 and the submodule 800 (power semiconductor chips 801, 802) can efficiently be cooled via the heat dissipation member 810C. In another embodiment, the pipe member 70 may communicate with the same coolant supply source without intermediation of the coolant channel 2528.

In the present embodiment, the pipe member 70 preferably communicates with the first coolant channel 25281 of the coolant channel 2528 of the cover member 252. In this case, the submodule 800 (power semiconductor chips 801, 802) that is likely to increase in temperature than the capacitor module 82 can efficiently be cooled by the coolant in the first coolant channel 25281 on the upstream side from the second coolant channel 25282.

In the present embodiment, as shown in FIGS. 21 and 22, the pipe member 70 extends along the circumferential direction as a whole, and has an inlet portion 71 and an outlet portion 72 adjacent to each other in the circumferential direction at predetermined circumferential positions. The inlet portion 71 and the outlet portion 72 communicate with the coolant channel 2528 of the cover member 252. The pipe member 70 may be attached to the cover member 252 such that the inlet portion 71 and the outlet portion 72 protrude into the coolant channel 2528.

In the present embodiment, the pipe member 70 has a continuous form from the inlet portion 71 to the outlet portion 72, and includes the insertion portions 73 and crossover portions 74. Each insertion portion 73 extends in the axial direction in a U-shape and is inserted into the hollow interior of the heat dissipation member 810C (see dashed lines in FIG. 23). The crossover portion 74 extends in the circumferential direction and connects the insertion portions 73 adjacent in the circumferential direction. The pipe member 70 is relatively easy to manufacture and is realized by one piece. Therefore, the ease of assembly is good.

In a modification, the crossover portions 74 may be omitted and each insertion portion 73 may communicate with the coolant channel 2528 with the inlet portion 71 and the outlet portion 72.

In the present embodiment, the pipe member 70 forms the coolant channel in the heat dissipation member 810C, but the present disclosure is not limited to this. For example, in a motor drive device 8C' shown in the schematic sectional view of FIG. 24, the power module 80 according to the first embodiment described above is replaced with a power module 80C', and the power module 80C' has a coolant channel 815 in a heat dissipation member 810C'. The heat dissipation member 810C' may be formed by two pieces, and a portion other than the coolant channel 815 may be solid. The coolant channel 815 communicates with the coolant channel 2528 of the cover member 252 as shown in FIG. 24. With such a motor drive device 8C' as well, the same effects as those of the second embodiment described above can be attained with the number of components reduced because the pipe member 70 is not used.

In another modification, as schematically shown in the sectional view of FIG. 25, a heat dissipation member 89 may be provided between the block assembly 90 and the rotary electric machine 1 in the axial direction. In this case, the heat dissipation member 89 has a heat dissipation property and is made of, for example, aluminum. The heat dissipation member 89 is shaped as an annular ring having a central hole 89a through which the shaft portion 314 of the rotor 310 extends, and may be fixed to the shaft portion 314 by, for example, press fitting. According to such a configuration, the heat dissipation member 89 can protect the control board 84 against the heat from the rotary electric machine 1. The heat dissipation member 89 blocks electromagnetic waves to protect the control board 84. Thus, it is possible to increase the reliability of the control realized via the control board 84.

Figure 26:
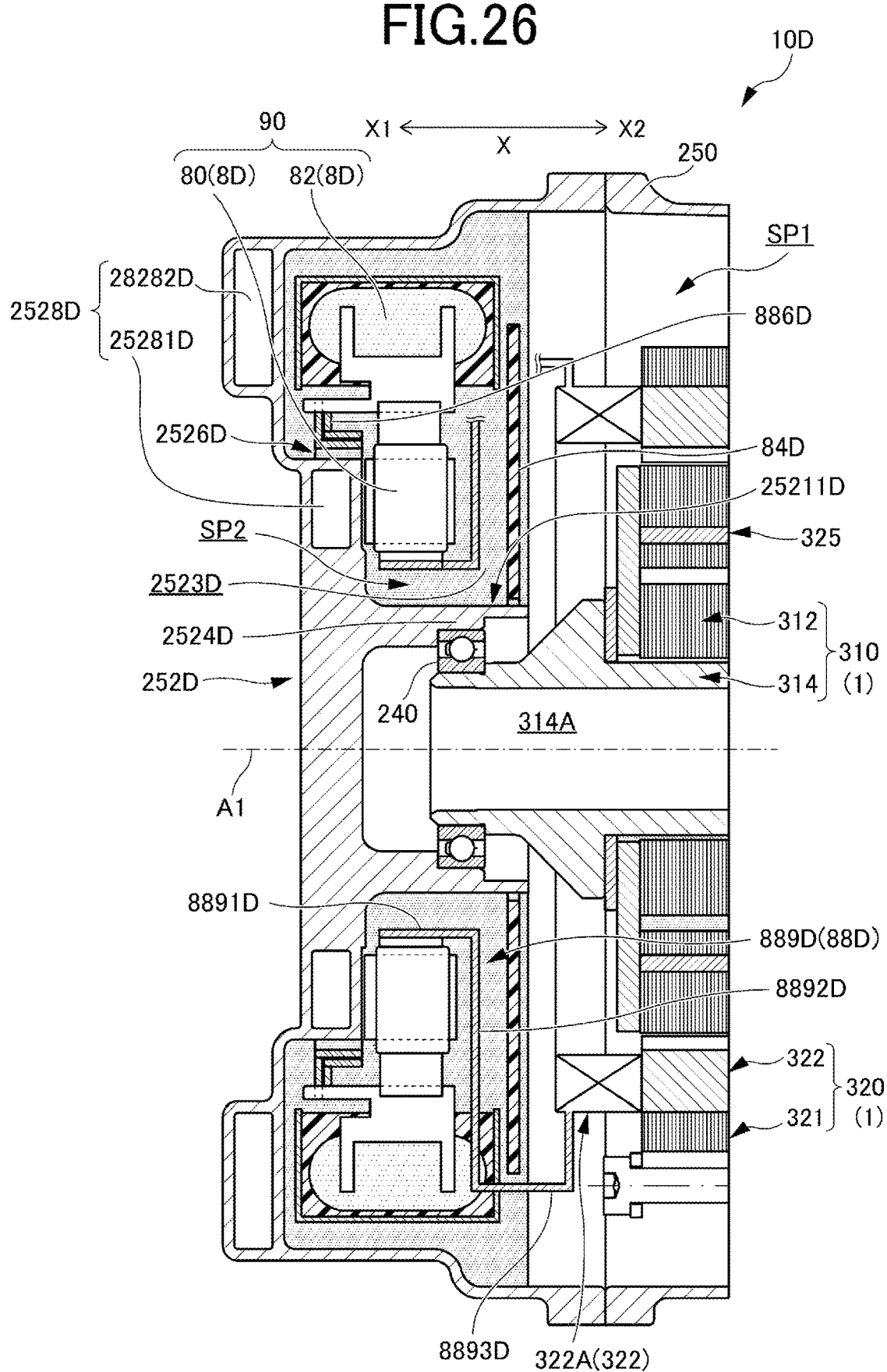
FIG. 26 is a sectional view schematically showing a main part of a vehicle drive device according to a third embodiment.

Next, a vehicle drive device 10D according to still another embodiment (hereinafter referred to as "third embodiment" for distinction) will be described with reference to FIGS. 26 to 30. In the following, constituent elements that may be similar to those in the first embodiment described above (including constituent elements different only in terms of the disposition and size) may be represented by the same reference symbols and the description thereof may be omitted. In FIG. 26 and the like, illustration may be omitted for some of the constituent elements that are shown in FIG. 3A and the like and may be provided in the vehicle drive device 10D according to the present embodiment (for example, the rotation angle sensor 900).

FIG. 26 is a sectional view schematically showing a main part of the vehicle drive device 10D according to the third embodiment.

The vehicle drive device 10D according to the third embodiment mainly differs from the vehicle drive device 10 according to the first embodiment described above in that the capacitor module 82 is disposed on the X1 side of a control board 84D. In this case, the capacitor module 82 in the first embodiment described above overlaps the control board 84D and the coil end portion 322A when viewed in the radial direction, but the capacitor module 82 in the present embodiment does not overlap the control board 84D or the coil end portion 322A when viewed in the radial direction.

According to such a configuration, it is possible to increase the diameter of the control board 84D (or dispose the control board 84D on the radially outer side). Specifically, as shown in FIG. 26, the control board 84D can extend radially outward to a position where the control board 84D overlaps the capacitor module 82 when viewed in the axial direction or to a position beyond the capacitor module 82 on the radially outer side. According to the present embodiment, the degree of freedom can be increased in terms of the disposition and size of the control board 84D. In a modification, the end of the capacitor module 82 on the X2 side may be disposed so as to overlap the coil end portion 322A when viewed in the radial direction as in the first embodiment described above. In this case, the axial size of the capacitor module 82 can be increased (capacity can be increased) instead of the increase in the diameter of the control board 84D.

In the third embodiment, the capacitor module 82 is disposed on the radially outer side of the coil end portion 322A so as not to overlap the coil end portion 322A when viewed in the axial direction as in the first embodiment described above. In a modification, the capacitor module 82 may be disposed toward the radially inner side so as to overlap the coil end portion 322A when viewed in the axial direction. In this case, the radial size of a cover member 252D can be reduced.

The vehicle drive device 10D according to the third embodiment differs from the vehicle drive device 10 according to the first embodiment described above in that the cover member 252 is replaced with the cover member 252D.

In the present embodiment, the end of the capacitor module 82 on the X1 side extends to the X1 side beyond the power module 80 because the capacitor module 82 is disposed on the X1 side of the control board 84D as described above. That is, the capacitor module 82 extends to the X1 side beyond the heat dissipation member 89 of the power module 80. Therefore, the cover member 252D includes a stepped portion 2526D on the surface on the X2 side in conjunction with a stepped portion on the X1 side formed by the power module 80 and the capacitor module 82. That is, on the surface of the cover member 252D on the X2 side, a radially outer surface portion (surface portion facing the capacitor module 82 in the axial direction) is offset to the X1 side from a radially inner surface portion (surface portion facing the power module 80 in the axial direction). Therefore, the cover member 252D can be close to or abut against both the power module and the capacitor module 82 in the axial direction. Thus, it is possible to effectively maintain the thermal connection to both the power module 80 and the capacitor module 82.

Also in the present embodiment, the cover member 252D has a coolant channel 2528D having the same function as the coolant channel 2528 according to the first embodiment described above. Similarly to the coolant channel 2528 according to the first embodiment described above, the coolant channel 2528D includes a first coolant channel 25281D and a second coolant channel 25282D.

In the present embodiment, the capacitor module 82 overlaps the first coolant channel 25281D when viewed in the radial direction as shown in FIG. 26 unlike the positional relationship between the coolant channel 2528 and the capacitor module 82 according to the first embodiment described above. That is, the capacitor module 82 faces the first coolant channel 25281D in the radial direction because of the stepped portion 2526D of the cover member 252D described above. Thus, the cooling performance for the capacitor module 82 can slightly be increased by the first coolant channel 25281D.

In the present embodiment, as shown in FIG. 26, a power supply busbar 886D is disposed between the first coolant channel 25281D and the capacitor module 82 in the radial direction. That is, the power supply busbar 886D is disposed near the stepped portion 2526D of the cover member 252D. Thus, the power supply busbar 886D can efficiently be disposed by using a space between the first coolant channel 25281D and the second coolant channel 25282D in the radial direction, and the power supply busbar 886D can efficiently be cooled by the first coolant channel 25281D and the second coolant channel 25282D.

Figure 27:
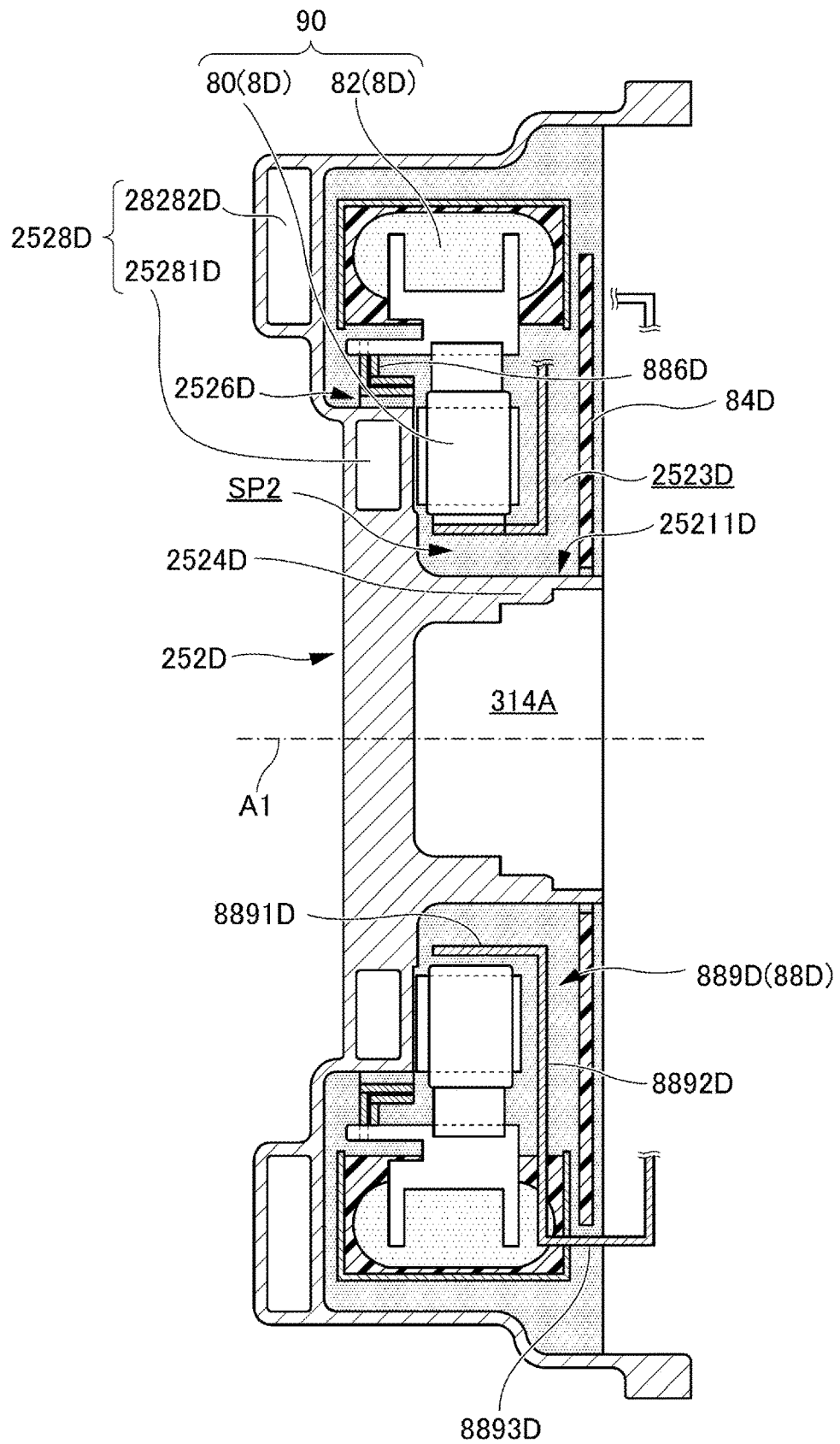
FIG. 27 is a schematic sectional view illustrating a sub-assembled state in which a motor drive device is attached to a cover member according to the third embodiment.

FIG. 27 is a schematic sectional view illustrating a sub-assembled state in which the motor drive device 8 is attached to the cover member 252 according to the present embodiment.

The cover member 252D includes a bearing support portion 2524D similar to the bearing support portion 2524 according to the first embodiment described above. The bearing support portion 2524D is set in a cylindrical portion 25211D. In the present embodiment, the cylindrical portion 25211D protrudes to the X2 side in the X direction so as to extend to a position where the cylindrical portion 25211D overlaps the control board 84D when viewed in the radial direction or to a position beyond the control board 84D on the X2 side in the X direction. In this case, as shown in FIG. 27, the power modules 80, the capacitor modules 82, and the control board 84D positioned on the radially outer side of the cylindrical portion 25211D can completely be sealed with a molded resin portion 2523D. That is, the motor drive device 8D and the control board 84D can be covered with the molded resin portion 2523D having no stepped portion on the X2 side. Thus, the motor drive device 8 and the control board 84D can easily be integrated with the cover member 252D by the molded resin portion 2523D. The molded resin portion 2523D may have a layered structure as described above with reference to FIG. 3D.

Figure 28:
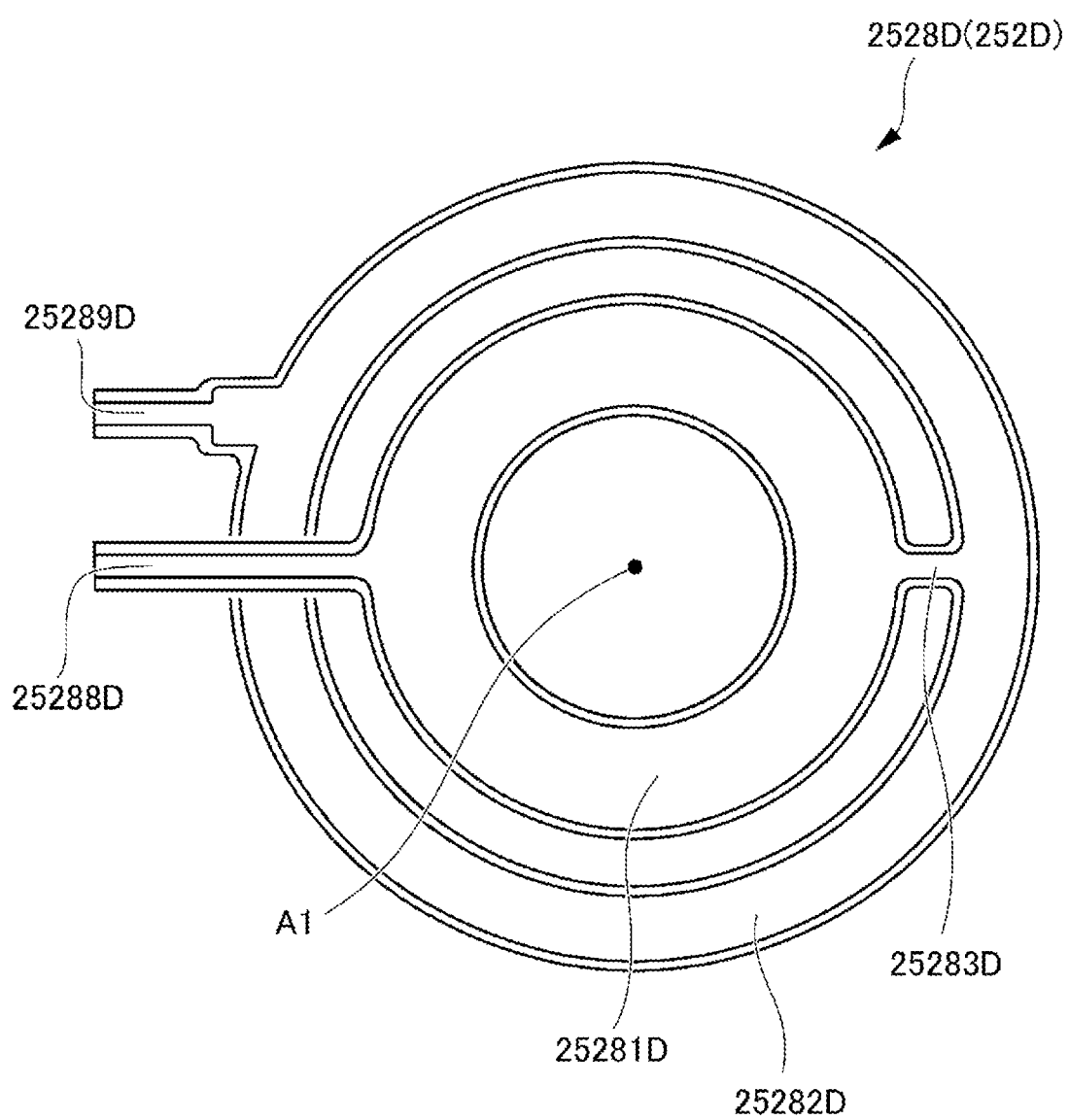
FIG. 28 is a diagram illustrating a coolant channel structure suitable for the cover member according to the third embodiment and is a plan view in the axial direction.

FIG. 28 is a diagram illustrating a coolant channel structure suitable for the cover member 252D according to the present embodiment and is a plan view in the axial direction. In FIG. 28, the coolant channel structure formed by the cover member 252D is shown in a see-through fashion.

In the present embodiment, the first coolant channel 25281D has an annular shape when viewed in the axial direction, and faces the power modules 80 when viewed in the axial direction similarly to the coolant channel 2528 according to the first embodiment described above. The second coolant channel 25282D has an annular shape when viewed in the axial direction, and faces the capacitor modules 82 when viewed in the axial direction. The first coolant channel 25281D and the second coolant channel 25282D communicate with each other through a radial connection channel 25283D. The first coolant channel 25281D is preferably disposed on an upstream side (closer to the discharge side of the water pump (not shown)) from the second coolant channel 25282D. That is, the coolant channel 2528D further includes an inlet channel portion (inlet channel portion formed in the cover member 252) 25288D to the first coolant channel 25281D. As shown in FIG. 28, the inlet channel portion 25288D is connected to the first coolant channel 25281D in the radial direction. According to such a configuration, the submodules 800 (power semiconductor chips 801, 802; see FIG. 29) of the power modules 80 that are likely to increase in temperature than the capacitor modules 82 can efficiently be cooled by the coolant in the first coolant channel 25281D on the upstream side from the second coolant channel 25282D.

In the present embodiment, the first coolant channel 25281D and the second coolant channel 25282D are offset in the axial direction as described above. Therefore, it is relatively easy to form the inlet channel portion 25288D to the first coolant channel 25281D positioned on the radially inner side of the second coolant channel 25282D. That is, as shown in FIG. 28, the inlet channel portion 25288D can extend radially outward so as to straddle the second coolant channel 25282D in the radial direction when viewed in the axial direction. The end of the inlet channel portion 25288D may be connected to a supply pipe of the coolant channel (not shown).

In the example shown in FIG. 28, the coolant channel 2528D further includes an outlet channel portion 25289D (outlet channel portion formed in the cover member 252) from the second coolant channel 25282D. The outlet channel portion 25289D from the second coolant channel 25282D is disposed side by side with the inlet channel portion 25288D to the first coolant channel 25281D. Therefore, the attachment of the coolant supply system and the coolant discharge system to the cover member 252D is concentrated at one position. Thus, the workability of such attachment can be improved.

Figure 29:
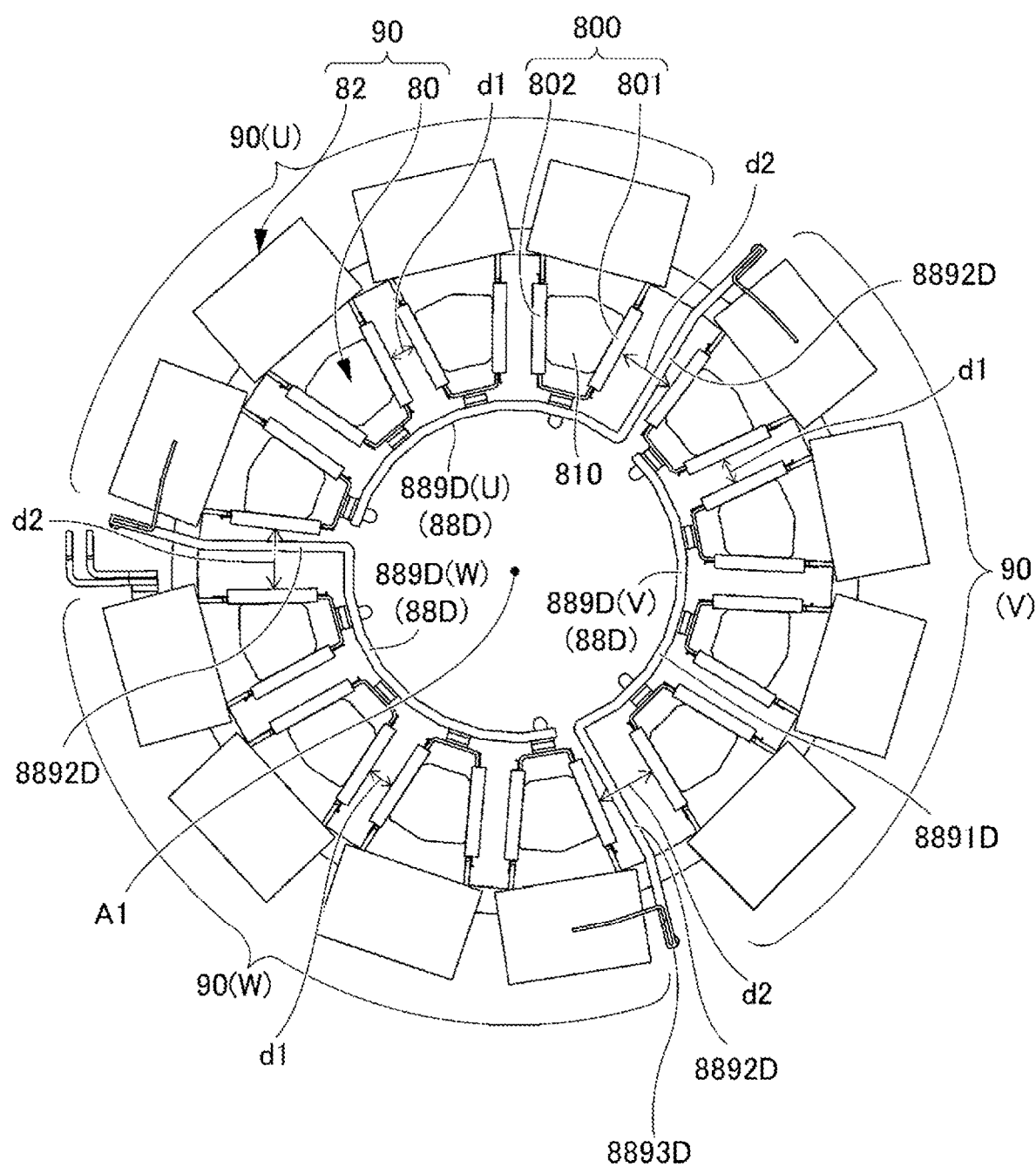
FIG. 29 is a diagram illustrating the motor drive device applied to the vehicle drive device according to the third embodiment.

FIG. 29 is a diagram illustrating the motor drive device 8D applied to the vehicle drive device 10D according to the present embodiment and is a plan view of the motor drive device 8D from the X2 side in the axial direction. The motor drive device 8D described below can similarly be applied to the first embodiment described above such that the motor drive device 8D is replaced with the motor drive device 8 of the vehicle drive device 10 according to the first embodiment described above.

The motor drive device 8D according to the present embodiment differs from the motor drive device 8 according to the first embodiment described above in terms of the disposition of the plurality of block assemblies 90 in the circumferential direction. Specifically, the motor drive device 8D according to the present embodiment may be the same as the motor drive device 8 according to the embodiment described above in that the plurality of block assemblies 90 is provided for each phase of the rotary electric machine 1 and the plurality of block assemblies 90 of the same phase is disposed to adjoin each other along the circumferential direction of the rotary electric machine. The motor drive device 8D according to the present embodiment differs from the motor drive device 8 according to the embodiment described above in that the circumferential distance between the block assemblies 90 of different phases that are adjacent in the circumferential direction is longer than the circumferential distance between the block assemblies 90 of the same phase that are adjacent in the circumferential direction. That is, in the motor drive device 8 according to the embodiment described above, the plurality of block assemblies 90 is disposed at equal intervals along the circumferential direction regardless of the difference between the phases. In the motor drive device 8D according to the present embodiment, the circumferential distance between the block assemblies 90 of different phases that are adjacent in the circumferential direction is longer than the circumferential distance between the block assemblies 90 of the same phase that are adjacent in the circumferential direction. Thus, an insulating distance can appropriately be secured between different phases adjacent in the circumferential direction.

For example, in the example shown in FIG. 29, among the 12 block assemblies 90, four U-phase block assemblies 90 (represented by "90(U)" in FIG. 29 for distinction) are disposed as a group to adjoin each other in the circumferential direction, four V-phase block assemblies 90 (represented by "90(V)" in FIG. 29 for distinction) are disposed as a group to adjoin each other in the circumferential direction, and four W-phase block assemblies 90 (represented by "90(W)" in FIG. 29 for distinction) are disposed as a group to adjoin each other in the circumferential direction. In this case, for example, the four U-phase block assemblies 90(U) are disposed away from each other in the circumferential direction by a distance d1, and one U-phase block assembly 90(U) at the circumferential end and one V-phase block assembly 90(V) at the circumferential end are disposed away from each other in the circumferential direction by a distance d2 that is significantly longer than the distance d1. The same applies to the relationship between one U-phase block assembly 90(U) at the circumferential end and one W-phase block assembly 90(W) at the circumferential end, and to the relationship between one V-phase block assembly 90(V) at the circumferential end and one W-phase block assembly 90(W) at the circumferential end.

In the present embodiment, a relay busbar 889D is disposed by using a space extending at such a relatively long distance d2 (space between the block assemblies 90). The relay busbar 889D has the same function as the relay busbar 889 described above, and is a busbar for electrically connecting the rotary electric machine 1 and the power module 80 (middle point between the upper and lower arms) for each phase.

In the example shown in FIG. 29, a U-phase relay busbar 889D (represented by "889D(U)" in FIG. 29 for distinction) extends in the radial direction by using a circumferential space between one U-phase block assembly 90(U) at the circumferential end and one V-phase block assembly 90(V) at the circumferential end (space of the distance d2). Similarly, a V-phase relay busbar 889D (represented by "889D (V)" in FIG. 29 for distinction) extends in the radial direction by using a circumferential space between one V-phase block assembly 90(V) at the circumferential end and one W-phase block assembly 90(W) at the circumferential end (space of the distance d2). Similarly, a W-phase relay busbar 889D (represented by "889D(W)" in FIG. 29 for distinction) extends in the radial direction by using a circumferential space between one W-phase block assembly 90(W) at the circumferential end and one W-phase block assembly 90(W) at the circumferential end (space of the distance d2).

More specifically, the U-phase relay busbar 889D(U) includes an arcuate portion 8891D extending in the circumferential direction on the radially inner side of the four U-phase block assemblies 90(U), a radial portion 8892D extending in the radial direction, and a connection end 8893D. The radial portion 8892D continues from one end of the arcuate portion 8891D, passes through the space of the distance d2, and extends radially outward to the radial positions of the capacitor modules 82 of the four U-phase block assemblies 90(U). The connection end 8893D continues from the radially outer end of the radial portion 8892D and extends in the axial direction on the radially outer side of the control board 84D. As shown in FIG. 26, when the connection end 8893D extends to the X2 side of the control board 84D, the connection end 8893D is bent radially inward and joined to the coil end portion 322A. A part of the connection end 8893D (part connected to the coil end portion 322A) may be realized by another conductor drawn from the rotary electric machine 1 side.

According to such a configuration, there is no need for the wiring through the through hole 845 of the control board 84 like the lead wire 888 (see FIG. 3A) used in the first embodiment described above. Thus, the through hole 845 is not required. As a result, it is possible to reduce the possibility that the element mounting area of the control board 84 is reduced due to a wiring portion 88D of the motor drive device 8D.

According to the present embodiment, the circumferential space can be formed between the block assemblies 90 of different phases that are adjacent in the circumferential direction. As a result, the relay busbar 889D can efficiently be disposed by using the space while appropriately securing the insulating distance between the different phases adjacent in the circumferential direction.

Figure 30:
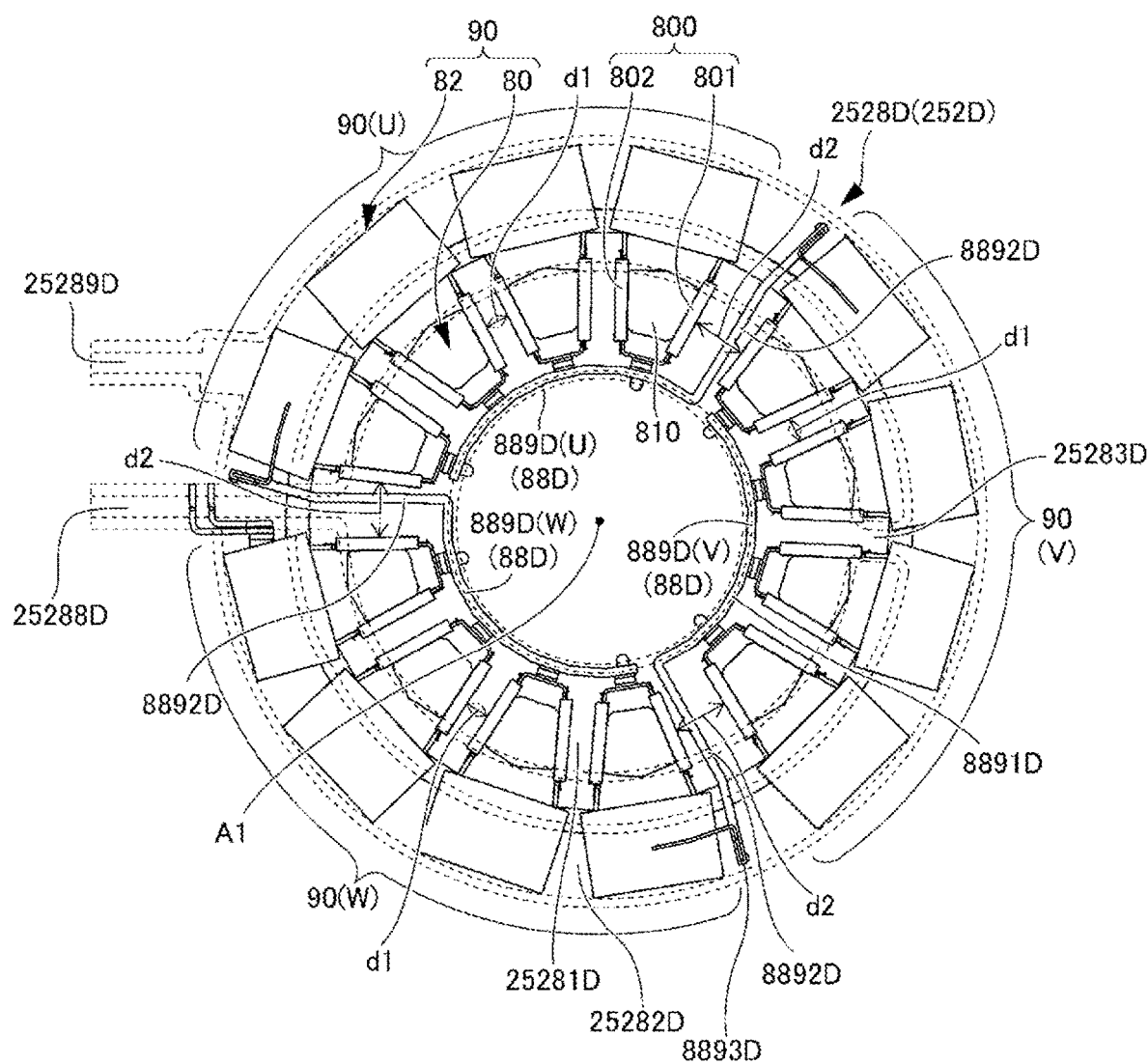
FIG. 30 is a diagram illustrating a positional relationship between the coolant channel structure and the motor drive device according to the third embodiment.

FIG. 30 is a diagram illustrating a positional relationship between the coolant channel structure and the motor drive device 8D according to the present embodiment and is a plan view of the motor drive device 8D from the X1 side in the axial direction. In FIG. 30, the coolant channel structure of the present embodiment described above with reference to FIG. 28 is shown by dashed lines superimposed on the motor drive device 8D shown in FIG. 29.

In the present embodiment, as shown in FIG. 30, the inlet channel portion 25288D extending in the radial direction is formed between the block assemblies 90 of different phases that are adjacent in the circumferential direction when viewed in the axial direction. In the example shown in FIG. 30, the inlet channel portion 25288D extends in the radial direction by using the circumferential space between one U-phase block assembly 90(U) at the circumferential end and one W-phase block assembly 90(W) at the circumferential end (space of the distance d2).

In the present embodiment, the capacitor module 82 overlaps the first coolant channel 25281D when viewed in the radial direction as described above. Therefore, when the inlet channel portion 25288D extends in the radial direction at the axial position of the first coolant channel 25281D, the inlet channel portion 25288D may interfere with the capacitor module 82. However, the present embodiment uses the circumferential space between one U-phase block assembly 90(U) at the circumferential end and one W-phase block assembly 90(W) at the circumferential end (space of the distance d2). Thus, the inlet channel portion 25288D can be formed in the shortest route without interfering with the capacitor module 82.

Next, modifications of the layout of the motor drive device 8 will be described with reference to FIGS. 31 to 33. In the following, constituent elements that may be similar to those in the first embodiment described above may be represented by the same reference symbols and the description thereof may be omitted.

Figure 31:
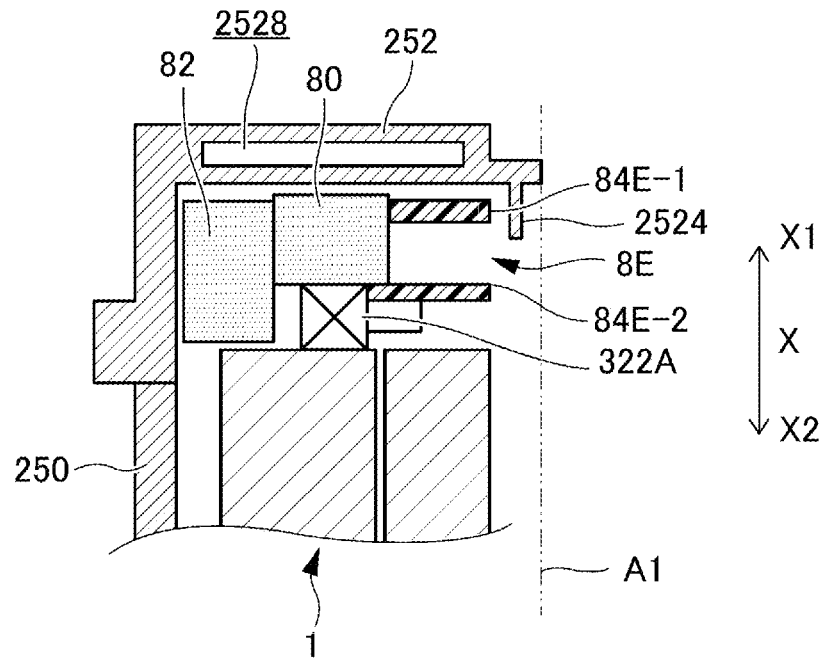
FIG. 31 is a sectional view schematically showing the layout of a main part of a motor drive device according to a first modification.

FIG. 31 is a sectional view schematically showing the layout of a main part of a motor drive device 8E according to a first modification. In FIG. 31 (and also in FIGS. 32 and 33 described later), only a portion on one side with respect to the first axis A1 and on the X1 side in the X direction is schematically shown about a vehicle drive device including the motor drive device 8E.

The motor drive device 8E according to the first modification differs from the motor drive device 8 according to the first embodiment described above in that the control board 84 is realized by two control boards 84E-1, 84E-2. In this case, the control boards 84E-1, 84E-2 are preferably disposed on the radially inner side of the coil end portion 322A when viewed in the axial direction. In this case, the coil end portion 322A can be cooled, for example, via the heat dissipation member 810 (see FIG. 9) of the power module 80 by bringing the heat dissipation member 810 and the coil end portion 322A close to each other in the axial direction.

Figure 32:
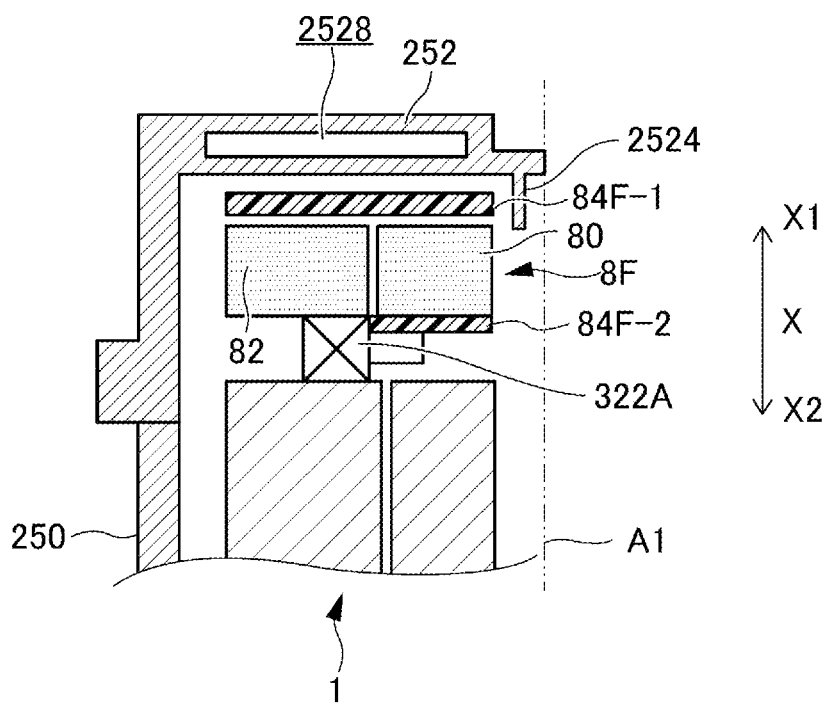
FIG. 32 is a sectional view schematically showing the layout of a main part of a motor drive device according to a second modification.

FIG. 32 is a sectional view schematically showing the layout of a main part of a motor drive device 8F according to a second modification.

The motor drive device 8F according to the second modification differs from the motor drive device 8 according to the first embodiment described above in that the capacitor module 82 overlaps the coil end portion 322A when viewed in the axial direction. In this case, the capacitor module 82 does not overlap the coil end portion 322A and extends on the X1 side of the coil end portion 322A when viewed in the radial direction. In this case, the radial size of the capacitor module 82 can relatively be increased or the radial size of the cover member 252 can be reduced by disposing the capacitor module 82 toward the radially inner side. Similarly to the first modification described above, the motor drive device 8 according to the second modification differs from the motor drive device 8 according to the first embodiment described above in that the control board 84 is realized by two control boards 84F-1, 84-2F. The control boards 84F-1, 84-2F may be integrated into one board.

Figure 33:
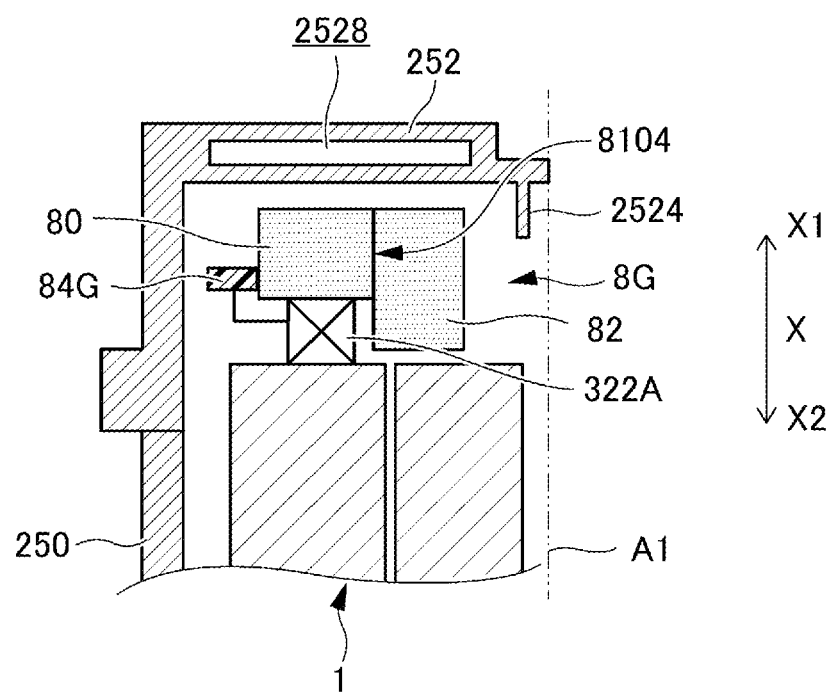
FIG. 33 is a sectional view schematically showing the layout of a main part of a motor drive device according to a third modification.

FIG. 33 is a sectional view schematically showing the layout of a main part of a motor drive device 8G according to a third modification.

The motor drive device 8G according to the third modification differs from the motor drive device 8 according to the first embodiment described above in terms of the radial relationship between the power module 80 and the capacitor module 82. Specifically, in the third modification, the power module 80 is disposed on the radially outer side of the capacitor module 82 when viewed in the axial direction. In this case, the power module 80 may overlap the coil end portion 322A when viewed in the axial direction. That is, the power module 80 may extend on the X1 side of the coil end portion 322A. The power module 80 overlaps the capacitor module 82 when viewed in the radial direction. Therefore, the effects of the first embodiment described above (for example, reduction in the axial size of the vehicle drive device 10) can similarly be attained in the present modification as well. Although a control board 84G is disposed on the radially outer side of the power module 80 in FIG. 33, any other disposition may be realized.

According to the third modification, the size (in particular, the circumferential size) of the heat dissipation member 810 of the power module 80 can easily be increased compared with the layout in which the power module 80 is disposed on the radially inner side of the capacitor module 82. Thus, the heat dissipation via the heat dissipation member 810 of the power module 80 can be improved efficiently.

In the third modification, the capacitor module 82 may face the heat dissipation member 810 of the power module 80 in the radial direction from the radially inner side. That is, the capacitor module 82 can thermally be connected to the heat dissipation member 810 by facing, in the radial direction, the connection surface 8104 of the heat dissipation member 810 on the radially inner side (connection surface 8104 connecting the two side faces where the paired power semiconductor chips 801, 802 are fixed). At this time, the capacitor module 82 may abut against the radially inner surface of the heat dissipation member 810. According to such a configuration as well, the capacitor module 82 can efficiently be cooled via the heat dissipation member 810.

In any of the modifications described above with reference to FIGS. 31 to 33, the bearing support portion 2524 is disposed on the radially inner side of the power module 80 when viewed in the axial direction, and overlaps the capacitor module 82 when viewed in the radial direction. Therefore, the effects similar to those of the first embodiment described above (for example, reduction in the axial size of the vehicle drive device) can be attained.

Figure 34:
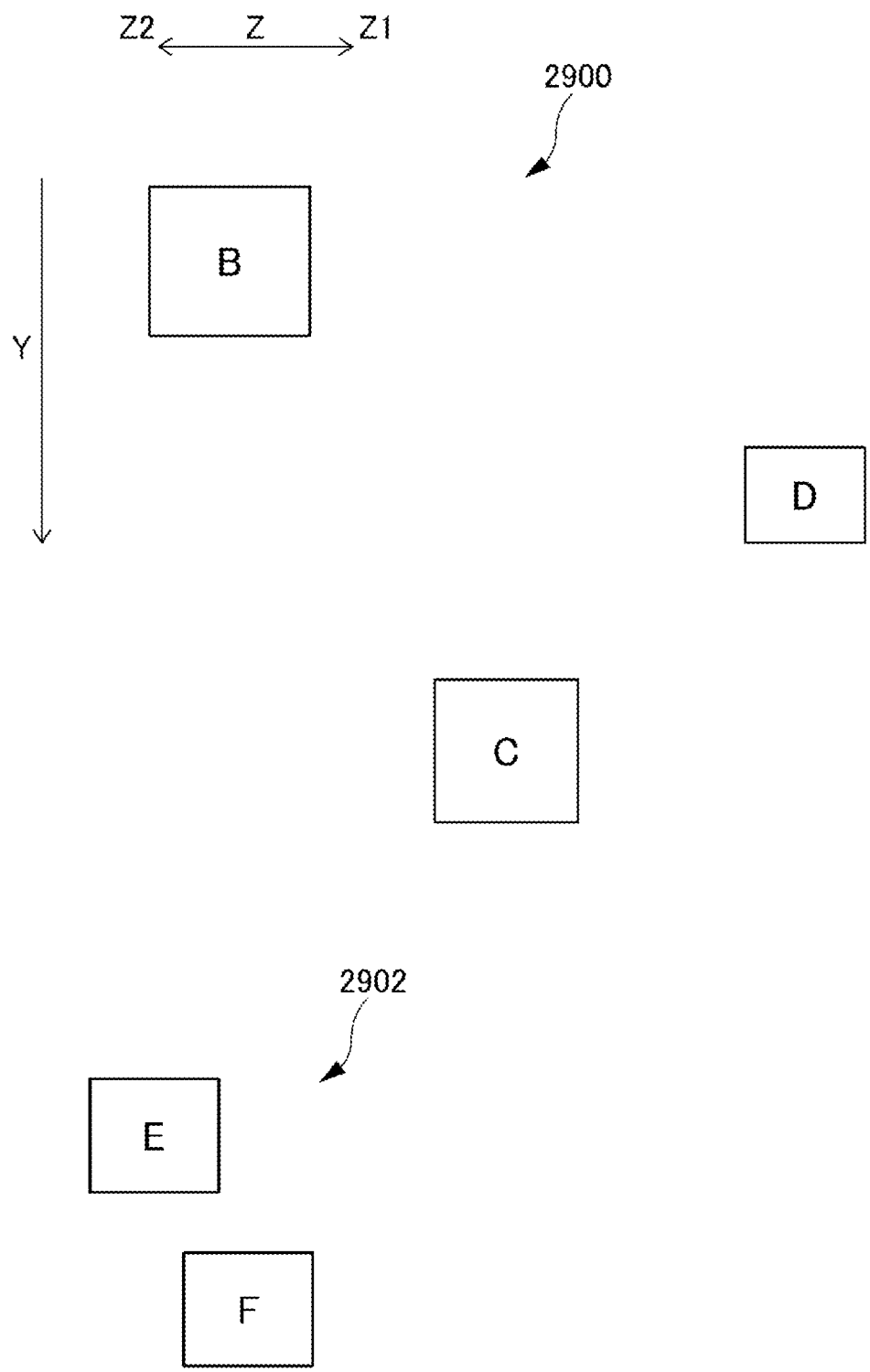
FIG. 34 is a diagram illustrating terms related to layout.

Lastly, definitions of terms will supplementarily be described with reference to FIG. 34. As shown in FIG. 34, description "an element C is disposed on a Z1 side of an element B in a Z direction when viewed in a Y direction" is herein a concept including, as in a positional relationship indicated by an arrow 2900, a relationship in which at least a part of the element C is positioned on the Z1 side with respect to a straight line in contact with the element B on the Z1 side among straight lines parallel to the Y direction. In this case, the Y direction and the Z direction are orthogonal, and the positional relationship of the elements is a relationship when viewed in a direction perpendicular to a YZ plane.

Description "an element D is disposed between the element B and the element C in the Y direction" is a concept including, as in the positional relationship indicated by the arrow 2900, a relationship in which at least a part of an extension range of the element D in the Y direction (coordinate range in the Y direction) is present between an extension range of the element B in the Y direction and an extension range of the element C in the Y direction. In other words, this description is a concept including a relationship in which at least one straight line passing through the element D and parallel to the Z direction can pass between the element B and the element C in the Y direction (without passing through either the element B or the element C).

Description "an element E overlaps an element F when viewed in the Y direction" is a concept including, as in a positional relationship indicated by an arrow 2902, a relationship in which at least one straight line among straight lines passing through the element E and parallel to the Y direction passes through the element F. The straight line passing through the element is a concept excluding a straight line in contact with the element.

While the embodiments are described in detail above, the present disclosure is not limited to specific embodiments, and various modifications and changes can be made within the scope of the claims. It is also possible to combine all or some of the constituent elements of the embodiments described above. Among the effects of each embodiment, those related to dependent claims are additional effects distinguished from generic concepts (independent claim).

For example, the cover member 252 includes the coolant channel 2528 as a cooler in the first embodiment described above (the same applies to the second embodiment, etc.), but the present disclosure is not limited to this. For example, the cover member 252 may include air cooling fins as another cooler in place of or in addition to the coolant channel 2528.

In the third embodiment, for the capacitor module 82, the capacitor module 82 is disposed on the radially outer side of the coil end portion 322A, but the present disclosure is not limited to this. That is, the capacitor module 82 may overlap the coil end portion 322A when viewed in the axial direction. In this case, the radial size of the cover member 252D can be reduced.

DESCRIPTION OF THE REFERENCE NUMERALS

10, 10C . . . vehicle drive device, 1, 1A, 1B . . . rotary electric machine, 310 . . . rotor, 320 . . . stator, 322 . . . stator coil (coil of stator), 322A . . . coil end portion, 250 . . . motor case (housing member), 252 . . . cover member, 2524 . . . bearing support portion (support portion), 2528, 2528B, 2528D . . . coolant channel (cooler), 25281, 25281B, 25281D . . . first coolant channel, 25282, 25282B, 25282D . . . second coolant channel, 802 . . . power semiconductor chip (power switching element), C . . . smoothing capacitor

The invention claimed is:

1. A vehicle drive device comprising:
   a rotary electric machine including a rotor and a stator;
   a housing member forming a housing chamber that houses the rotary electric machine;
   a cover member connected to one end side of the housing member in an axial direction, facing the rotary electric machine in the axial direction, and including a support portion that rotatably supports the rotor;
   a power switching element electrically connected to a coil of the stator, the coil including a lead wire and a coil end portion; and
   a smoothing capacitor electrically connected to the power switching element, wherein
   the power switching element and the smoothing capacitor are fixed to the cover member and disposed between the cover member and the rotary electric machine in the axial direction,
   the smoothing capacitor overlaps the power switching element when viewed in a radial direction, and
   the smoothing capacitor overlaps the coil end portion when viewed in the radial direction.

2. The vehicle drive device according to claim 1, further comprising a control board that controls the power switching element between the power switching element and the rotary electric machine in the axial direction, wherein the smoothing capacitor overlaps the control board when viewed in the radial direction.

3. The vehicle drive device according to claim 1, further comprising a control board that controls the power switching element between the power switching element and the rotary electric machine in the axial direction, wherein the control board overlaps the power switching element and the smoothing capacitor when viewed in the axial direction.

4. The vehicle drive device according to claim 2, wherein:
   the control board has a through hole through which a wire electrically connecting the coil of the stator and the power switching element passes; and
   the control board is provided with a current sensor around the through hole.

5. The vehicle drive device according to claim 4, wherein:
   the control board is shaped as an annular ring having a central hole through which a shaft portion of the rotor passes; and
   a rotation angle sensor that acquires rotation angle information of the rotor is provided at a position around the central hole in the control board.

6. The vehicle drive device according to claim 5, wherein:
   the control board includes an annular first area around the central hole, and an annular second area that is on an outer side of the first area in the radial direction and electrically insulated from the first area;

the first area is provided with the through hole and the current sensor or provided with the rotation angle sensor; and the second area is provided with a drive circuit that drives the power switching element.

7. The vehicle drive device according to claim 1, wherein:

the cover member includes a first coolant channel through which a coolant flows;

the power switching element is thermally connected to the cover member while facing the first coolant channel in the axial direction; and the smoothing capacitor is disposed on a radially outer side of the first coolant channel when viewed in the axial direction, and overlaps the first coolant channel when viewed in the radial direction.

8. The vehicle drive device according to claim 1, wherein the smoothing capacitor is disposed on a radially outer side of a coil end portion of the stator when viewed in the axial direction.

9. The vehicle drive device according to claim 1, wherein:

a plurality of the power switching elements is disposed side by side in a circumferential direction around a rotation axis of the rotor; and a plurality of the smoothing capacitors is disposed side by side in the circumferential direction around the rotation axis of the rotor.

10. The vehicle drive device according to claim 9, further comprising an annular power supply busbar electrically connecting the power switching element and the smoothing capacitor to a direct current power supply, wherein the power supply busbar is disposed between the power switching element and the smoothing capacitor in the radial direction when viewed in the axial direction.

11. The vehicle drive device according to claim 10, wherein:

the power switching element is fixed to the cover member via a heat dissipation member; and the power supply busbar is disposed between the smoothing capacitor and the heat dissipation member in the radial direction.

\* \* \* \* \*